(12) United States Patent
Ouchi et al.

(10) Patent No.: US 10,477,487 B2
(45) Date of Patent: Nov. 12, 2019

(54) TERMINAL APPARATUS, BASE STATION APPARATUS, AND METHOD FOR TERMINAL APPARATUS WHICH CAN SET APPROPRIATE UPLINK TRANSMISSION POWER

(71) Applicant: Sharp Kabushiki Kaisha, Sakai, Osaka (JP)

(72) Inventors: Wataru Ouchi, Sakai (JP); Kimihiko Imamura, Sakai (JP); Daiichiro Nakashima, Sakai (JP); Toshizo Nogami, Sakai (JP); Kazuyuki Shimezawa, Sakai (JP); Shoichi Suzuki, Sakai (JP); Yasuyuki Kato, Sakai (JP); Katsunari Uemura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/712,332

(22) Filed: Sep. 22, 2017

(65) Prior Publication Data
US 2018/0014257 A1 Jan. 11, 2018

Related U.S. Application Data

(63) Continuation of application No. 14/348,163, filed as application No. PCT/JP2012/072616 on Sep. 5, 2012, now Pat. No. 9,794,887.

(30) Foreign Application Priority Data

Sep. 30, 2011 (JP) ................................ 2011-215785

(51) Int. Cl.
*H04W 52/18* (2009.01)
*H04L 5/00* (2006.01)
(Continued)

(52) U.S. Cl.
CPC ........... *H04W 52/18* (2013.01); *H04L 5/0053* (2013.01); *H04W 52/242* (2013.01);
(Continued)

(58) Field of Classification Search
CPC ... H04W 52/18; H04W 52/40; H04W 52/242; H04W 52/146; H04L 5/0053;
(Continued)

(56) References Cited

U.S. PATENT DOCUMENTS 8,351,974 B2 * 1/2013 Ahn ...................... H04L 1/0029
370/319
9,661,589 B2 * 5/2017 Ouchi ................. H04W 52/146
(Continued)

OTHER PUBLICATIONS

Nam et al., Methods and Apparatus on Uplink Transmissions in Wireless Communications Systems, U.S. Appl. No. 61/538,021, filed Sep. 2011.*

(Continued)

*Primary Examiner* — Ian N Moore
*Assistant Examiner* — Justin T Van Roie
(74) *Attorney, Agent, or Firm* — Keating & Bennett, LLP

(57) ABSTRACT

In a communication system in which a base station apparatus and a terminal apparatus communicate with each other, a base station apparatus, a terminal apparatus, and a communication system with which the base station apparatus and the terminal apparatus can efficiently communicate with each other are provided. The terminal apparatus that communicates with the base station apparatus includes a radio resource control section 6011 that configures a plurality of uplink physical channels and that configures an uplink power control-related parameter for each of the plurality of uplink physical channels in accordance with information included in a radio resource control (RRC) signal and a transmission power control section 6015 that sets transmis- (Continued)

sion power of the uplink physical channels on the basis of the uplink power control-related parameters.

3 Claims, 34 Drawing Sheets

(51) Int. Cl.
| | |
|---|---|
| *H04W 52/24* | (2009.01) |
| *H04W 52/40* | (2009.01) |
| *H04W 52/14* | (2009.01) |
| *H04L 27/26* | (2006.01) |
| *H04B 1/707* | (2011.01) |
| *H04J 13/00* | (2011.01) |

(52) U.S. Cl.
CPC ............ *H04W 52/40* (2013.01); *H04B 1/707* (2013.01); *H04J 13/0048* (2013.01); *H04L 5/001* (2013.01); *H04L 27/2601* (2013.01); *H04W 52/146* (2013.01)

(58) Field of Classification Search
CPC ..... H04L 5/001; H04L 27/2601; H04B 1/707; H04J 13/0048
See application file for complete search history.

(56) References Cited

U.S. PATENT DOCUMENTS

| | | | | |
|---|---|---|---|---|
| 9,832,732 | B2 * | 11/2017 | Ouchi | H04W 52/146 |
| 9,877,290 | B2 * | 1/2018 | Aiba | H04L 1/0026 |
| 2011/0195735 | A1 * | 8/2011 | Irmer | H04W 52/346 455/509 |
| 2011/0250918 | A1 * | 10/2011 | Jen | H04W 52/08 455/509 |
| 2012/0113816 | A1 * | 5/2012 | Bhattad | H04L 5/0032 370/246 |
| 2012/0224553 | A1 * | 9/2012 | Kim | H04W 52/54 370/329 |
| 2013/0077569 | A1 * | 3/2013 | Nam | H04W 52/288 370/328 |
| 2013/0121279 | A1 * | 5/2013 | Noh | H04L 27/2611 370/329 |
| 2017/0245220 | A1 * | 8/2017 | Ouchi | H04W 52/146 |

OTHER PUBLICATIONS

Bhattad et al., Transmission of Reference Signals and Data to Support Communication by Relays, U.S. Appl. No. 61/410,780, filed Nov. 2010.*

Ouchi et al., "Terminal Apparatus, Base Station Apparatus, Method For Terminal Apparatus, and Method For Base Station Apparatus Which Can Set Appropriate Uplink Transmission Ower", U.S. Appl. No. 14/348,163, filed Mar. 28, 2014.

* cited by examiner

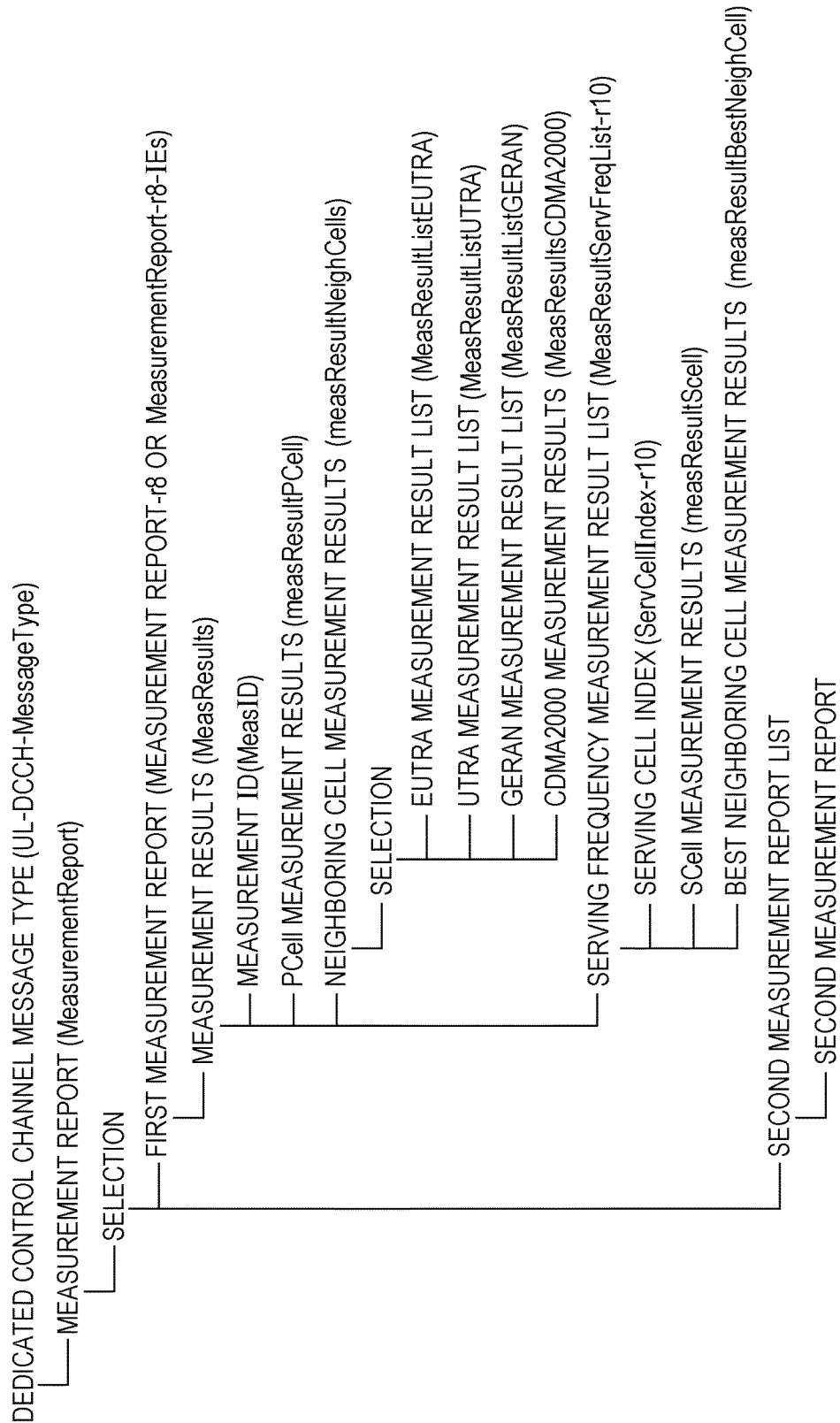

FIG. 20

EUTRA MEASUREMENT RESULT LIST (MeasResultListEUTRA)
├── PHYSICAL CELL ID (PhysCellID)
├── MEASUREMENT RESULT (measResult)
├── PHYSICAL CELL ID (PhysCellID)
├── MEASUREMENT RESULT (measResult)
├── PHYSICAL CELL ID (PhysCellID)
├── MEASUREMENT RESULT (measResult)
⋮

FIG. 21

SECOND MEASUREMENT REPORT
├── CSI-RS MEASUREMENT INDEX (CSI-RS ANTENNA PORT INDEX)
├── MEASUREMENT RESULT
├── CSI-RS MEASUREMENT INDEX (CSI-RS ANTENNA PORT INDEX)
├── MEASUREMENT RESULT
├── CSI-RS MEASUREMENT INDEX (CSI-RS ANTENNA PORT INDEX)
├── MEASUREMENT RESULT
⋮

FIG. 22

(FIRST) UPLINK POWER CONTROL-RELATED PARAMETER CONFIGURATION (FIRST) UPLINK POWER CONTROL-RELATED CELL-SPECIFIC PARAMETER
CONFIGURATION (FOR PRIMARY CELL)
- p0-NominalPUSCH
- α
- p0-NominalPUCCH
- deltaFList-PUCCH
- deltaPreambleMsg3

(FIRST) UPLINK POWER CONTROL-RELATED CELL-SPECIFIC PARAMETER
CONFIGURATION FOR SECONDARY CELL
- p0-NominalPUSCH
- α

(FIRST) UPLINK POWER CONTROL-RELATED TERMINAL-SPECIFIC PARAMETER
CONFIGURATION (FOR PRIMARY CELL)
- p0-UE-PUSCH
- deltaMCS-Enabled
- accumulation-Enabled
- p0-UE-PUCCH
- pSRS-Offset
- filterCoeffcient
- pSRS-Offset-Ap
- deltaTxD-OffsetListPUCCH (FIRST) UPLINK POWER CONTROL-RELATED TERMINAL-SPECIFIC PARAMETER
CONFIGURATION FOR SECONDARY CELL
- p0-UE-PUSCH
- deltaMCS-Enabled
- accumulation-Enabled
- p0-UE-PUCCH
- pSRS-Offset
- pSRS-Offset-Ap
- filterCoeffcient
- pathlossReference(-r10)

FIG. 29
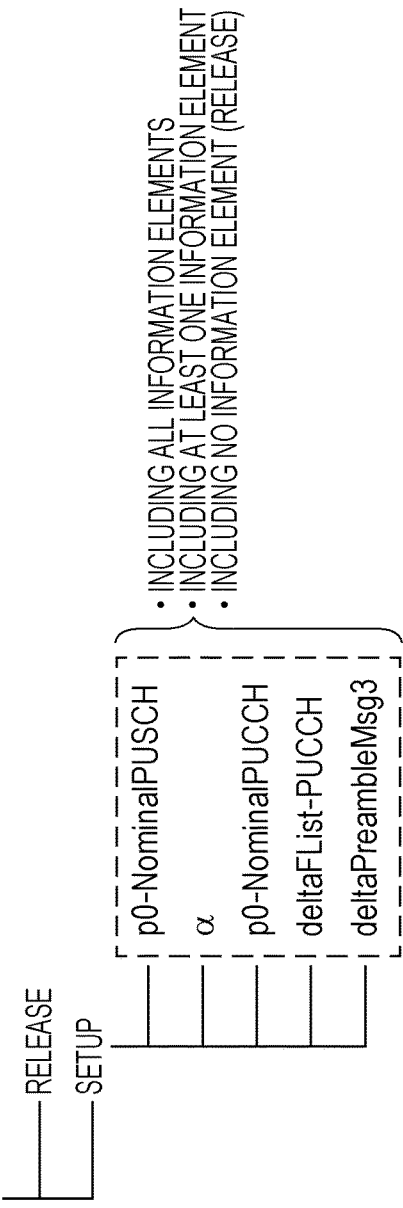
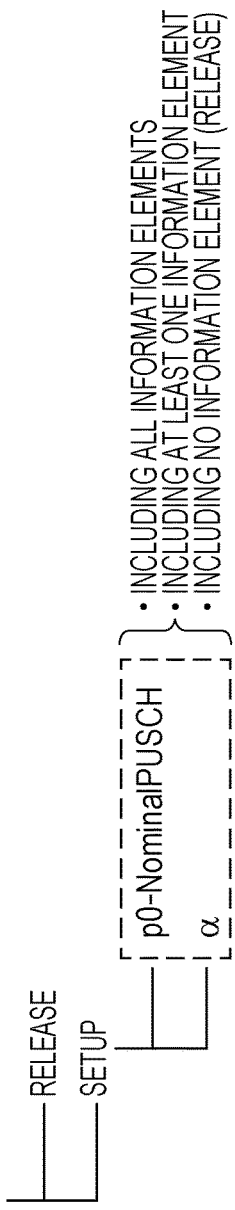

FIG. 30

FIRST UPLINK POWER CONTROL-RELATED TERMINAL-SPECIFIC PARAMETER CONFIGURATION-r11 (FOR PRIMARY CELL)
   └── PATH LOSS REFERENCE RESOURCE

EXAMPLE OF FIRST UPLINK POWER CONTROL-RELATED TERMINAL-SPECIFIC PARAMETER CONFIGURATION-r11 FOR SECONDARY CELL
   └── PATH LOSS REFERENCE RESOURCE

EXAMPLE OF SECOND UPLINK POWER CONTROL-RELATED TERMINAL-SPECIFIC PARAMETER CONFIGURATION-r11 (FOR PRIMARY CELL)
   ├── RELEASE
   └── SETUP
         ├── p0-UE-PUSCH
         ├── deltaMCS-Enabled
         ├── accumulation-Enabled
         ├── p0-UE-PUCCH
         ├── pSRS-Offset
         ├── filterCoefficient
         ├── pSRS-Offset-Ap
         ├── deltaTxD-OffsetListPUCCH
         └── PATH LOSS REFERENCE RESOURCE

- INCLUDING ALL INFORMATION ELEMENTS
- INCLUDING AT LEAST ONE INFORMATION ELEMENT
- INCLUDING NO INFORMATION ELEMENT (RELEASE)

EXAMPLE OF SECOND UPLINK POWER CONTROL-RELATED TERMINAL-SPECIFIC PARAMETER CONFIGURATION-r11 FOR SECONDARY CELL
   ├── RELEASE
   └── SETUP
         ├── p0-UE-PUSCH
         ├── deltaMCS-Enabled
         ├── accumulation-Enabled
         ├── p0-UE-PUCCH
         ├── pSRS-Offset
         ├── pSRS-Offset-Ap
         ├── filterCoefficient
         ├── pathlossReference(-r11)
         └── PATH LOSS REFERENCE RESOURCE

- INCLUDING ALL INFORMATION ELEMENTS
- INCLUDING AT LEAST ONE INFORMATION ELEMENT
- INCLUDING NO INFORMATION ELEMENT (RELEASE)

FIG. 31

PATH LOSS REFERENCE RESOURCE
└── MEASUREMENT TARGET ── INDEX ASSOCIATED WITH CELL-SPECIFIC REFERENCE SIGNAL ANTENNA PORT 0 OR CSI-RS ANTENNA PORT INDEX (OR CSI-RS MEASUREMENT INDEX)

TERMINAL APPARATUS, BASE STATION APPARATUS, AND METHOD FOR TERMINAL APPARATUS WHICH CAN SET APPROPRIATE UPLINK TRANSMISSION POWER

TECHNICAL FIELD

The present invention relates to a terminal apparatus, a communication system, a base station apparatus, a method for terminal apparatus, and a method for base station apparatus, which can set appropriate uplink transmission power.

BACKGROUND ART

In a communication system such as WCDMA (Wideband Code Division Multiple Access), LTE (Long Term Evolution), or LTE-A (LTE-Advanced) established by the 3GPP (Third Generation Partnership Project) or wireless LAN or WiMAX (Worldwide Interoperability for Microwave Access) established by the IEEE (Institute of Electrical and Electronics Engineers), a base station apparatus (a cell, a transmission station, a transmission device, or an eNodeB) and a terminal apparatus (a mobile terminal apparatus, a reception station, a mobile station, a reception device, or UE (user equipment)) each include a plurality of transmission and reception antennas, and use a MIMO (multi-input, multi-output) technique in order to spatially multiplex data signals and realize high-speed data communication.

In order to realize data communication between the base station apparatus and the terminal apparatus in such a communication system, the base station apparatus needs to perform various types of control on the terminal apparatus. Therefore, the base station apparatus performs downlink and uplink data communication with the terminal apparatus by transmitting control information using certain resources. For example, the base station apparatus realizes data communication by transmitting resource assignment information, data signal modulation and coding information, data signal spatial multiplex number information, transmission power control information, and the like to the terminal apparatus. For such control information, a method described in NPL 1 may be used.

In addition, one of various methods may be used as a downlink communication method in which the MIMO technique is used, that is, for example, a multi-user MIMO scheme in which the same resources are assigned to different terminal apparatuses, a CoMP (cooperative multipoint or coordinate multipoint) scheme in which a plurality of base station apparatuses perform data communication in cooperation with one another, or the like may be used.

FIG. 35 is a diagram illustrating an example in which the multi-user MIMO scheme is implemented. In FIG. 35, a base station apparatus 3501 performs data communication with a terminal apparatus 3502 through a downlink 3504 and performs data communication with a terminal apparatus 3503 through a downlink 3505. At this time, the terminal apparatus 3502 and the terminal apparatus 3503 perform data communication in which multi-user MIMO is used. In the downlink 3404 and the downlink 3505, the same resources are used. The resources are configured by resources in a frequency domain and a time domain. In addition, the base station apparatus 3501 uses a precoding technique or the like to control beams for the downlink 3504 and the downlink 3505, thereby maintaining orthogonality between the downlink 3504 and the downlink 3505 and reducing cochannel interference. As a result, the base station apparatus 3501 can realize data communication that uses the same resources for the terminal apparatus 3502 and the terminal apparatus 3503.

FIG. 36 is a diagram illustrating an example in which a downlink CoMP scheme is implemented. In FIG. 36, a case is illustrated in which a radio communication system that uses a heterogeneous network configuration is constructed by a macro base station apparatus 3601 having wide coverage and an RRH (remote radio head) 3602 having narrower coverage than the macro base station apparatus 3601. Here, assume a case in which the coverage of the macro base station apparatus 3601 includes part or the entirety of the coverage of the RRH 3602. In the example illustrated in FIG. 36, the heterogeneous network configuration is constructed by the macro base station apparatus 3601 and the RRH 3602, which perform data communication with a terminal apparatus 3604 through a downlink 3605 and a downlink 3606, respectively, in cooperation with each other. The macro base station apparatus 3601 is connected to the RRH 3602 through a line 3603, and can transmit and receive control signals and data signals to and from the RRH 3602. As the line 3603, a wired line such as an optical fiber or a wireless line that uses a relay technology may be used. At this time, the macro base station apparatus 3601 and the RRH 3602 use similar or exactly the same frequencies (resources) in order to improve total spectral efficiency (transmission capacity) in the area of the coverage constructed by the macro base station apparatus 3601.

When the terminal apparatus 3604 is located close to the base station apparatus 3601 or the RRH 3602, the terminal apparatus 3604 can perform single-cell communication with the base station apparatus 3601 or the RRH 3602. Furthermore, when the terminal apparatus 3604 is located close to an edge (cell edge) of the coverage constructed by the RRH 3602, measures against cochannel interference from the macro base station apparatus 3601 need to be taken. Methods for reducing or suppressing interference with the terminal apparatus 3604 in a cell edge region by using a CoMP scheme in which the macro base station apparatus 3601 and the RRH 3602 cooperate in multi-cell communication (coordinated communication, multipoint communication, or CoMP) of the macro base station apparatus 3601 and the RRH 3602 have been examined. For example, as such a CoMP scheme, a method described in NPL 2 has been examined.

FIG. 37 is a diagram illustrating an example in which an uplink CoMP scheme is implemented. In FIG. 37, a case is illustrated in which a radio communication system that uses a heterogeneous network configuration is constructed by a macro base station apparatus 3701 having wide coverage and an RRH (remote radio head) 3702 having narrower coverage than the macro base station apparatus 3701. Here, assume a case in which the coverage of the macro base station apparatus 3701 includes part or the entirety of the coverage of the RRH 3702. In the example illustrated in FIG. 37, the heterogeneous network configuration is constructed by the macro base station apparatus 3701 and the RRH 3702, which perform data communication with a terminal apparatus 3704 through an uplink 3705 and an uplink 3706, respectively, in cooperation with each other. The macro base station apparatus 3701 is connected to the RRH 3702 through a line 3703, and can transmit and receive reception signals, control signals, and data signals to and from the RRH 3702. As the line 3703, a wired line such as an optical fiber or a wireless line that uses a relay technology may be used. At this time, the macro base station apparatus 3701 and the RRH 3702 use similar or exactly the same frequencies (resources) in order to improve total spectral efficiency (transmission capacity) in the area of the coverage constructed by the macro base station apparatus 3701.

When the terminal apparatus 3704 is located close to the base station apparatus 3701 or the RRH 3702, the terminal apparatus 3704 can perform single-cell communication with the base station apparatus 3701 or the RRH 3702. In this case, when the terminal apparatus 3704 is located close to the base station apparatus 3701, the base station apparatus 3701 receives and demodulates a signal received through the uplink 3705. On the other hand, when the terminal apparatus 3704 is located close to the RRH 3702, the RRH 3702 receives and demodulates a signal received through the uplink 3706. Furthermore, when the terminal apparatus 3704 is located close to an edge (cell edge) of the coverage constructed by the RRH 3702 or an intermediate point between the base station apparatus 3701 and the RRH 3702, the macro base station apparatus 3701 receives a signal received through the uplink 3705 and the RRH 3702 receives a signal received through the uplink 3706. Thereafter, the macro base station apparatus 3701 and the RRH 3702 transmit and receive, through the line 3703, the signals received from the terminal apparatus 3704, combine the signals received from the terminal apparatus 3704, and demodulate the combined signals. As a result of this processing, improvement of the performance of the data communication is expected. This is a method called joint reception. By using a CoMP scheme in which the macro base station apparatus 3701 and the RRH 3702 cooperate in uplink multi-cell communication (also referred to as coordinated communication, multipoint communication, or CoMP), the performance of the data communication in a cell edge region or a region around an intermediate point between the macro base station apparatus 3701 and the RRH 3702 can be improved.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), March 2011, 3GPP TS 36.212 V10.1.0 (2011 March)

NPL 2: 3rd Generation Partnership Project; Technical Specification Group Radio Access Network; Further Advancements for E-UTRA Physical Layer Aspects (Release 9), March 2010, 3GPP TR 36.814 V9.0.0 (2010 March)

SUMMARY OF INVENTION

Technical Problem

However, if, in a communication system in which coordinated communication such as a CoMP scheme can be performed, a terminal apparatus transmits an uplink signal with appropriate uplink transmission power and a base station apparatus and an RRH can perform appropriate channel estimation, appropriate resource assignment can be performed, thereby expecting improvement of the throughput of the entirety of the system.

The present invention has been established in view of the above problem and an object thereof is to provide, in a communication system in which a base station apparatus and a terminal apparatus communicate with each other, a terminal apparatus, a communication system, a base station apparatus, and a communication method with which the terminal apparatus can set appropriate uplink transmission power.

Solution to Problem (1) The present invention has been established in order to solve the above-described problem, and a terminal apparatus according to an aspect of the present invention is a terminal apparatus that communicates with a base station apparatus. The terminal apparatus includes a terminal apparatus radio resource control unit that configures a plurality of uplink physical channels and that configures an uplink power control-related parameter for each of the plurality of uplink physical channels in accordance with information included in a radio resource control (RRC) signal, and a transmission power control unit that sets transmission power of the uplink physical channels on the basis of the uplink power control-related parameters.

(2) In addition, a terminal apparatus according to an aspect of the present invention is the above-described terminal apparatus. The uplink physical channels include at least a physical uplink shared channel (PUSCH).

(3) In addition, a terminal apparatus according to an aspect of the present invention is the above-described terminal apparatus. The uplink physical channels include at least a physical uplink control channel (PUCCH).

(4) In addition, a terminal apparatus according to an aspect of the present invention is the above-described terminal apparatus. The uplink physical channels include at least a physical random access channel (PRACH).

(5) In addition, a terminal apparatus according to an aspect of the present invention is the above-described terminal apparatus. The uplink physical channels include at least a periodic sounding reference signal (P-SRS).

(6) In addition, a terminal apparatus according to an aspect of the present invention is the above-described terminal apparatus. The uplink physical channels include at least an aperiodic sounding reference signal (A-SRS).

(7) In addition, a terminal apparatus according to an aspect of the present invention is the above-described terminal apparatus. Only a first uplink power control-related parameter is configured for each of the uplink physical channels.

(8) In addition, a terminal apparatus according to an aspect of the present invention is the above-described terminal apparatus. A first uplink power control-related parameter and a second uplink power control-related parameter are configured for at least part of the uplink physical channels.

(9) In addition, a terminal apparatus according to an aspect of the present invention is the above-described terminal apparatus. The first uplink power control-related parameter or the second uplink power control-related parameter is configured in accordance with information included in a downlink control information (DCI) format.

(10) In addition, a terminal apparatus according to an aspect of the present invention is the above-described terminal apparatus. The uplink power control-related parameters include at least a path loss reference resource.

(11) In addition, a terminal apparatus according to an aspect of the present invention is the above-described terminal apparatus. The uplink power control-related parameters include at least a cell-specific power control parameter or a terminal-specific power control parameter relating to nominal power of a physical uplink shared channel (PUSCH).

(12) In addition, a terminal apparatus according to an aspect of the present invention is the above-described terminal apparatus. The uplink power control-related parameters include at least a path loss compensation coefficient.

(13) In addition, a terminal apparatus according to an aspect of the present invention is the above-described terminal apparatus. The uplink power control-related parameters include at least a power offset of a sounding reference signal (SRS).

(14) In addition, a terminal apparatus according to an aspect of the present invention is the above-described terminal apparatus. The uplink power control-related parameters include at least a cell-specific power control parameter or a terminal-specific power control parameter relating to nominal power of a physical uplink control channel (PUCCH).

(15) In addition, a terminal apparatus according to an aspect of the present invention is the above-described terminal apparatus. The uplink power control-related parameters include at least a filtering coefficient.

(16) In addition, a terminal apparatus according to an aspect of the present invention is the above-described terminal apparatus. The uplink power control-related parameters include a power ramping step of a physical random access channel and/or preamble initial target power.

(17) In addition, a terminal apparatus according to an aspect of the present invention is the above-described terminal apparatus. The path loss reference resource includes information associated with an antenna port.

(18) In addition, a terminal apparatus according to an aspect of the present invention is the above-described terminal apparatus. The path loss reference resource includes an index associated with cell-specific reference signal Antenna Port 0.

(19) In addition, a terminal apparatus according to an aspect of the present invention is the above-described terminal apparatus. The path loss reference resource includes an index associated with a channel state information reference signal antenna port index.

(20) In addition, a terminal apparatus according to an aspect of the present invention is the above-described terminal apparatus. The path loss reference resource includes an index associated with an index determined by a third reference signal configuration.

(21) In addition, a terminal apparatus according to an aspect of the present invention is the above-described terminal apparatus. The path loss reference resource is independently configured for each of the uplink physical channels.

(22) In addition, a terminal apparatus according to an aspect of the present invention is the above-described terminal apparatus. Only a first path loss reference resource is configured for each of the uplink physical channels.

(23) In addition, a terminal apparatus according to an aspect of the present invention is the above-described terminal apparatus. A first path loss reference resource and a second path loss reference resource are configured for at least part of the uplink physical channels.

(24) In addition, a communication system according to an aspect of the present invention is a communication system in which a base station apparatus and a terminal apparatus communicate with each other. The base station apparatus configures a plurality of uplink physical channels. The base station apparatus configures an uplink power control-related parameter for each of the uplink physical channels. The base station apparatus transmits a radio resource control (RRC) signal including configuration information regarding the uplink physical channels and/or information regarding the uplink power control-related parameters to the terminal apparatus. The terminal apparatus sets the uplink physical channels in accordance with the information included in the RRC signal. The terminal apparatus configures the uplink power control-related parameter for each of the uplink physical channels. The terminal apparatus sets transmission power of the uplink physical channels on the basis of the uplink power control-related parameters. The terminal apparatus transmits the uplink physical channels with the transmission power.

(25) In addition, a communication system according to an aspect of the present invention is the above-described communication system. The uplink physical channels include at least a physical uplink shared channel (PUSCH).

(26) In addition, a communication system according to an aspect of the present invention is the above-described communication system. The uplink physical channels include at least a physical uplink control channel (PUCCH).

(27) In addition, a communication system according to an aspect of the present invention is the above-described communication system. The uplink physical channels include at least a physical random access channel (PRACH).

(28) In addition, a communication system according to an aspect of the present invention is the above-described communication system. The uplink physical channels include at least a periodic sounding reference signal (P-SRS).

(29) In addition, a communication system according to an aspect of the present invention is the above-described communication system. The uplink physical channels include at least an aperiodic sounding reference signal (A-SRS).

(30) In addition, a communication system according to an aspect of the present invention is the above-described communication system. Only a first uplink power control-related parameter is configured for each of the uplink physical channels.

(31) In addition, a communication system according to an aspect of the present invention is the above-described communication system. A first uplink power control-related parameter and a second uplink power control-related parameter are configured for at least part of the uplink physical channels.

(32) In addition, a communication system according to an aspect of the present invention is the above-described communication system. The first uplink power control-related parameter or the second uplink power control-related parameter is configured in accordance with information included in a downlink control information (DCI) format.

(33) In addition, a communication system according to an aspect of the present invention is the above-described communication system. The uplink power control-related parameters include at least a path loss reference resource.

(34) In addition, a communication system according to an aspect of the present invention is the above-described communication system. The uplink power control-related parameters include at least a cell-specific power control parameter or a terminal-specific power control parameter relating to nominal power of a physical uplink shared channel (PUSCH).

(35) In addition, a communication system according to an aspect of the present invention is the above-described communication system. The uplink power control-related parameters include at least a path loss compensation coefficient.

(36) In addition, a communication system according to an aspect of the present invention is the above-described communication system. The uplink power control-related parameters include at least a power offset of a sounding reference signal (SRS).

(37) In addition, a communication system according to an aspect of the present invention is the above-described communication system. The uplink power control-related parameters include at least a cell-specific power control parameter or a terminal-specific power control parameter relating to nominal power of a physical uplink control channel (PUCCH).

(38) In addition, a communication system according to an aspect of the present invention is the above-described communication system. The uplink power control-related parameters include at least a filtering coefficient.

(39) In addition, a communication system according to an aspect of the present invention is the above-described communication system. The uplink power control-related parameters include a power ramping step of a physical random access channel and/or preamble initial target power.

(40) In addition, a communication system according to an aspect of the present invention is the above-described communication system. The path loss reference resource includes information associated with an antenna port.

(41) In addition, a communication system according to an aspect of the present invention is the above-described communication system. The path loss reference resource includes an index associated with cell-specific reference signal Antenna Port 0.

(42) In addition, a communication system according to an aspect of the present invention is the above-described communication system. The path loss reference resource includes an index associated with a channel state information reference signal antenna port index.

(43) In addition, a communication system according to an aspect of the present invention is the above-described communication system. The path loss reference resource includes an index associated with an index determined by a third reference signal configuration.

(44) In addition, a communication system according to an aspect of the present invention is the above-described communication system. The path loss reference resource is independently configured for each of the uplink physical channels.

(45) In addition, a communication system according to an aspect of the present invention is the above-described communication system. Only a first path loss reference resource is configured for each of the uplink physical channels.

(46) In addition, a communication system according to an aspect of the present invention is the above-described communication system. A first path loss reference resource and a second path loss reference resource are configured for at least part of the uplink physical channels.

(47) In addition, a base station apparatus according to an aspect of the present invention is a base station apparatus that communicates with a terminal apparatus. The base station apparatus includes a base station apparatus radio resource control unit that configures a plurality of uplink power control channels, a transmission power setting unit that configures an uplink power control-related parameter for each of the plurality of uplink physical channels, and a higher layer processing unit that transmits a radio resource control (RRC) signal including configuration information regarding the uplink physical channels and/or information regarding the uplink power control-related parameters to the terminal apparatus.

(48) In addition, a communication method according to an aspect of the present invention is a communication method used between a base station apparatus and a terminal apparatus. The method comprising the steps of configuring, using the base station apparatus, an uplink power control-related parameter for each of a plurality of uplink physical channels and transmitting a radio resource control (RRC) signal including information regarding the uplink power control-related parameters to the terminal apparatus, and configuring, using the terminal apparatus, the uplink power control-related parameter for each of the uplink physical channels, setting transmission power of the uplink physical channels on the basis of the uplink power control-related parameters, and transmitting the uplink physical channels with the transmission power.

As a result, the base station apparatus can perform appropriate uplink transmission power control on the terminal apparatus.

Advantageous Effects of Invention

According to the present invention, a terminal apparatus can set appropriate uplink transmission power in a communication system in which a base station apparatus and the terminal apparatus communicate with each other.

BRIEF DESCRIPTION OF DRAWINGS

FIG. 19 is a diagram illustrating details of measurement reports.

FIG. 20 is a diagram illustrating details of an EUTRA measurement result list.

FIG. 21 is a diagram illustrating details of a second measurement report.

FIG. 22 is a diagram illustrating an example of details of an uplink power control-related parameter configuration.

FIG. 29 is a diagram illustrating an example of a second uplink power control-related cell-specific parameter configuration.

FIG. 30 is a diagram illustrating an example of a first uplink power control-related terminal-specific parameter configuration and a second uplink power control-related terminal-specific parameter configuration.

FIG. 31 is a diagram illustrating an example of a path loss reference resource.

DESCRIPTION OF EMBODIMENTS

First Embodiment

A first embodiment of the present invention will be described hereinafter. A communication system according to the first embodiment includes a macro base station apparatus (a base station apparatus, a transmission device, a cell, a transmission point, a transmission antenna group, a transmission antenna port group, a reception antenna port group, a reception point, a component carrier, an eNodeB, a transmission point, a reception point, a point, a transmission and reception point, or a reference point), an RRH (remote radio head; a remote antenna, a distributed antenna, a base station apparatus, a transmission device, a cell, a transmission point, a transmission antenna group, a transmission antenna port group, a reception point, a component carrier, an eNodeB, a transmission point, a reception point, a point, a transmission and reception point, or a reference point), and a terminal apparatus (a terminal apparatus device, a mobile terminal apparatus, a mobile station, a reception point, a reception terminal apparatus, a reception device, a third communication device, a transmission antenna port group, a transmission point, a reception antenna group, a reception antenna port group, UE, a transmission point, a reception point, a point, or a transmission and reception point). In downlink communication, the macro base station apparatus and the RRH serve as transmission points (TPs), and the terminal apparatus serves as a reception point (RP). In addition, in uplink communication, the macro base station apparatus and the RRH serve as reception points, and the terminal apparatus serves as a transmission point. In addition, a downlink transmission point and an uplink reception point can serve as path loss reference points (reference points) for downlink path loss measurement. Alternatively, a reference point for path loss measurement can be configured independently of transmission points and reception points. In addition, a base station apparatus 101, an RRH 103, a downlink transmission point, and an uplink reception point connected to a terminal apparatus 102 might be generally referred to as reference points.

Figure 1:
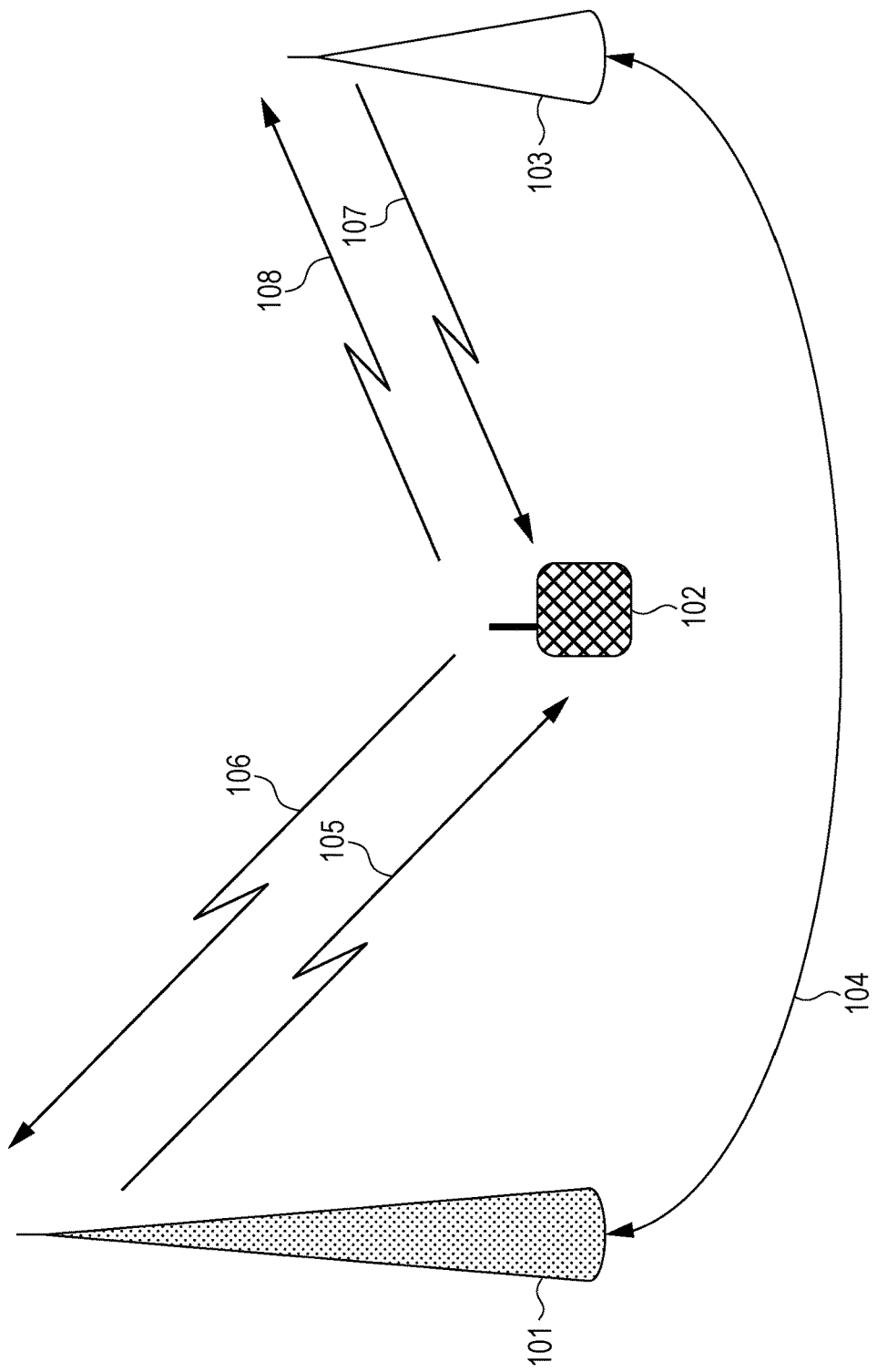
FIG. 1 is a schematic diagram illustrating a communication system that performs data transmission according to a first embodiment of the present invention.

FIG. 1 is a schematic diagram illustrating a communication system that performs data transmission according to the first embodiment of the present invention. In FIG. 1, the base station apparatus (macro base station apparatus) 101 transmits and receives control information and information data through a downlink 105 and an uplink 106 in order to perform data communication with the terminal apparatus 102. Similarly, the RRH 103 transmits and receives control information and information data through a downlink 107 and an uplink 108 in order to perform data communication with the terminal apparatus 102. As a line 104, a wired line such as an optical fiber or a wireless line that uses a relay technology may be used. At this time, total spectral efficiency (transmission capacity) in the area of coverage built by the base station apparatus 101 can be improved if the macro base station apparatus 101 and the RRH 103 use similar or exactly the same frequencies (resources). Such a network constructed by using the same frequencies between neighboring stations (for example, between a macro base station apparatus and an RRH) is referred to as a single-frequency network (SFN).

In addition, in FIG. 1, the base station apparatus 101 transmits a cell ID, which is used for a cell-specific reference signal (CRS) or a terminal-specific reference signal (a DL DMRS; downlink demodulation reference signal or a UE-RS; UE-specific reference signal), which will be described later. In addition, the RRH 103, too, can transmit a cell ID. The cell ID transmitted from the RRH 103 may be the same as that transmitted from the base station apparatus 101, or may be different from that transmitted from the base station apparatus 101. It is to be noted that the base station apparatus 101 that will be described hereinafter might refer to the base station apparatus 101 and the RRH 103 illustrated in FIG. 1. It is to be noted that the following description of the base station apparatus 101 and the RRH 103 may refer to macro base station apparatuses or RRHs, instead.

Figure 2:
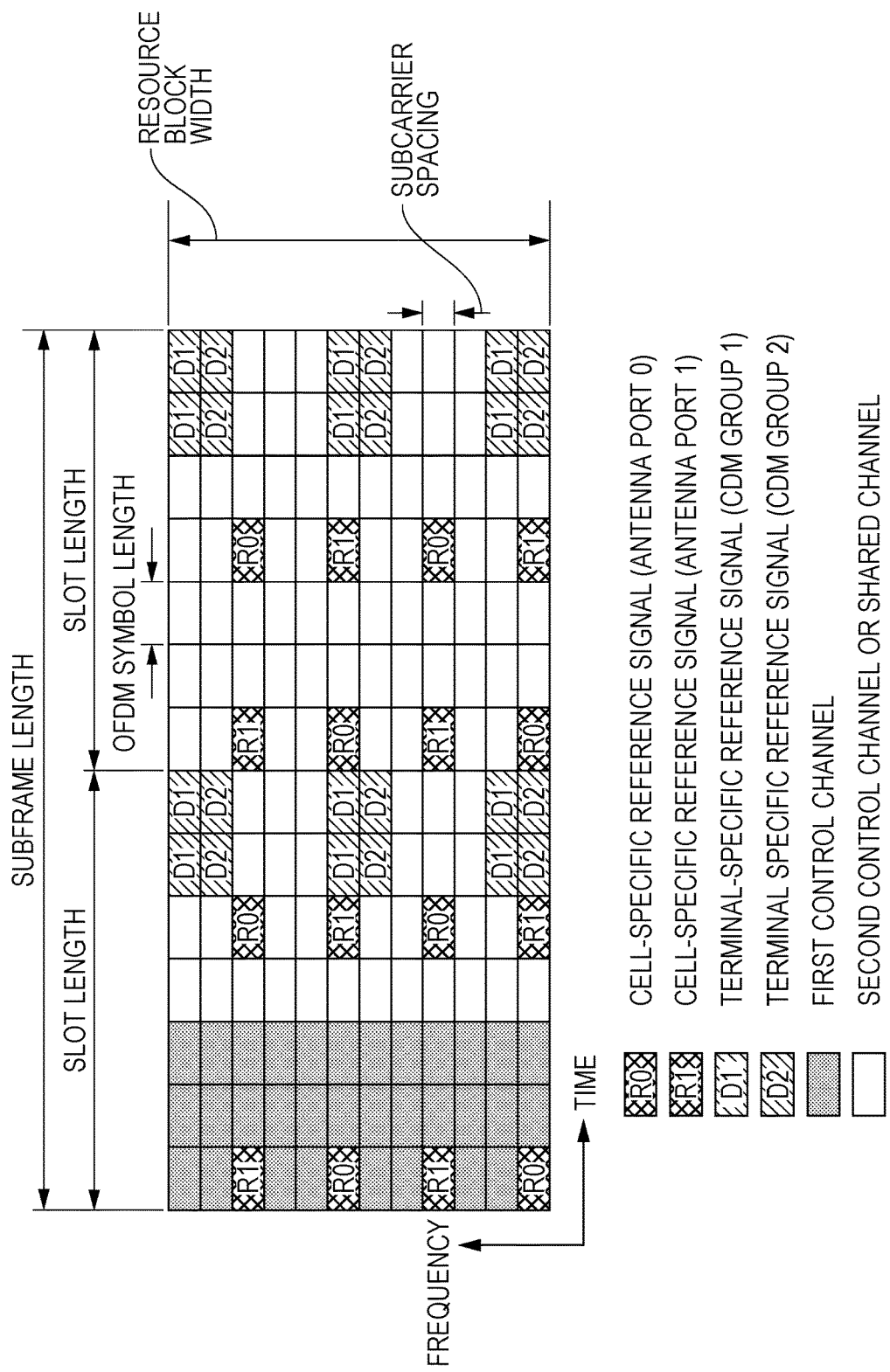
FIG. 2 is a diagram illustrating an example of a resource block pair mapped by a base station apparatus 101.

FIG. 2 is a diagram illustrating an example of a resource block pair mapped by the base station apparatus 101 and/or the RRH 103 through the downlink 105 or the downlink 107, respectively. FIG. 2 illustrates two resource blocks (resource block pair), and each resource block is configured by twelve subcarriers in a frequency domain and seven OFDM symbols in a time domain. In one OFDM symbol, each subcarrier is referred to as a resource element (RE). Resource block pairs are arranged in the frequency domain, and the number of resource block pairs may be configured for each base station apparatus 101. In other words, cell-specific reference signals can be transmitted at least one of Antenna Ports 0 to 3.

For example, the number of resource block pairs may be 6 to 110. The width of the frequency domain at this time is referred to as a system bandwidth. In addition, the time domain of the resource block pairs is referred to as subframes. In each subframe, seven continuous OFDM symbols in the time domain are referred to as a slot. In addition, in the following description, resource block pairs will also be simply referred to as resource blocks (RBs).

Among hatched resource elements, R0 and R1 indicate cell-specific reference signals (CRSs) for Antenna Ports 0 and 1, respectively. Here, the cell-specific reference signals illustrated in FIG. 2 assume a case in which two antenna ports are used, but the number of antenna ports may be changed. For example, cell-specific reference signals for one antenna port or four antenna ports may be mapped. In addition, cell-specific reference signals may be configured for four antenna ports (Antenna Ports 0 to 3) at maximum.

In addition, the base station apparatus 101 and the RRH 103 might assign R0 and R1 to different resource elements, or might assign R0 and R1 to the same resource elements. For example, when the base station apparatus 101 and the RRH 103 assign R0 and R1 to different resource elements and/or different signal sequences, the terminal apparatus 102 can individually calculate the received power (received signal power) of the base station apparatus 101 and the RRH 103 using the cell-specific reference signals. In particular, when cell IDs transmitted from the base station apparatus 101 and the RRH 103 are different, the above-described configuration is possible. In another example, only the base station apparatus 101 assigns R0 and R1 to some resource elements and the RRH 103 does not assign R0 and R1 to any resource elements. In this case, the terminal apparatus 102 can calculate the received power of the macro base station apparatus 101 using the cell-specific reference signals.

In particular, when a cell ID is transmitted only from the base station apparatus 101, the above-described configuration is possible. In another example, when the base station apparatus 101 and the RRH 103 have assigned R0 and R1 to the same resource elements and the same sequences have been transmitted from the base station apparatus 101 and the RRH 103, the terminal apparatus 102 can calculate combined received power using the cell-specific reference signals. In particular, when cell IDs transmitted from the base station apparatus 101 and the RRH 103 are the same, the above-described configuration is possible.

It is to be noted that in the description of the embodiments of the present invention, for example, obtaining of power includes obtaining of a value of power, calculation of power includes calculation of a value of power, setting of power includes setting of a value of power, configuration of a power includes configuration of a value of power, measurement of power includes measurement of a value of power, and reporting of power includes reporting of a value of power. Thus, the term "power" refers to a value of power as necessary.

Among the hatched resource elements, D1 and D2 indicate terminal-specific reference signals (DL DMRSs or UE-RSs) in CDM (code-division multiplexing) Group 1 and CDM Group 2, respectively. In addition, the terminal-specific reference signals in CDM Group 1 and CDM Group 2 are subjected to CDM using orthogonal codes such as Walsh codes. In addition, the terminal-specific reference signals in CDM Group 1 and CDM Group 2 are subjected to frequency-division multiplexing (FDM). Here, the base station apparatus 101 can map a maximum of eight ranks of terminal-specific reference signals using eight antenna ports (Antenna Ports 7 to 14) in accordance with control signals and data signals mapped in the resource block pair. In addition, the base station apparatus 101 can change a spreading code length of CDM and the number of resource elements mapped in accordance with the number of ranks of terminal-specific reference signals mapped.

For example, terminal-specific reference signals when the number of ranks is 1 or 2 are configured as Antenna Ports 7 and 8 by a spreading code length of two chips, and mapped in CDM Group 1. Terminal-specific reference signals when the number of ranks is 3 or 4 are configured, in addition to Antenna Ports 7 and 8, as Antenna Ports 9 and 10 by a spreading code length of two chips, and mapped in CDM Group 2. Terminal-specific reference signals when the number of ranks is 5 to 8 are configured as Antenna Ports 7 to 14 by a spreading code length of four chips, and mapped in CDM Group 1 and CDM Group 2.

In addition, in terminal-specific reference signals, a scrambling code is further superimposed upon an orthogonal code corresponding to each antenna port. The scrambling code is generated on the basis of a cell ID and a scrambling ID transmitted from the base station apparatus 101. For example, the scrambling code is generated from a pseudo-noise sequence generated on the basis of the cell ID and the scrambling ID transmitted from the base station apparatus 101. For example, the scrambling ID is a value indicating 0 or 1. In addition, information indicating a scrambling ID and an antenna port to be used may be subjected to joint coding and represented as an index.

Among the hatched resource elements illustrated in FIG. 2, a region configured by first to third OFDM symbols is configured as a region in which first control channels (PDCCHs; physical downlink control channels) are arranged. In addition, the base station apparatus 101 can set the number of OFDM symbols for each subframe in the region in which the first control channel is arranged. In addition, a region configured by white resource elements indicates a region in which second control channels (X-PDCCHs) or shared channels (PDSCHs; physical downlink shared channels) (physical data channels) are arranged. In addition, the base station apparatus 101 may configure the region in which the second control channels or the shared channels are arranged for each resource block pair. In addition, the number of ranks of control signals mapped in the second control channels, the number of ranks of data signals mapped in the shared channels, and the number of ranks of control signals mapped in the first control channels can be set to different values.

Here, the number of resource blocks can be changed in accordance with a frequency bandwidth (system bandwidth) used by the communication system. For example, the base station apparatus 101 may use six to one hundred and ten resource blocks in a system band, and the unit is referred to as a component carrier (or carrier component; CC). Furthermore, the base station apparatus 101 may configure a plurality of component carriers for the terminal apparatus 102 through frequency aggregation (carrier aggregation). For example, the base station apparatus 101 can establish a total bandwidth of 100 MHz that can be used by the communication system by configuring, for the terminal apparatus 102, a component carrier using 20 MHz and configuring five contiguous or noncontiguous component carriers in the frequency domain.

Here, control information is subjected to a modulation process, an error correction coding process, and the like using a certain modulation method and a coding method, and a control signal is generated. The control signal is transmitted and received through the first control channel (first physical control channel) or the second control channel (second physical control channel) different from the first control channel. However, the physical control channels herein refer to those of a certain type, and are control channels specified in physical frames.

It is to be noted that from a certain perspective, the first control channel is a physical control channel that uses the same transmission port (also referred to as an antenna port) as the cell-specific reference signals. In addition, the second control channels are physical control channels that use the same transmission port as the terminal-specific reference signals. The terminal apparatus 102 demodulates control signals mapped in the first control channels using the cell-specific reference signals and control signals mapped in the second control channels using the terminal-specific reference signals. Because the cell-specific reference signals are reference signals shared by all terminal apparatuses 102 in a cell and inserted into all the resource blocks in the system band, the cell-specific reference signals are reference signals used by any terminal apparatus 102. Therefore, the first control channels can be demodulated by any terminal apparatus 102. On the other hand, the terminal-specific reference signals are reference signals inserted only into assigned resource blocks, and can be adaptively subjected to a beamforming process as with data signals. Therefore, in the second control channels, adaptive beamforming gain can be obtained. It is to be noted that the first control channels might also be referred to as physical downlink control channels (PDCCHs). The second control channels can also be referred to as enhanced PDCCHs (E-PDCCHs).

In addition, from a different perspective, the first control channels are physical control channels in the OFDM symbols located at tops of physical subframes, and can be arranged in the OFDM symbols over the entirety of the system bandwidth (component carrier (CC)). On the other hand, the second control channels are physical control channels in the OFDM symbols located after the first control channels in the physical subframe, and can be arranged in the OFDM symbols over part of the system bandwidth. Since the first control channels are arranged in the OFDM symbols dedicated to control channels located at the tops of the physical subframes, the first control channels can be received and demodulated prior to OFDM symbols for physical data channels located later.

In addition, a terminal apparatus 102 that checks (monitors) only the OFDM symbols dedicated to the control channels can receive the first control channels. In addition, since resources used for the first control channels can be arranged over the entirety of the CC, inter-cell interference of the first control channels can be randomized. On the other hand, the second control channels are arranged in later OFDM symbols for shared channels (physical data channels) normally received by a terminal apparatus 102 with which communication is being performed. In addition, the base station apparatus 101 can perform orthogonal multiplexing (multiplexing without interference) on the second control channels or a second control channel and a physical data channel by performing frequency-division multiplexing on the second control channel(s).

In addition, from a different perspective, the first control channels are cell-specific physical control channels, and are physical channels that can be obtained by both a terminal apparatus 102 in an idle mode (standby mode, dormant mode, non-connected mode, or non-access mode) and a terminal apparatus 102 in a connected mode (connection mode or access mode). In addition, the second control channels are terminal-specific physical control channels, and are physical channels that can be obtained only by a terminal apparatus 102 in the connected mode. Here, the idle mode refers to a mode in which data is not transmitted or received immediately such as a mode (RRC_IDLE mode) in which the base station apparatus 101 is not accumulating information regarding RRC (radio resource control). On the other hand, the connected mode refers to a mode in which data can be immediately transmitted or received such as a mode (RRC_CONNECTED mode) in which the terminal apparatus 102 sets information regarding a network.

The first control channels are channels that can be received by the terminal apparatus 102 without depending on terminal-specific RRC signaling (RRC signals, or dedicated signals). The second control channels are channels configured by terminal-specific RRC signaling, and are channels that can be received by the terminal apparatus 102 through the terminal-specific RRC signaling. That is, the first control channels are channels that can be received by any terminal apparatus because of predetermined configurations, and the second control channels are terminal-specific channels whose configurations can be easily changed.

Figure 3:
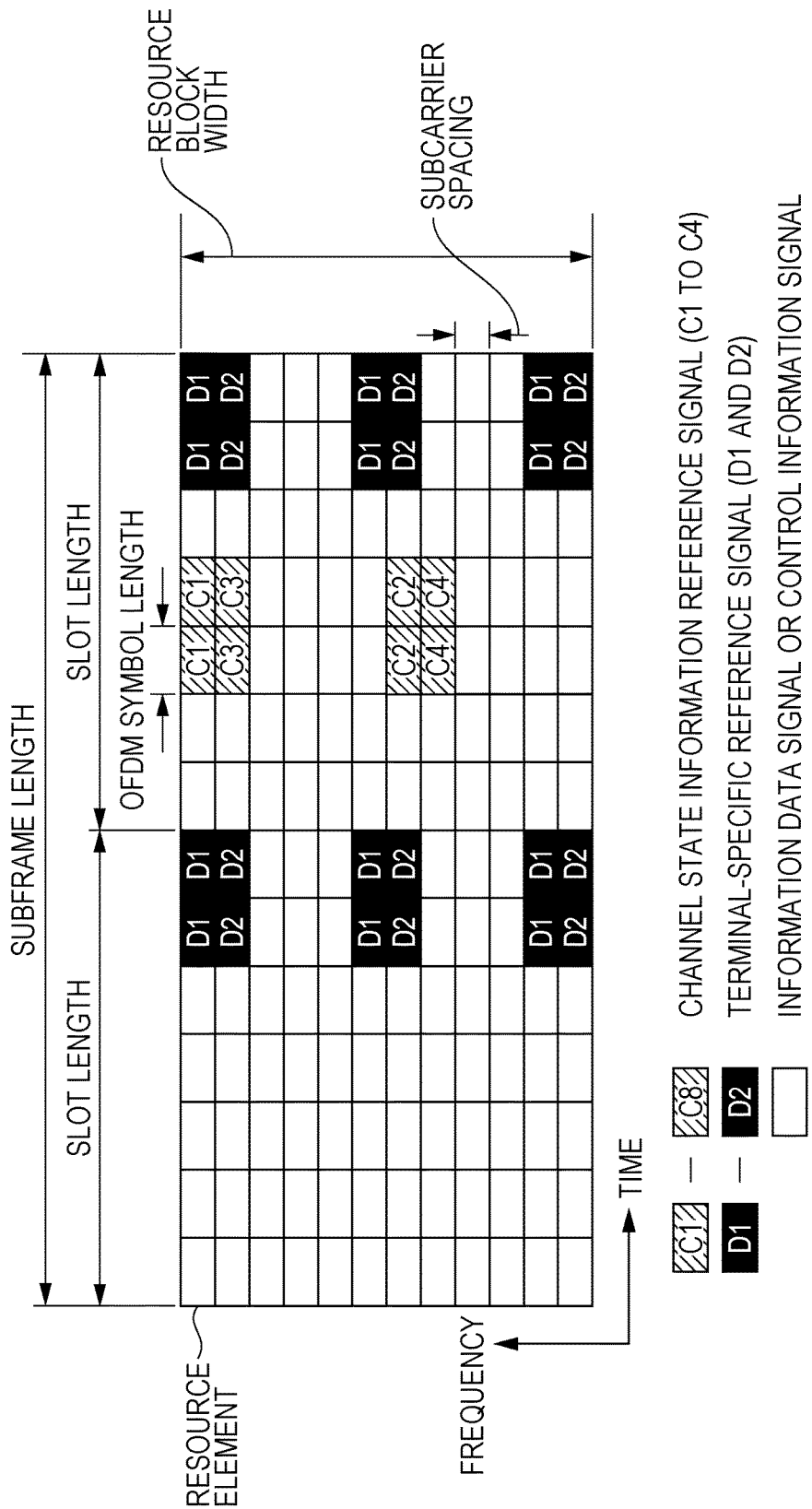
FIG. 3 is a diagram illustrating another example of the resource block pair mapped by the base station apparatus 101.

FIG. 3 is a diagram illustrating a resource block pair in which channel state information reference signals (CSI-RSs) for eight antenna ports are mapped. FIG. 3 illustrates a case in which channel state information reference signals are mapped when the number of antenna ports (number of CSI ports) of the base station apparatus is eight. In addition, FIG. 3 illustrates two resource blocks in one subframe.

Among black or hatched resource elements illustrated in FIG. 3, terminal-specific reference signals (data signal demodulation reference signals) of CDM Group Numbers 1 and 2 are indicated by D1 and D2, respectively, and channel state information reference signals of CDM Group Numbers 1 to 4 are indicated by C1 to C4, respectively. Furthermore, data signals or control signals are mapped in resource elements other than the resource elements in which these reference signals are mapped.

Orthogonal codes (Walsh codes) of two chips are used for the channel state information reference signals in each CDM group, and a CSI port (port for the channel state information reference signals (antenna port or resource grid)) is assigned to each orthogonal code. Code-division multiplexing (CDM) is performed for every two CSI ports. Furthermore, each CDM group is subjected to frequency-division multiplexing. The channel state information reference signals for eight antenna ports, namely CSI Ports 1 to 8 (Antenna Ports 15 to 22), are mapped using four CDM groups. For example, in CDM Group C1 for the channel state information reference signals, the channel state information reference signals for CSI Ports 1 and 2 (Antenna Ports 15 and 16) are subjected to CDM and mapped. In CDM Group C2 for the channel state information reference signals, the channel state information reference signals for CSI Ports 3 and 4 (Antenna Ports 17 and 18) are subjected to CDM and mapped. In CDM Group C3 for the channel state information reference signals, the channel state information reference signals for CSI Ports 5 and 6 (Antenna Ports 19 and 20) are subjected to CDM and mapped. In CDM Group C4 for the channel state information reference signals, the channel state information reference signals for CSI Ports 7 and 8 (Antenna Ports 21 and 22) are subjected to CDM and mapped.

When the number of antenna ports of the base station apparatus 101 is eight, the base station apparatus 101 can set the number of layers (the number of ranks, a spatial multiplexing number, or the number of DMRS ports) of data signals or control signals to eight at maximum. For example, the base station apparatus 101 can set the number of layers of data signals to two and the number of layers of control signals to one. Orthogonal codes of two chips or four chips are used for the terminal-specific reference signals (DL DMRSs or UE-RSs) in each CDM group in accordance with the number of layers, and CDM is performed for every two layers or four layers. Furthermore, each CDM group for the terminal-specific reference signals is subjected to frequency-division multiplexing. The eight layers of terminal-specific reference signals for DMRS Ports 1 to 8 (Antenna Ports 7 to 14) are mapped using two CDM groups.

In addition, the base station apparatus 101 can transmit channel state information reference signals at a time when the number of antenna ports is one, two, or four. The base station apparatus 101 can transmit channel state information reference signals for one antenna port or two antenna ports using CDM Group C1 for the channel state information reference signals illustrated in FIG. 3. The base station apparatus 101 can transmit channel state information reference signals for four antenna ports using CDM Groups C1 and C2 for the channel state information reference signals illustrated in FIG. 3.

In addition, the base station apparatus 101 and the RRH 103 might assign different resource elements to one of C1 to C4, or might assign the same resource elements to one of C1 to C4. For example, when the base station apparatus 101 and the RRH 103 have assigned different resource elements and/or different signal sequences to one of C1 to C4, the terminal apparatus 102 can individually calculate the received power (received signal power) and the channel states of the base station apparatus 101 and the RRH 103 using the channel state information reference signals. In another example, when the base station apparatus 101 and the RRH 103 have assigned the same resource elements to one of C1 to C4 and the same sequences have been transmitted from the base station apparatus 101 and the RRH 103, the terminal apparatus 102 can calculate received power combined using the channel state information reference signals.

Figure 4:
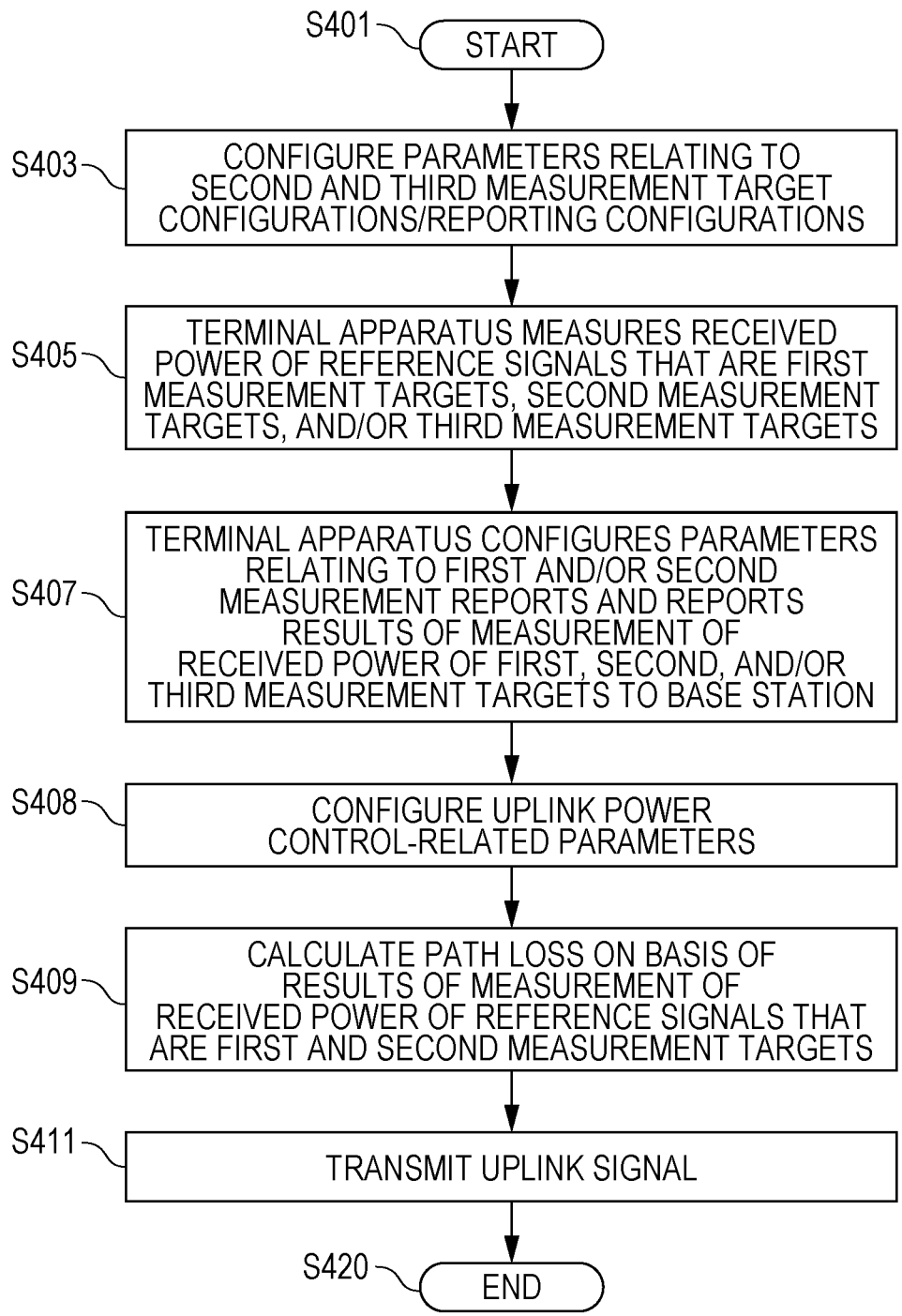
FIG. 4 is a flowchart illustrating details of a process for transmitting an uplink signal performed by a terminal apparatus according to the first embodiment of the present invention.

Next, a flowchart of FIG. 4 illustrates a situation in which the terminal apparatus 102 measures the reference signals (cell-specific reference signals and channel state information reference signals), reports received power to the base station apparatus 101, calculates a path loss on the basis of a result of the measurement, calculates uplink transmission power on the basis of the calculated path loss, and transmits an uplink signal with the calculated uplink transmission power. In step S403, the base station apparatus 101 configures parameters of the terminal apparatus 102 relating to measurement and reporting of the reference signals. Parameters relating to a second measurement target configuration, a second reporting configuration, a third measurement target configuration, and a third reporting configuration can be configured in step S403. It is to be noted that the cell-specific reference signals and the channel state information reference signals are a type of downlink reference signal. Although not illustrated, a first measurement target configuration is configured in the terminal apparatus 102 in advance, and measurement targets (first measurement targets) configured by the first measurement target configuration can always be cell-specific reference signals transmitted from Antenna Port 0 or cell-specific reference signals transmitted Antenna Ports 0 and 1. That is, in the first measurement target configuration, particular predetermined reference signals and antenna ports can be determined as targets.

On the other hand, the second measurement target configuration configured by the base station apparatus 101 determines channel state information reference signals as targets, and resources (antenna ports) to be measured can be configured. In addition, the number of resources that become second measurement targets may be one or more. Details of the parameters will be described later. In addition, the third measurement target configuration configured by the base station apparatus 101 can include, as described later, a configuration for measurement of reference signals transmitted from an unconnected cell. For example, reference signals that become measurement targets (third measurement targets) in the third measurement target configuration can always be cell-specific reference signals transmitted from Antenna Port 0 or cell-specific reference signals transmitted from Antenna Port 0 and Antenna Port 1. That is, particular predetermined reference signals from an unconnected cell and a particular antenna port can be determined as targets. It is to be noted that an unconnected cell herein refers to a cell for which parameters have not been configured through RRC.

Figure 15:
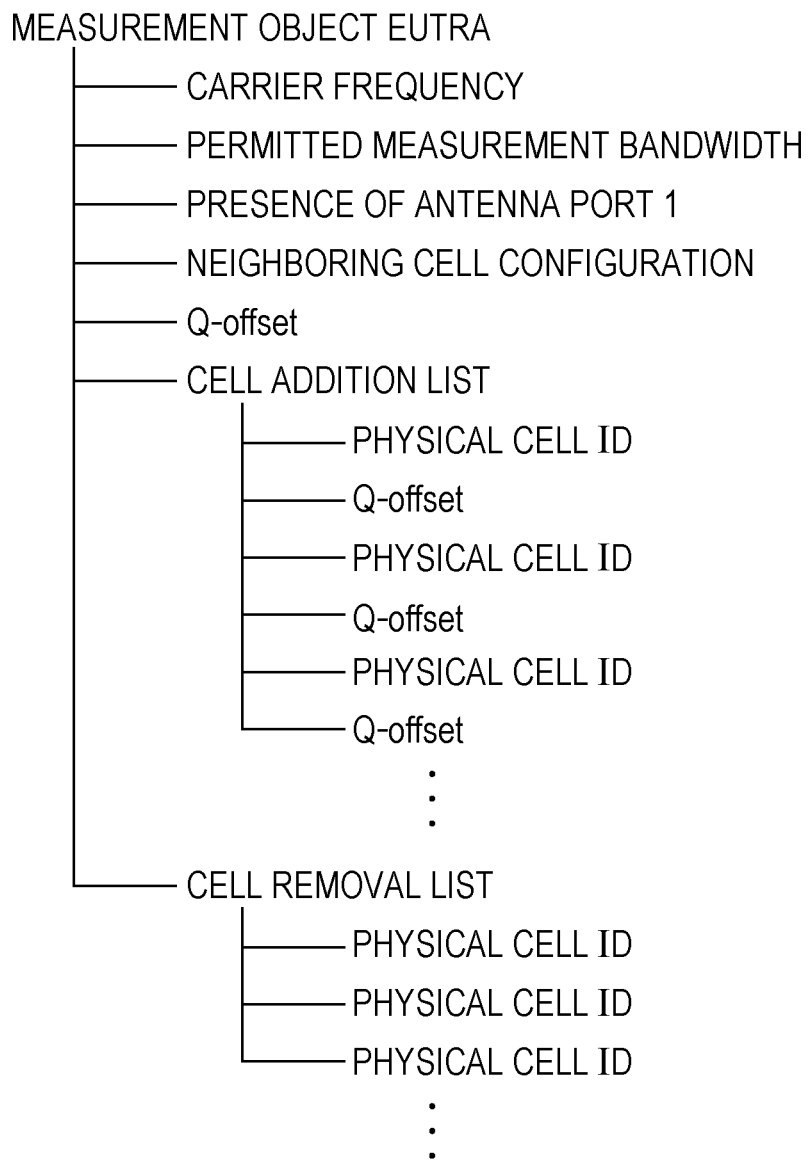
FIG. 15 is a diagram illustrating details of a measurement object EUTRA.

In addition, from another perspective, cell-specific reference signals transmitted from an unconnected cell can be generated using a different physical ID (physical cell ID) from one for cell-specific reference signals transmitted from a connected cell. Here, the terminal apparatus 102 can measure the received signal power of the cell-specific reference signals transmitted from an unconnected cell (cell for which RRC parameters have not been configured) when the base station apparatus 101 has transmitted a physical ID (physical cell ID), a carrier frequency (central frequency), or the like to the terminal apparatus 102 using the third measurement target configuration (refer to FIG. 15). In addition, the second reporting configuration and the third reporting configuration include a configuration relating to a timing at which the terminal apparatus 102 transmits an event that serves as a trigger in a measurement report of a result of the measurement.

Next, step S405 will be described. In step S405, when the above-described first measurement target configuration has been performed, the terminal apparatus 102 measures the received power of the reference signals that are the first measurement targets configured in the first measurement target configuration, and when the above-described second measurement target configuration has been performed, the terminal apparatus 102 measures the received power of the reference signals that are the second measurement targets configured in the second measurement target configuration. In addition, when the third measurement target configuration has been performed, the terminal apparatus 102 measures the received power of the reference signals that are the third measurement targets configured in the third measurement target configuration. Next, step S407 will be described. Parameters relating to a first measurement report and/or a second measurement report can be configured in step S407.

Here, the first measurement report can be related to the received signal power of the measurement targets configured in the above-described first measurement target configuration and/or the third measurement target configuration. On the other hand, the second measurement report can be related to the received signal power of the measurement targets configured in the above-described second measurement target configuration.

In addition, the above-described second measurement report is associated with one or a plurality of results of the measurement of the reference signal received power (RSRP) of the reference signals that are the second measurement targets configured in the second measurement target configuration. It is to be noted that in the above-described second measurement report, information regarding a resource whose result of the measurement is determined as a reporting target among the second measurement targets can be configured. In order to determine the result of the measurement of a resource as a reporting target, information regarding the resource may be transmitted using an index relating to CSI Ports 1 to 8 (Antenna Ports 15 to 22), or may be transmitted using an index relating to a frequency-time resource. As a result, in step S407, when the above-described first measurement report has been configured, results of the measurement of the received power of the reference signals that are the first measurement targets and/or the third measurement targets configured in the first measurement target configuration and/or the third measurement target configuration are reported, and when the second measurement report has been configured, at least one of the one or more results of the measurement of the received power of the reference signals that are the second measurement targets configured in the second measurement target configuration is reported. It is to be noted that, as described above, information regarding a resource whose result of the measurement is determined as a reporting target among the second measurement targets can be configured in the second measurement report.

Next, step S408 will be described. In step S408, uplink power control-related parameters (UplinkPowerControl, a TPC command, and the like) can be configured. These parameters can include a parameter configuration for using either a first path loss based on the received signal power measured and reported by the first measurement target configuration and the first measurement report or a second path loss based on the received signal power measured and reported by the second measurement target configuration and the second measurement report as a path loss used for setting the uplink transmission power. Details of these parameters will be described later.

Next, step S409 will be described. In step S409, the uplink transmission power is calculated. When the uplink transmission power is to be set, a downlink path loss between the base station apparatus 101 (or the RRH 103) and the terminal apparatus 102 is used, and this downlink path loss is calculated from the received signal power of the cell-specific reference signals measured in step S405, that is, the results of the measurement of the first measurement targets, or the received signal power of the channel state information reference signals, that is, the results of the measurement of the second measurement targets. It is to be noted that because the transmission power of the reference signals is necessary to calculate the path loss, the above-described second measurement target configuration can include information regarding the transmission power of the reference signals.

Therefore, the terminal apparatus 102 sets the first path loss obtained on the basis of the received power of the reference signals that are the first measurement targets configured in the first measurement target configuration and the second path loss obtained on the basis of the received power of the reference signals that are the second measurement targets configured in the second measurement target configuration. The terminal apparatus 102 calculates the uplink transmission power using either the first or second path loss in accordance with the uplink power control-related parameter configuration configured in step S403. Next, step S411 will be described. In step S411, an uplink signal is transmitted on the basis of the value of transmission power obtained in step S409.

Figure 5:
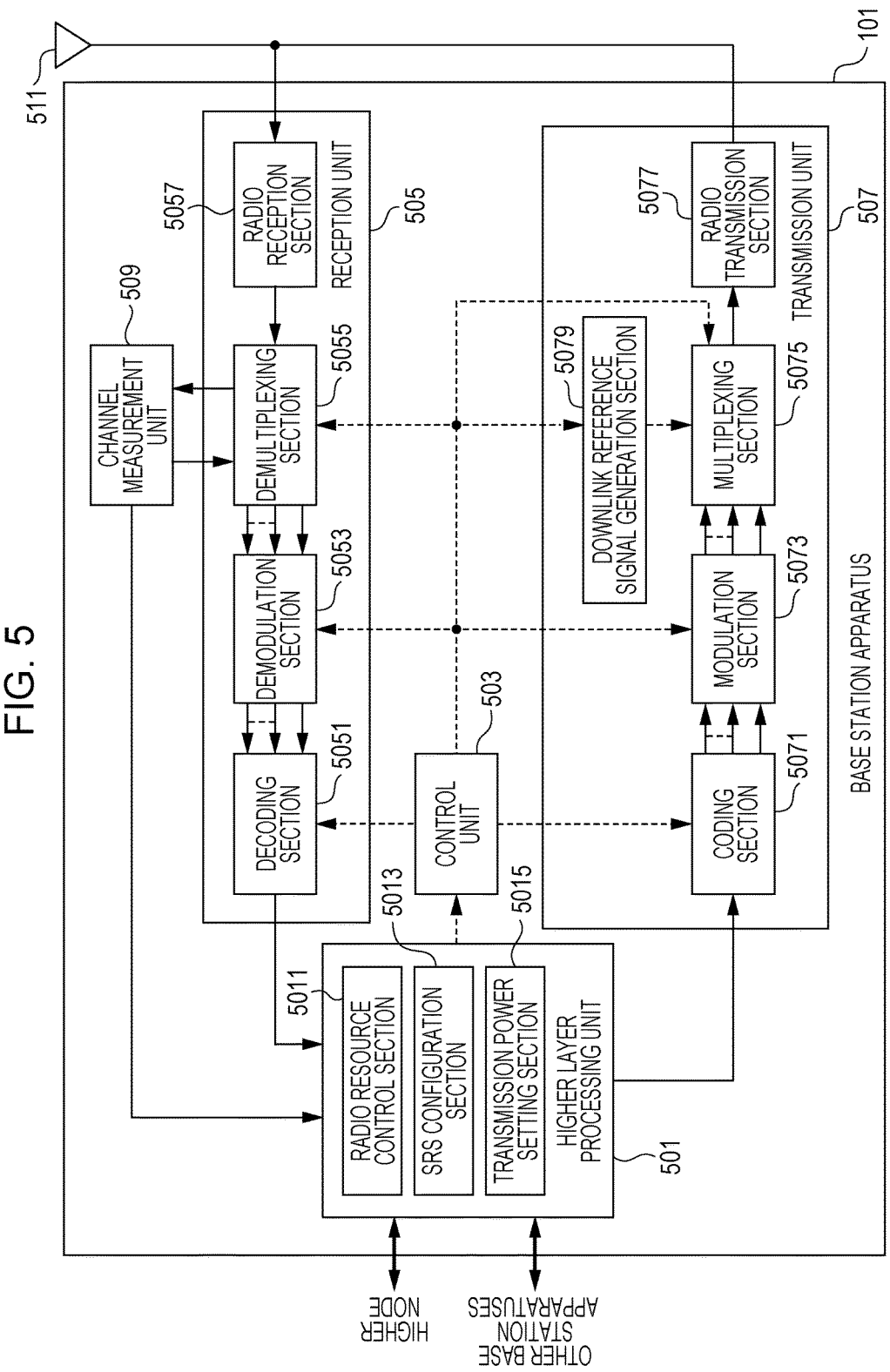
FIG. 5 is a schematic block diagram illustrating the configuration of the base station apparatus 101 according to the first embodiment of the present invention.

FIG. 5 is a schematic block diagram illustrating the configuration of the base station apparatus 101 in the present invention. As illustrated in the figure, the base station apparatus 101 is configured by including a higher layer processing unit 501, a control unit 503, a reception unit 505, a transmission unit 507, a channel measurement unit 509, and a transmission and reception antenna 511. In addition, the higher layer processing unit 501 is configured by including a radio resource control section (base station apparatus radio resource control section) 5011, an SRS configuration section 5013, and a transmission power setting section 5015. In addition, the reception unit 505 is configured by including a decoding section 5051, a demodulation section 5053, a demultiplexing section 5055, and a radio reception section 5057. In addition, the transmission unit 507 is configured by including a coding section 5071, a modulation section 5073, a multiplexing section 5075, a radio transmission section 5077, and a downlink reference signal generation section 5079.

The higher layer processing unit 501 performs processing in a Packet Data Convergence Protocol (PDCP) layer, a Radio Link Control layer, and a Radio Resource Control (RRC) layer.

The radio resource control section 5011 included in the higher layer processing unit 501 generates information to be arranged in each downlink channel or obtains the information from a higher node, and outputs the information to the transmission unit 507. In addition, the radio resource control section 5011 assigns, from among uplink radio resources, radio resources in which the terminal apparatus 102 is to arrange physical uplink shared channels (PUSCHs), which are uplink data information. In addition, the radio resource control section 5011 determines, from among downlink radio resources, radio resources in which the physical downlink shared channels (PDSCHs), which are downlink data information, are to be arranged. The radio resource control section 5011 generates downlink control information indicating the assignment of the radio resources, and transmits the downlink control information to the terminal apparatus 102 through the transmission unit 507. When assigning radio resources in which the PUSCHs are to be arranged, the radio resource control section 5011 first assigns radio resources whose channel quality is high on the basis of results of measurement of uplink channels input from the channel measurement unit 509. Here, various formats of the downlink control information are formed in accordance with usage. It is to be noted that a downlink control information format used for performing scheduling of the PUSCHs and transmission power control will also be referred to as an uplink grant. In addition, a downlink control information format used for performing the scheduling of the PDSCHs and transmission power control of the PUCCHs will also be referred to as a downlink grant (downlink assignment). In addition, these downlink control information formats are transmitted from the base station apparatus to the terminal apparatus using physical downlink control channels. In addition, there is also a downlink control information format in which a plurality of terminal apparatuses can be controlled using transmission power control commands for the PUSCHs and the PUCCHs.

In order to control the reception unit 505 and the transmission unit 507, the higher layer processing unit 501 generates control information on the basis of uplink control information (UCI) transmitted from the terminal apparatus 102 using physical uplink control channels (PUCCHs), the modes of buffers transmitted from the terminal apparatus 102, and various pieces of configuration information regarding the terminal apparatus 102 configured by the radio resource control section 5011, and outputs the control information to the control unit 503. It is to be noted that the UCI includes at least any of Ack/Nack, channel quality information (CQI), and a scheduling request (SR).

The SRS configuration section 5013 configures a sounding subframe, which is a subframe whose radio resources are reserved in order for the terminal apparatus 102 to transmit sounding reference signals (SRSs), and a bandwidth of the radio resources in the sounding subframe reserved to transmit the SRSs. The SRS configuration section 5013 then generates information regarding the configuration as system information, and broadcasts the system information through the transmission unit 507 using the PDSCH. In addition, the SRS configuration section 5013 configures, for each terminal apparatus 102, a subframe and a frequency band for periodically transmitting a periodic SRS (P-SRS) and the amount of cyclic shift used for CAZAC (constant amplitude zero auto-correlation) sequences of the periodic SRS. The SRS configuration section 5013 then generates a signal including information regarding the configuration as a radio resource control (RRC) signal, and transmits the radio resource control signal to each terminal apparatus 102 through the transmission unit 507 using the PDSCH.

In addition, the SRS configuration section 5013 configures, for each terminal apparatus 102, a frequency band for transmitting an aperiodic SRS (A-SRS) and the amount of cyclic shift used for CAZAC sequences of the aperiodic SRS. The SRS configuration section 5013 then generates a signal including information regarding the configuration as a radio resource control signal, and transmits the radio resource control signal to each terminal apparatus 102 using the PDSCH. In addition, when requesting the terminal apparatus 102 to transmit the aperiodic SRS, the SRS configuration section 5013 generates an SRS request indicating that the SRS configuration section 5103 is requesting the terminal apparatus 102 to transmit the aperiodic SRS, and transmits the SRS request to the terminal apparatus 102 through the transmission unit 507 using the PDCCH. It is to be noted that the SRS request is included in the downlink control information format (DCI format), and the DCI format is transmitted to the terminal apparatus 102 using the PDCCH.

In addition, the DCI format including the SRS request may be an uplink grant or a downlink assignment. A plurality of types of DCI format are prepared, and the SRS request is included in at least one of the plurality of types of DCI format. For example, the SRS request may be included in DCI Format 0, which is an uplink grant. Alternatively, the SRS request may be included in DCI Format 1A, which is a downlink assignment. Alternatively, the SRS request may be included in DCI Format 4, which is an uplink grant for MIMO. In addition, an SRS request applied only to TDD may be included in DCI Format 2B or 2C for DL MIMO. Alternatively, the SRS request may be controlled using 1-bit information. That is, whether or not to transmit the aperiodic SRS (A-SRS) can be controlled using 1-bit information. For example, when the base station apparatus 101 has set the SRS request to "0", the terminal apparatus 102 may be controlled in such a way as not to transmit the A-SRS, and when the base station apparatus 101 has set the SRS request to "1", the terminal apparatus 102 is controlled in such a way as to transmit the A-SRS. Alternatively, the SRS request may be controlled using 2-bit information.

That is, in addition to whether or not to transmit the aperiodic SRS (A-SRS), various SRS parameters (or a parameter set) and an index indicated by the 2-bit information may be associated with each other. Here, various SRS parameters may include a transmission bandwidth (srs-BandwidthAp-r10). In addition, various SRS parameters may include the number of antenna ports for the A-SRS (srs-AntennaPortAp-r10). In addition, various SRS parameters may include an SRS cyclic shift (cyclicShiftAp-r10). Various SRS parameters may include a transmission comb (transmissionCombAp-r10), which is a frequency offset of comb-like arrangement. Various SRS parameters may include a frequency position (freqDomainPositionAp-r10). In addition, various SRS parameters may include a hopping bandwidth (srs-HoppingBandwidthAp-r10). In addition, various SRS parameters may include the number of times of transmission of the SRS (durationAp-r10). In addition, these SRS parameters may be configured in such a way as to be included in an SRS parameter set. That is, the SRS parameter set may be configured by various SRS parameters. For example, if it is assumed that information indicated by 2 bits can be expressed by an index of 0 to 3, the terminal apparatus 102 may be controlled in such a way as not to transmit the A-SRS when the SRS request has been set to the index "0", and the terminal apparatus 102 may be controlled in such a way as to transmit the A-SRS generated using "SRS Parameter Set 1" when the SRS request has been set to the index "1". When the SRS request has been set to the index "2", the terminal apparatus 102 may be controlled in such a way as to transmit the A-SRS generated using "SRS Parameter Set 2", and when the SRS request has been set to the index "3", the terminal apparatus 102 may be controlled in such a way as to transmit the A-SRS generated using "SRS Parameter Set 3". In each of the above-mentioned SRS parameter sets, at least one of the values of various SRS parameters (or the index associated with the SRS parameters) included each SRS parameter set is set to be different.

The transmission power setting section 5015 sets transmission power for the PUCCHs, the PUSCHs, the periodic SRS, and the aperiodic SRS. More specifically, the transmission power setting section 5015 sets the transmission power of the terminal apparatus 102 in consideration of interference with neighboring base station apparatuses in accordance with information indicating the amount of interference from the neighboring base station apparatuses, information indicating the amount of interference with the neighboring base station apparatus 101 transmitted from the neighboring base station apparatuses 101, the quality of channels input from the channel measurement unit 509, and the like such that the PUSCHs and the like satisfy a certain channel quality, and transmits the information indicating the setting to the terminal apparatus 102 through the transmission unit 507.

More specifically, the transmission power setting section 5015 sets $P_{O\_PUSCH}$ and $\alpha$ in Expression (1), which will be described later, a power offset $P_{SRS\_OFFSET}(0)$ for the periodic SRS (first SRS power offset parameter (pSRS-Offset)), and a power offset $P_{SRS\_OFFSET}(1)$ for the aperiodic SRS (pSRS-OffsetAp-r10). The transmission power setting section 5015 then generates a signal including information indicating the setting as a radio resource control signal, and transmits the radio resource control signal to each terminal apparatus 102 through the transmission unit 507 using the PDSCH. In addition, the transmission power setting section 5015 configures a TPC command for calculating f in Expression (1) and Expression (4), generates a signal indicating the TPC command, and transmits the signal to each terminal apparatus 102 through the transmission unit 507 using the PDCCH. It is to be noted that α herein is a coefficient used for calculating the transmission power along with a path loss value in Expression (1) and Expression (4) and indicating the degree of compensation of a path loss, that is, a coefficient (attenuation coefficient or path loss compensation coefficient) for determining how much power is to be increased or decreased in accordance with a path loss. α is normally 0 to 1, and when α is 0, compensation of power according to the path loss is not performed, and when α is 1, the transmission power of the terminal apparatus 102 is increased or decreased so that the path loss does not affect the base station apparatus 101.

The control unit 503 generates control signals for controlling the reception unit 505 and the transmission unit 507 on the basis of control information from the higher layer processing unit 501. The control unit 503 outputs the generated control signals to the reception unit 505 and the transmission unit 507 to control the reception unit 505 and the transmission unit 507.

The reception unit 505 demultiplexes, demodulates, and decodes reception signals received from the terminal apparatus 102 through the transmission and reception antenna 511 in accordance with the control signals input from the control unit 503, and outputs information obtained as a result of the decoding to the higher layer processing unit 501. The radio reception section 5057 converts (down-converts) an uplink signal received through the transmission and reception antenna 511 into an intermediate frequency (IF), removes unnecessary frequency components, controls an amplification level such that a signal level is appropriately maintained, performs orthogonal demodulation on the basis of an in-phase component and an orthogonal component of the received signal, and converts an analog signal obtained as a result of the orthogonal demodulation into a digital signal. The radio reception section 5057 removes a component corresponding to guard intervals (GIs) from the digital signal obtained as a result of the conversion. The radio reception section 5057 performs a fast Fourier transform (FFT) on the signal from which the guard intervals have been removed, extracts a signal in the frequency domain, and outputs the signal to the demultiplexing section 5055.

The demultiplexing section 5055 demultiplexes the signal input from the radio reception section 5057 into signals such as PUCCHs, PUSCHs, UL DMRSs, and SRSs. It is to be noted that the demultiplexing is performed on the basis of assignment information regarding radio resources determined by the base station apparatus 101 and transmitted to each terminal apparatus 102. In addition, the demultiplexing section 5055 compensates the channels of PUCCHs and PUSCHs using estimated values of the channels input from the channel measurement unit 509. In addition, the demultiplexing section 5055 outputs the UL DMRSs and the SRSs obtained as a result of the demultiplexing to the channel measurement unit 509.

The demodulation section 5053 performs an inverse discrete Fourier transform (IDFT) on the PUSCHs, obtains modulation symbols, and performs modulation of the received signal on the modulation symbols of the PUCCHs and the PUSCHs using a predetermined modulation method such as binary phase-shift keying (BPSK), quadrature phase-shift keying (QPSK), 16 quadrature amplitude modulation (16QAM), or 64 quadrature amplitude modulation (64QAM) or a modulation method transmitted from the base station apparatus 101 to each terminal apparatus 102 in advance using downlink control information.

The decoding section 5051 decodes coded bits of the demodulated PUCCHs and PUSCHs at a predetermined coding rate or a coding rate transmitted from the base station apparatus 101 to the terminal apparatus 102 in advance using an uplink grant (UL grant) and a predetermined coding method, and outputs data information and uplink control information obtained as a result of the decoding to the higher layer processing unit 501.

The channel measurement unit 509 measures the estimated values of the channels, the quality of the channels, and the like from the uplink demodulation reference signals UL DMRSs and the SRSs input from the demultiplexing section 5055, and outputs the estimated values of the channels, the quality of the channels, and the like to the demultiplexing section 5055 and the higher layer processing unit 501.

The transmission unit 507 generates reference signals of the downlink (downlink reference signals) in accordance with the control signals input from the control unit 503, and codes and modulates data information and downlink control information input from the higher layer processing unit 501. The transmission unit 507 then multiplexes the PDCCHs, the PDSCHs, and the downlink reference signals, and transmits the multiplexed signals to the terminal apparatus 102 through the transmission and reception antenna 511.

The coding section 5071 performs coding such as turbo coding, convolutional coding, or block coding on the downlink control information input from the higher layer processing unit 501. The modulation section 5073 modulates coded bits using a modulation method such as QPSK, 16QAM, or 64QAM. The downlink reference signal generation section 5079 generates, as the downlink reference signals, sequences known to the terminal apparatus 102 obtained on the basis of a cell identifier (cell ID) for identifying the base station apparatus 101 using a predetermined rule. The multiplexing section 5075 multiplexes each modulated channel and the generated downlink reference signals.

The radio transmission section 5077 performs an inverse fast Fourier transform (IFFT) on the multiplexed modulation symbols, performs modulation using an OFDM method, adds guard intervals to OFDM symbols obtained as a result of the OFDM modulation, generates a digital signal in a baseband, converts the digital signal in the baseband into an analog signal, generates an in-phase component and an orthogonal component at an intermediate frequency from the analog signal, removes frequency components unnecessary for an intermediate frequency band, converts (up-converts) the signal at the intermediate frequency into a signal at a high frequency, removes unnecessary frequency components, performs power amplification, and outputs the signal to the transmission and reception antenna 511 to transmit the signal. It is to be noted that although not illustrated, it is assumed that the RRH 103 have the same configuration as the base station apparatus 101.

Figure 6:
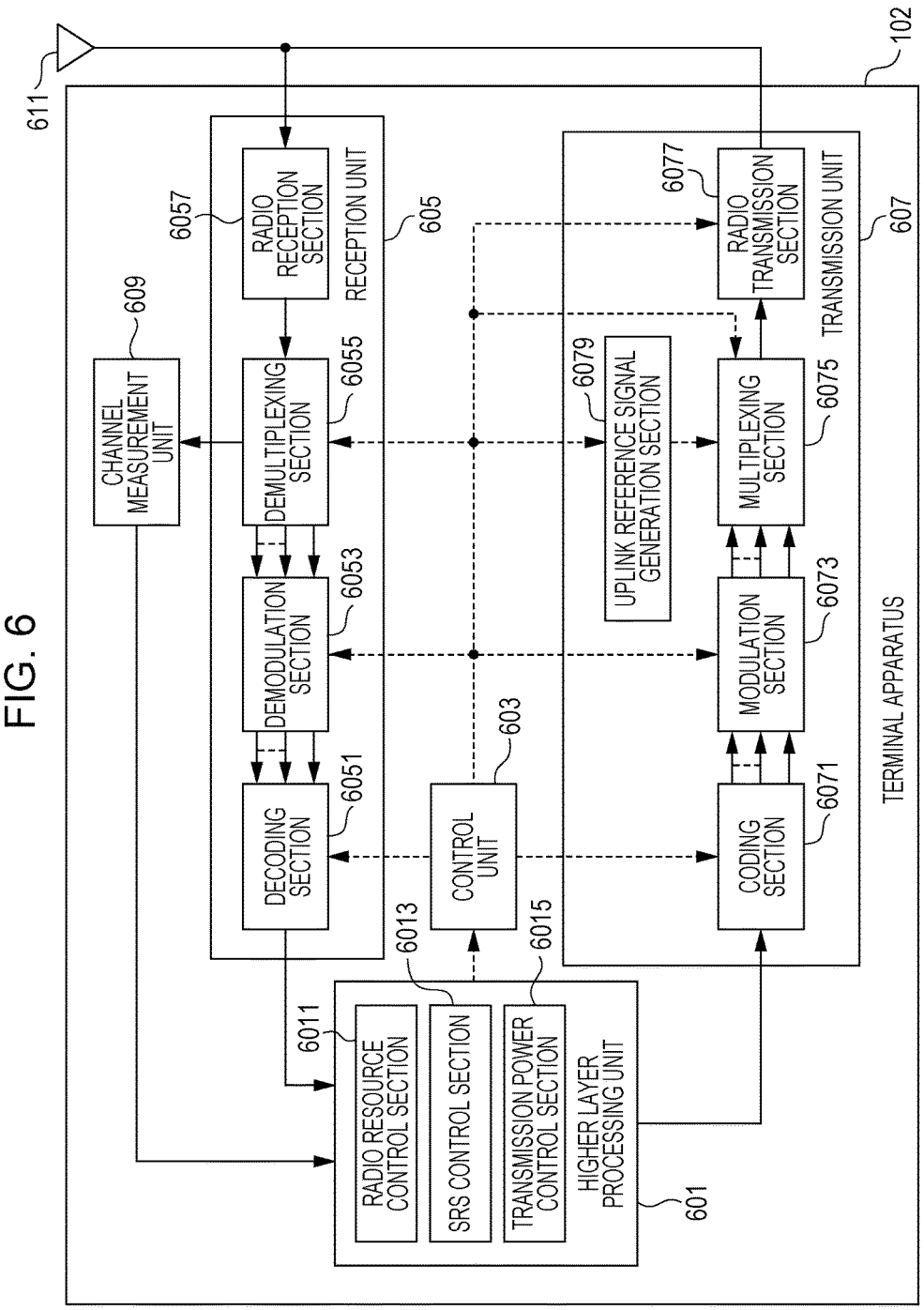
FIG. 6 is a schematic block diagram illustrating the configuration of a terminal apparatus 102 according to the first embodiment of the present invention.

FIG. 6 is a schematic block diagram illustrating the configuration of the terminal apparatus 102 according to this embodiment. As illustrated in the figure, the terminal apparatus 102 is configured by including a higher layer processing unit 601, a control unit 603, a reception unit 605, a transmission unit 607, a channel measurement unit 609, and a transmission and reception antenna 611. In addition, the higher layer processing unit 601 is configured by including a radio resource control section (terminal apparatus radio resource control section) 6011, an SRS control section 6013, and a transmission power control section 6015. In addition, the reception unit 605 is configured by including a decoding section 6051, a demodulation section 6053, a demultiplexing section 6055, and a radio reception section 6057. In addition, the transmission unit 607 is configured by including a coding section 6071, a modulation section 6073, a multiplexing section 6075, and a radio transmission section 6077.

The higher layer processing unit 601 outputs uplink data information generated by an operation performed by a user or the like to the transmission unit. In addition, the higher layer processing unit 601 performs processing in the Packet Data Convergence Protocol layer, the Radio Link Control layer, and the Radio Resource Control layer.

The radio resource control section 6011 included in the higher layer processing unit 601 manages various pieces of configuration information regarding the terminal apparatus 102. In addition, the radio resource control section 6011 generates information to be arranged in each uplink channel, and outputs the information to the transmission unit 607. In order to control the reception unit 605 and the transmission unit 607, the radio resource control section 6011 generates control information on the basis of downlink control information transmitted from the base station apparatus 101 using the PDCCHs and various pieces of configuration information regarding the terminal apparatus 102 configured by radio resource control information transmitted using the PDSCHs and managed by the radio resource control section 6011, and outputs the control information to the control unit 603.

The SRS control section 6013 included in the higher layer processing unit 601 obtains, from the reception unit 605, information indicating a sounding subframe (SRS subframe or SRS transmission subframe), which is a subframe whose radio resources are reserved in order to transmit SRSs broadcast by the base station apparatus 101 and a bandwidth of the radio resources in the sounding subframe reserved to transmit the SRSs, information indicating a subframe and a frequency band for transmitting a periodic SRS transmitted from the base station apparatus 101 to the terminal apparatus 102 and the amount of cyclic shift used for CAZAC sequences of the periodic SRS, and information indicating a frequency band for transmitting an aperiodic SRS transmitted from the base station apparatus 101 to the terminal apparatus 102 and the amount of cyclic shift used for CAZAC sequences of the aperiodic SRS.

The SRS control section 6013 controls SRS transmission in accordance with the information. More specifically, the SRS control section 6013 controls the transmission unit 607 such that the transmission unit 607 transmits the periodic SRS once or periodically in accordance with the information regarding the periodic SRS by an SRS request (SRS indicator) input from the reception unit 605. In addition, upon requested to transmit the aperiodic SRS, the SRS control section 6013 transmits the aperiodic SRS predetermined times (for example, once) in accordance with the information regarding the aperiodic SRS.

The transmission power control section 6015 included in the higher layer processing unit 601 outputs control information to the control unit 603 so that the control unit 603 controls transmission power on the basis of information indicating setting of the transmission power of the PUCCHs, the PUSCHs, the periodic SRS, and the aperiodic SRS. More specifically, the transmission power control section 6015 controls the transmission power of the periodic SRS and the transmission power of the aperiodic SRS using Expression (4) on the basis of $P_{O\_PUSCH}$, $\alpha$, $P_{SRS\_OFFSET}(0)$ for the periodic SRS (first SRS power offset parameter (pSRS-Offset)), $P_{SRS\_OFFSET}(1)$ for the aperiodic SRS (second SRS power offset parameter (pSRS-OffsetAp-r10)), and the TPC command obtained from the reception unit 605. It is to be noted that the transmission power control section 6015 switches the parameter of $P_{SRS\_OFFSET}$ in accordance with whether the periodic SRS or the aperiodic SRS is to be transmitted.

The control unit 603 generates control signals for controlling the reception unit 605 and the transmission unit 607 on the basis of the control information from the higher layer processing unit 601. The control unit 603 outputs the generated control signals to the reception unit 605 and the transmission unit 607 to control the reception unit 605 and the transmission unit 607.

The reception unit 605 demultiplexes, demodulates, and decodes reception signals received from the base station apparatus 101 through the transmission and reception antenna 611 in accordance with the control signals input from the control unit 603, and outputs information obtained as a result of the decoding to the higher layer processing unit 601.

The radio reception section 6057 converts (down-converts) a downlink signal received through each reception antenna into an intermediate frequency, removes unnecessary frequency components, controls an amplification level such that a signal level is appropriately maintained, performs orthogonal demodulation on the basis of an in-phase component and an orthogonal component of the received signal, and converts an analog signal obtained as a result of the orthogonal demodulation into a digital signal. The radio reception section 6057 removes a component corresponding to guard intervals from the digital signal obtained as a result of the conversion, performs a fast Fourier transform on the signal from which the guard intervals have been removed, and extracts a signal in the frequency domain.

The demultiplexing section 6055 demultiplexes the extracted signal into physical downlink control channels (PDCCHs), PDSCHs, and downlink reference signals (DRSs). It is to be noted that the demultiplexing is performed on the basis of assignment information regarding radio resources transmitted using downlink control information. In addition, the demultiplexing section 6055 compensates the channels of PDCCHs and PDSCHs using estimated values of the channels input from the channel measurement unit 609. In addition, the demultiplexing section 6055 outputs the downlink reference signals obtained as a result of the demultiplexing to the channel measurement unit 609.

The demodulation section 6053 demodulates the PDCCHs using a QPSK modulation method, and outputs the demodulated PDCCHs to the decoding section 6051. The decoding section 6051 attempts to decode the PDCCHs, and if the decoding is successful, outputs downlink control information obtained as a result of the decoding to the higher layer processing unit 601. The demodulation section 6053 demodulates the PDSCHs using a modulation method such as QPSK, 16QAM, or 64QAM transmitted using the downlink control information, and outputs the demodulated PDSCHs to the decoding section 6051. The decoding section 6051 performs decoding at the coding rate transmitted using the downlink control information, and outputs data information obtained as a result of the decoding to the higher layer processing unit 601.

The channel measurement unit 609 measures a downlink path loss on the basis of the downlink reference signals input from the demultiplexing section 6055, and outputs the measured path loss to the higher layer processing unit 601. In addition, the channel measurement unit 609 calculates the estimated values of the downlink channels on the basis of the downlink reference signals, and outputs the estimated values to the demultiplexing section 6055.

The transmission unit 607 generates UL DMRSs and/or and SRSs in accordance with the control signals input from the control unit 603, codes and modulates data information input from the higher layer processing unit 601, multiplexes the PUCCHs, the PUSCHs, and the generated UL DMRSs and/or SRSs, adjusts the transmission power of the PUCCHs, the PUSCHs, the UL DMRSs, and the SRSs, and transmits the signals to the base station apparatus 101 through the transmission and reception antenna 611.

The coding section 6071 performs coding such as turbo coding, convolutional coding, or block coding on the uplink control information and the data information input from the higher layer processing unit 601. The modulation section 6073 modulates coded bits input from the coding section 6071 using a modulation method such as BPSK, QPSK, 16QAM, or 64QAM.

The uplink reference signal generation unit 6079 generates CAZAC sequences known to the base station apparatus 101 obtained on the basis of a cell identifier for identifying the base station apparatus 101, a bandwidth in which the UL DMRSs and the SRSs are arranged, and the like using a predetermined rule. In addition, the uplink reference signal generation unit 6079 adds a cyclic shift to the generated CAZAC sequences of the UL DMRSs and the SRSs in accordance with the control signals input from the control unit 603.

The multiplexing section 6075 rearranges modulation symbols of the PUSCHs in accordance with the control signals input from the control unit 603 such that the modulation symbols become parallel to one another, and then performs a discrete Fourier transform (DFT) to multiplex the signals of the PUCCHs and the PUSCHs and the generated UL DMRSs and SRSs.

The radio transmission section 6077 performs an inverse fast Fourier transform on the multiplexed signals, performs modulation using an SC-FDMA method, adds guard intervals to SC-FDMA symbols obtained as a result of the SC-FDMA modulation, generates a digital signal in the baseband, converts the digital signal in the baseband into an analog signal, generates an in-phase component and an orthogonal component at an intermediate frequency from the analog signal, removes frequency components unnecessary for an intermediate frequency band, converts (up-converts) the signal at the intermediate frequency into a signal at a high frequency, removes unnecessary frequency components, performs power amplification, and outputs the signal to the transmission and reception antenna 611 to transmit the signal.

Figure 7:
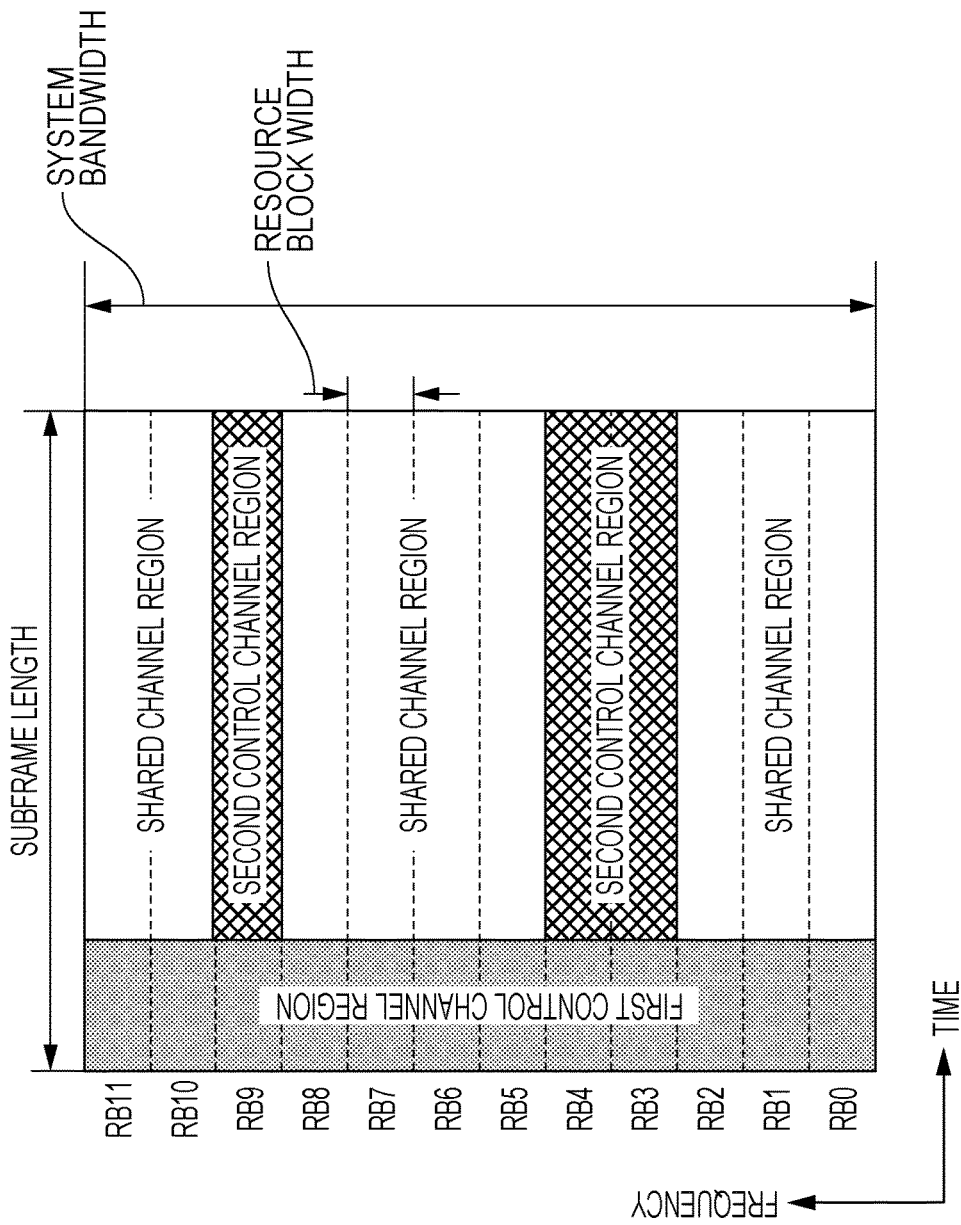
FIG. 7 is a diagram illustrating an example of channels mapped by the base station apparatus 101.

FIG. 7 is a diagram illustrating an example of channels mapped by the base station apparatus 101. FIG. 7 illustrates a case in which a frequency band configured by twelve resource block pairs is used as the system bandwidth. The PDCCHs, which are the first control channels, are arranged in first to third OFDM symbols in subframes. The frequency domain of the first control channels is arranged over the entirety of the system bandwidth. In addition, the shared channels are arranged in OFDM symbols other than those for the first control channels in the subframes.

Here, details of the configuration of each PDCCH will be described. Each PDCCH is configured by a plurality of control channel elements (CCEs). The number of CCEs used in each downlink component carrier depends on a downlink component carrier bandwidth, the number of OFDM symbols configuring the PDCCH, and the number of transmission ports for downlink reference signals according to the number of transmission antennas of the base station apparatus 101 used for communication. Each CCE is configured by a plurality of downlink resource elements (resources each defined by one OFDM symbol and one subcarrier).

The CCEs used between the base station apparatus 101 and the terminal apparatus 102 are provided with numbers (indices) for identifying the CCEs. Numbering of the CCEs is performed on the basis of a predetermined rule. Here, CCE_t denotes a CCE having a CCE number t. The PDCCH is configured by an aggregation (CCE aggregation) including a plurality of CCEs. The number of CCEs configuring the aggregation will be referred to as a "CCE aggregation level". The CCE aggregation level configuring the PDCCH is configured by the base station apparatus 101 in accordance with a coding rate set for the PDCCH and the number of bits of DCI included in the PDCCH. It is to be noted that a combination between CCE aggregation levels that can be used for the terminal apparatuses 102 is determined in advance. In addition, an aggregation including n CCEs will be referred to as a "CCE aggregation level n".

One resource element group (REG) is configured by four downlink resource elements adjacent to one another in the frequency domain. Furthermore, one CCE is configured by nine different resource element groups separated in the frequency domain and in the time domain. More specifically, all numbered resource element groups are subjected to interleaving in units of resource element groups in the entirety of the downlink component carrier using a block interleaver, and one CCE is configured by nine resource element groups having consecutive numbers after the interleaving.

A region SS (search space) for searching for the PDCCH is configured in each terminal apparatus 102. The SS is configured by a plurality of CCEs. The SS is configured by a plurality of CCEs including a smallest CCE and subsequent CCEs having consecutive numbers, and the number of the plurality of CCEs having consecutive numbers is determined in advance. An SS for each CCE aggregation level is configured by an aggregation of a plurality of candidates for the PDCCH. SSs are classified into a CSS (cell-specific SS) in which the numbers are common inside a cell from the smallest CCE and a USS (UE-specific SS) in which the numbers are specific to a terminal apparatus from the smallest CCE. In the CSS, a PDCCH to which control information read by a plurality of terminal apparatuses 102, such as the system information or information relating to paging, is assigned or a PDCCH to which a downlink grant or an uplink grant indicating an instruction of a fallback to a lower transmission method or random access is assigned can be arranged.

The base station apparatus 101 transmits the PDCCH using one or more CCEs in the SS configured in the terminal apparatus 102. The terminal apparatus 102 decodes a received signal using one or more CCEs in the SS, and performs a process for detecting a PDCCH transmitted thereto (the terminal apparatus 102 itself) (will be referred to as blind decoding). The terminal apparatus 102 configures different SS for each CCE aggregation level. Thereafter, the terminal apparatus 102 performs the blind decoding using a predetermined combination between CCEs in the different SS for each CCE aggregation level. In other words, the terminal apparatus 102 performs the blind decoding on each candidate for the PDCCH in the different SS for each CCE aggregation level. This series of processes in the terminal apparatus 102 will be referred to as monitoring of the PDCCH.

The second control channels (X-PDCCH, PDCCH on PDSCH, Extended PDCCH, Enhanced PDCCH, or E-PDCCH) are arranged in OFDM symbols other than those for the first control channels. The second control channels and the shared channels are arranged in different resource blocks. In addition, resource blocks in which the second control channels and the shared channels can be arranged are configured for each terminal apparatus 102. In addition, in resource blocks in which second control channel regions can be arranged, shared channels (data channels) for the terminal apparatus 102 itself or another terminal apparatus can be configured. In addition, with respect to a start position of OFDM symbols in which the second control channels are arranged, the same method as for the shared channel can be used. That is, the base station apparatus 101 can realize the start position by configuring some resources for the first control channels as physical control format indicator channels (PCFICHs) and mapping information indicating the number of OFDM symbols for the first control channels.

Alternatively, the start position of the OFDM symbols in which the second control channels are arranged can be determined in advance, that is, for example, a fourth OFDM symbol in a subframe may be the start position. At this time, if the number of OFDM symbols for the first control channels is two or less, signals are not mapped in second and third OFDM symbols in resource block pairs in which the second control channels are arranged, and the second and third OFDM symbols are configured as null. It is to be noted that other control signals or data signals may be further mapped in resources configured as null. Alternatively, the start position of the OFDM symbols configuring the second control channels may be configured using control information from a higher layer. In addition, the subframes illustrated in FIG. 7 may be subjected to time-division multiplexing (TDM), and the second control channels may be configured for each subframe.

As an SS for searching for an X-PDCCH, an SS may be configured by a plurality of CCEs as in the case of the PDCCH. That is, a resource element group is configured by a plurality of resource elements in the regions configured as the second control channels illustrated in FIG. 7, and a CCE is configured by a plurality of resource elements. As a result, as in the above case of the PDCCH, the SS for searching for (monitoring) an X-PDCCH can be configured.

Alternatively, unlike the case of the PDCCH, the SS for searching for an X-PDCCH can be configured by one or more resource blocks. That is, the SS for searching for an X-PDCCH is configured by an aggregation (RB aggregation) including one or more resource blocks in units of resource blocks in the regions configured as the regions of the second control channels illustrated in FIG. 7. The number of RBs configuring the aggregation will be referred to as an "RB aggregation level". The SS is configured by a plurality of RBs including a smallest RB and subsequent RBs having consecutive numbers, and the number of one or more RBs having consecutive numbers is determined in advance. An SS for each RB aggregation level is configured by an aggregation of a plurality of candidates to the X-PDCCH.

The base station apparatus 101 transmits the X-PDCCH using one or more RBs in an SS configured in the terminal apparatus 102. The terminal apparatus 102 decodes a received signal using one or more RBs in the SS, and performs a process for detecting an X-PDCCH transmitted thereto (the terminal apparatus 102 itself) (blind decoding). The terminal apparatus 102 configures a different SS for each RB aggregation level. Thereafter, the terminal apparatus 102 performs the blind decoding using a predetermined combination between RBs in a different SS for each RB aggregation level. In other words, the terminal apparatus 102 performs the blind decoding on each candidate for the X-PDCCH in the different SS for each RB aggregation level (monitors the X-PDCCH). When performing the blind decoding, the terminal apparatus 102 can identify a downlink control information (DCI) format included in the PDCCH. Because the number of bits configuring the DCI format is different depending on the type of DCI format, the terminal apparatus 102 can determine which DCI format is used in accordance with the number of bits configuring the DCI format.

When the base station apparatus 101 transmits control signals to the terminal apparatus 102 through the second control channels, the base station apparatus 101 configures monitoring of the second control channels for the terminal apparatus 102 and maps the control signals for the terminal apparatus 102 in the second control channels. On the other hand, when the base station apparatus 101 transmits control signals to the terminal apparatus 102 through the first control channels, the base station apparatus 101 does not configure monitoring of the second control channels for the terminal apparatus 102, and maps the control signals for the terminal apparatus 102 in the first control channels.

On the other hand, when the base station apparatus 101 has configured the monitoring of the second control channels, the terminal apparatus 102 performs blind coding on the control signals transmitted thereto for the second control channels. On the other hand, when the base station apparatus 101 has not configured the monitoring of the second control channels, the terminal apparatus 102 does not perform blind coding on the control signals transmitted thereto for the second control channels.

The control signals mapped in the second control channels will be described hereinafter. The control signals mapped in the second control channels are processed for control information for each terminal apparatus 102, and, as with data signals, subjected to a scrambling process, a modulation process, a layer mapping process, a precoding process, and the like. In addition, the control signals mapped in the second control channels are subjected to a precoding process specific to the terminal apparatus 102 along with the terminal-specific reference signals. At this time, the precoding process is preferably performed using a precoding weight suitable for the terminal apparatus 102. For example, the same precoding process is performed on the signals in the second control channels and the terminal-specific reference signals in the same resource block.

In addition, the control signals mapped in the second control channels can be mapped while different control information is included in forward slots (first slots) and backward slots (second slots) in the subframes. For example, in the forward slots in the subframes, control signals including assignment information (downlink assignment information) regarding data signals in downlink shared channels transmitted from the base station apparatus 101 to the terminal apparatus 102 are mapped. In addition, in the backward slots in the subframes, control signals including assignment information (uplink assignment information) regarding data signals in uplink shared channels transmitted from the base station apparatus 101 to the terminal apparatus 102 are mapped. It is to be noted that the control signals including the uplink assignment information from the terminal apparatus 102 to the base station apparatus 101 may be mapped in the forward slots in the subframes, and the control signals including the downlink assignment information from the base station apparatus 101 to the terminal apparatus 102 may be mapped in the backward slots in the subframes, instead.

In addition, data signals for the terminal apparatus 102 or another terminal apparatus 102 may be mapped in the forward slots and/or the backward slots of the second control channels. In addition, control signals for the terminal apparatus 102 or a terminal apparatus (including the terminal apparatus 102) for which the second control channels have been configured may be mapped in the forward slots and/or the backward slots of the second control channels.

In addition, the base station apparatus 101 multiplexes the terminal-specific reference signals on the control signals mapped in the second control channels. The terminal apparatus 102 performs a process for demodulating the control signals mapped in the second control channels using the multiplexed terminal-specific reference signals. Alternatively, some or all of the terminal-specific reference signals of Antenna Ports 7 to 14 are used. At this time, the control signals mapped in the second control channels may be subjected to MIMO transmitted using a plurality of antenna ports.

For example, the terminal-specific reference signals in the second control channels are transmitted using a predetermined antenna port and scrambling code. More specifically, the terminal-specific reference signals in the second control channels are generated using the predetermined Antenna Port 7 and scrambling ID.

In addition, for example, the terminal-specific reference signals in the second control channels are generated using an antenna port and a scrambling ID transmitted through RRC signaling or PDCCH signaling. More specifically, either Antenna Port 7 or Antenna Port 8 is transmitted through the RRC signaling or the PDCCH signaling as the antenna port used for the terminal-specific reference signals in the second control channels. One of values of 0 to 3 is transmitted through the RRC signaling or the PDCCH signaling as the scrambling ID used for the terminal-specific reference signals in the second control channels.

In the first embodiment, the base station apparatus 101 configures the second measurement target configuration for each terminal apparatus 102. In addition, the terminal apparatus 102 sets the first measurement target configuration, and reports, to the base station apparatus 101, the received power of the cell-specific reference signals that are the measurement targets specified in the first measurement target configuration and the received power of the channel state information reference signals that are the measurement targets specified in the second measurement target configuration.

The following effects can be produced by using the above-described embodiment of the present application. Assume that the cell-specific reference signals illustrated in FIG. 2 are transmitted only from the base station apparatus 101 using the downlink 105, that the measurement targets configured in the second measurement target configuration and the second reporting configuration configured in step S403 illustrated in FIG. 4 are the channel state information reference signals illustrated in FIG. 3, and that the reference signals are transmitted only from the RRH 103 using the downlink 107 as these measurement targets. In this case, in step S405 illustrated in FIG. 4, by measuring the received signal power of the cell-specific reference signals that are the measurement targets specified in the predetermined first measurement target configuration and the channel state information reference signals transmitted only from the RRH 103 that are the measurement targets specified in the second measurement target configuration, which can be configured by the base station apparatus 101, Path Loss 1, which is a downlink path loss between the base station apparatus 101 and the terminal apparatus 102, and Path Loss 2, which is a downlink path loss between the RRH 103 and the terminal apparatus 102, can be calculated.

That is, whereas the two types of uplink transmission power can be set, uplink transmission power can be set for either the base station apparatus 101 or the RRH 103 (for example, the base station apparatus 101 or the RRH 103 with which the path loss is smaller, that is, whichever is closer) during uplink coordinated communication. Since the received signal power of the above-described cell-specific reference signals, which are the first measurement targets, and the channel state information reference signals transmitted only from the RRH 103, which are the second measurement targets, are reported to the base station apparatus 101 in this embodiment of the present application, the base station apparatus 101 can determine (judge) whether an uplink signal from the terminal apparatus 102 is to be received by the base station apparatus 101 using the uplink 106 or an uplink signal from the terminal apparatus 102 is to be received by the RRH 103 using the uplink 108 during the uplink coordinated communication. The base station apparatus 101 can configure the uplink power control-related parameters in step S408 illustrated in FIG. 4 on the basis of this and determine whether to use the above-mentioned Path Loss 1 or Path Loss 2.

In another example, assume that the cell-specific reference signals illustrated in FIG. 2 are transmitted from the base station apparatus 101 and the RRH 103 using the downlink 105 and the downlink 107, respectively, that two measurement targets are configured in the second measurement target configuration and the second reporting configuration configured in step S403 illustrated in FIG. 4, that both the configured measurement targets are the channel state information reference signals illustrated in FIG. 3, that the reference signal is transmitted only from the base station apparatus 101 using the downlink 105 as one of the measurement targets, and that the reference signal is transmitted only from the RRH 103 using the downlink 107 as the other measurement target. In this case, in step S405 illustrated in FIG. 4, by measuring the received signal power of the cell-specific reference signals that are the first measurement targets specified in the predetermined first measurement target configuration and the channel state information reference signal transmitted only from the base station apparatus 101, which is one of the second measurement targets, which are the measurement targets specified in the second measurement target configuration that can be configured by the base station apparatus 101, and the received signal power of the channel state information reference signal transmitted only from the RRH 103, which is one of the second measurement targets, Path Loss 1, which is a combined value between the downlink path losses between the base station apparatus 101 and the terminal apparatus 102 and between the RRH 103 and the terminal apparatus 102, and Path Losses 2, which include the downlink path loss values between the base station apparatus 101 and the terminal apparatus 102 and between the RRH 103 and the terminal apparatus 102, can be calculated.

That is, in the terminal apparatus 102, whereas the two types of uplink transmission power can be set, uplink transmission power can be set for either the base station apparatus 101 or the RRH 103 (for example, the base station apparatus 101 or the RRH 103 with which the path loss is smaller, that is, whichever is closer) during the uplink coordinated communication. Since the received signal power of the above-described cell-specific reference signals, which are the first measurement targets, and the channel state information reference signal transmitted only from the base station apparatus 101, which is one second measurement target, and the received signal power of the channel state information reference signal transmitted only from the RRH 103, which is the other second measurement target, are reported to the base station apparatus 101 in this embodiment of the present application, the base station apparatus 101 can determine whether the uplink signal from the terminal apparatus 102 is to be received by the base station apparatus 101 using the uplink 106 or the uplink signal from the terminal apparatus 102 is to be received by the RRH 103 using the uplink 108 during the uplink coordinated communication. The base station apparatus 101 can configure the uplink power control-related parameters in step S408 illustrated in FIG. 4 on the basis of this and determine which of the three types of path loss, namely the above-mentioned Path Loss 1 and the two Path Losses 2, is to be used.

In addition, in this embodiment of the present application, the terminal apparatus 102 can perform transmission power control suitable for the uplink coordinated communication by calculating the uplink transmission power using Path Loss 1, which is a combined value between the downlink path losses between the base station apparatus 101 and the terminal apparatus 102 and between the RRH 103 and the terminal apparatus 102. In addition, the terminal apparatus 102 can perform transmission power control suitable for the communication between the base station apparatus 101 and the terminal apparatus 102 by calculating the uplink transmission power using Path Loss 2 based on the second measurement targets between the base station apparatus 101 and the terminal apparatus 102. In addition, the terminal apparatus 102 can perform transmission power control suitable for the RRH 103 and the terminal apparatus 102 by calculating the uplink transmission power using Path Loss 2 based on the second measurement targets between the RRH 103 and the terminal apparatus 102. Thus, by using both the predetermined first measurement configuration and the second measurement target configuration that can be configured by the base station apparatus 101, appropriate uplink power control becomes possible regardless of the configuration of the reference signals by the base station apparatus 101 and the RRH 103 (for example, a case in which the cell-specific reference signals are transmitted only from the base station apparatus 101 or a case in which the cell-specific reference signals are transmitted from both the base station apparatus 101 and the RRH 103).

In addition, in this embodiment, by reporting the received signal power of the cell-specific reference signals specified in the first measurement target configuration and the received signal power of the channel state information reference signals specified in the second measurement target configuration, it becomes easier for the base station apparatus 101 to detect the positional relationships between the base station apparatus 101, the RRH 103, and the terminal apparatus 102 (that is, expected received power and path losses), which is also advantageous during downlink coordinated communication. For example, when the downlinks 105 and 107 are used, unnecessary transmission of signals can be suppressed if signals received by the terminal apparatus 102 are appropriately selected and transmitted from the base station apparatus 101, the RRH 103, or both the base station apparatus 101 and the RRH 103, thereby improving the throughput of the entirety of the system.

Second Embodiment

A second embodiment of the present invention will be described hereinafter. In this embodiment, details of a parameter configuration for the channel state information reference signals, the second measurement target configuration, the second reporting configuration, the third measurement target configuration, and the third reporting configuration in step S403 illustrated in FIG. 4, and parameters relating to the first measurement report and the second measurement report in step S407 illustrated in FIG. 4 will be described. In addition, here, details of a first reference signal configuration for calculating a CSI feedback, a second reference signal configuration for specifying resource elements excluded from demodulation of data during the data demodulation, and a third reference signal configuration for configuring measurement targets for calculating the received signal power will also be described.

Figure 8:
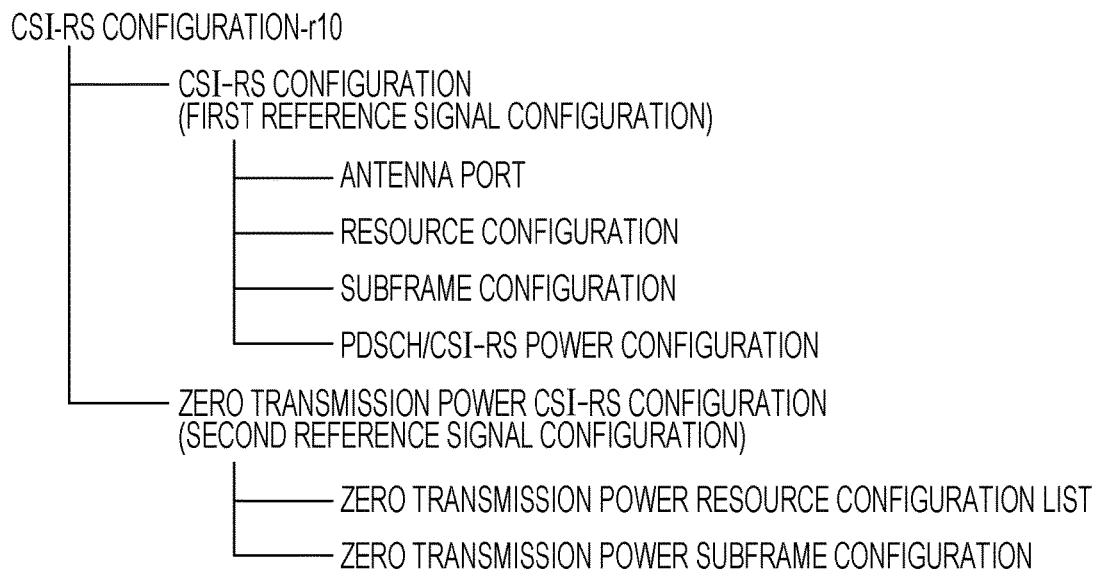
FIG. 8 is a diagram illustrating details of a channel state information reference signal configuration.

FIG. 8 illustrates details of parameters relating to the first reference signal configuration and the second reference signal configuration as the details of the channel state information reference signals. A CSI-RS configuration-r10 (CSI-RS-Config-r10) can include a CSI-RS configuration, that is, the first reference signal configuration (csi-RS-r10), and a zero transmission power CSI-RS configuration, that is, the second reference signal configuration (zeroTxPowerCSI-RS-r10). The CSI-RS configuration can include an antenna port (antennaPortsCount-r10), a resource configuration (resourceConfig-r10), a subframe configuration (subframeConfig-r10), and a PDSCH/CSI-RS power configuration (p-C-r10).

In the antenna port (antennaPortsCount-r10), the number of antenna ports secured by the CSI-RS configuration is configured. In an example, one of values of 1, 2, 4, and 8 is selected for the antenna port (antennaPortsCount-r10). Next, in the resource configuration (resourceConfig-r10), the position of a first resource element (smallest block defined by the frequency (subcarriers) and the time (OFDM symbols) illustrated in FIG. 2 and FIG. 3) of Antenna Port 15 (CSI Port 1) is indicated by an index. Therefore, resource elements for the channel state information reference signals assigned to each antenna port are uniquely determined. Details will be described later.

In the subframe configuration (subframeConfig-r10), the positions and the period of subframes including the channel state information reference signals are indicated by an index. For example, when the index of the subframe configuration (subframeConfig-r10) is 5, the channel state information reference signals are included at intervals of ten subframes, and Subframe 0 includes the channel state information reference signals among radio frames in units of ten subframes. In addition, in another example, for example, when the index of the subframe configuration (subframeConfig-r10) is 1, the channel state information reference signals are included at intervals of five subframes, and Subframes 1 and 6 include the channel state information reference signals among radio frames in units of ten subframes. As described above, the period of subframes and the positions of subframes including the channel state information reference signals are uniquely specified by the subframe configuration.

The PDSCH/CSI-RS power configuration (p-C-r10) is a power ratio (ratio of EPRE; energy per resource element) of the PDSCHs to the channel state information reference signals (CSI-RSs), and may be set in a range of −8 to 15 dB. In addition, although not illustrated, the base station apparatus 101 separately transmits cell-specific reference signal transmission power (referenceSignalPower), $P_A$, and $P_B$ to the terminal apparatus 102 using RRC signals. Here, $P_A$ is an index indicating a power ratio of the PDSCHs to the cell-specific reference signals in a subframe in which there are no cell-specific reference signals, and $P_B$ is an index indicating a power ratio of the PDSCHs to the cell-specific reference signals in a subframe in which there are the cell-specific reference signals. Therefore, by combining the PDSCH/CSI-RS power configuration (p-C-r10), the cell-specific reference signal transmission power (referenceSignalPower), and $P_A$, the terminal apparatus 102 can calculate the transmission power of the channel state information reference signals.

In addition, an example will be described as the resource configuration (resourceConfig-r10). In the resource configuration (resourceConfig-r10), the positions of resources assigned to the CSI-RSs for each antenna port are indicated by an index. For example, when Index 0 of the resource configuration (resourceConfig-r10) has been specified, the first resource element of Antenna Port 15 (CSI Port 1) is specified as Subcarrier Number 9 and Subframe Number 5. As illustrated in FIG. 3, since C1 is assigned to Antenna Port 15, a resource element of Subcarrier Number 9 and Subframe Number 6 is also configured as the channel state information reference signal for Antenna Port 15 (CSI Port 1). The resource elements for each antenna port are secured on the basis of this, and, for example, the resource element of Subcarrier Number 9 and Subframe Number 5 and the resource element of Subcarrier Number 9 and Subframe Number 6 are also assigned to Antenna Port 16 (CSI Port 2). Similarly, a resource element of Subcarrier Number 3 and Subframe Number 5 and a resource element of Subcarrier Number 3 and Subframe Number 6 are assigned to Antenna Ports 17 and 18 (CSI Ports 3 and 4).

Similarly, a resource element of Subcarrier Number 8 and Subframe Number 5 and a resource element of Subcarrier Number 8 and Subframe Number 6 are assigned to Antenna Ports 19 and 20 (CSI Ports 5 and 6). Similarly, a resource element of Subcarrier Number 2 and Subframe Number 5 and a resource element of Subcarrier Number 2 and Subframe Number 6 are assigned to Antenna Ports 21 and 22 (CSI Ports 7 and 8). When another index has been specified in the resource configuration (resourceConfig-r10), the first resource element of Antenna Port 15 (CSI Port 1) becomes different, and accordingly the resource elements assigned to each antenna port become different.

In addition, the zero transmission power CSI-RS configuration (second reference signal configuration) can include a zero transmission power resource configuration list (zeroTxPowerResourceConfigList-r10) and a zero transmission power subframe (zeroTxPowerSubframeConfig-r10) configuration. In the zero transmission power resource configuration list, one or a plurality of indices included in the above-described resource configuration (resourceConfig-r10) are specified using a bitmap. As described above, in the zero transmission power subframe configuration, the positions and the period of the subframes including the channel state information reference signals are indicated by an index. Therefore, by making the zero transmission power resource configuration list and the zero transmission power subframe configuration appropriate, resource elements excluded from the demodulation process during demodulation of the PDSCHs (downlink shared channels, physical downlink shared channels, or downlink data channels, downlink data signals) are specified as the resources for the channel state information reference signals in the terminal apparatus 102.

It is to be noted that, in an example, an index specified in the zero transmission power resource configuration list corresponds to the resource configuration (resourceConfig-r10) at a time when the antenna port (antennaPortsCount-r10) is 4. In other words, because the resource configuration (resourceConfig-r10) is transmitted using sixteen types of indices when the antenna port is 4, the zero transmission power resource configuration list transmits the resources for the channel state information reference signals indicated by the sixteen types of indices using a 16-bit bitmap. For example, when indices of 0 and 2 have been transmitted using a bitmap, resource elements corresponding to the indices of 0 and 2 are excluded from the demodulation process during demodulation.

Next, details of the parameters relating to the second measurement target configuration in step S403 illustrated in FIG. 4 will be described with reference to FIG. 9. A reference signal measurement configuration illustrated in FIG. 9, that is, the third reference signal configuration or the second measurement target configuration, can include a reference signal measurement configuration addition/modification list and a reference signal measurement configuration removal list. The reference signal measurement configuration addition/modification list can include CSI-RS measurement indices and CSI-RS measurement configurations. The reference signal measurement configuration removal list can include CSI-RS measurement indices. Here, a CSI-RS measurement index and a CSI-RS measurement configuration are configured as a combination. One or a plurality of combinations are configured in the reference signal measurement configuration addition/modification list, and the CSI-RS measurement configurations configured here are the measurement targets.

Here, the CSI-RS measurement index is an index associated with the CSI-RS measurement configuration, and is an index for distinguishing a plurality of measurement targets configured by the third reference signal configuration from one another. Removal from the measurement targets is performed using the reference signal measurement configuration removal list on the basis of this index, and a measurement target specified by this index is associated with a measurement report, which will be described later, in the measurement report. In addition, the CSI-RS measurement configuration will be described later with reference to FIG. 11 and FIG. 12.

Figure 10:
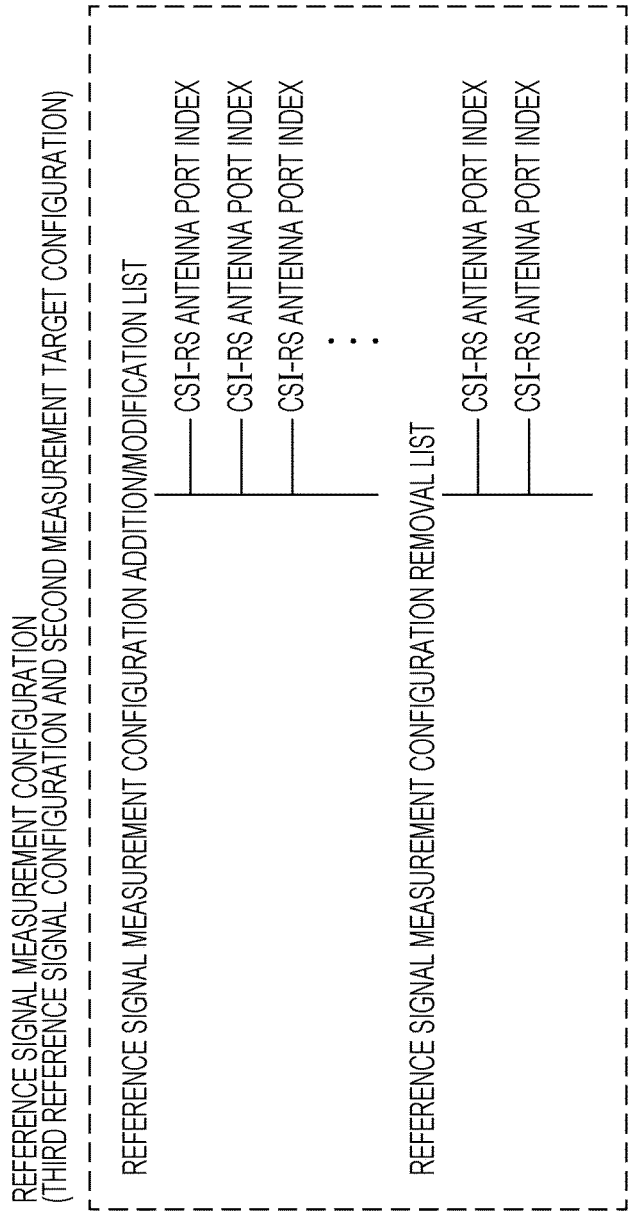
FIG. 10 is a diagram illustrating another example of the details of the parameters relating to the second measurement target configuration in step S403 illustrated in FIG. 4.

In another example, as illustrated in FIG. 10, only CSI-RS antenna port indices can be configured in the reference signal measurement configuration addition/modification list and the reference signal measurement configuration removal list. Here, the CSI-RS antenna port indices are indices associated with the antenna port numbers (Antenna Ports 15 to 22) for the channel state information reference signals illustrated in FIG. 3. It is to be noted that the CSI-RS antenna port indices configured in the third reference signal configuration illustrated in FIG. 10 may be part of the channel state information reference signals configured in the first reference signal configuration illustrated in FIG. 8, or need not be included in the channel state information reference signals configured in the first reference signal configuration. When the CSI-RS antenna port indices are not included in the channel state information reference signals configured in the first reference signal configuration, the channel state information reference signals when it is assumed that the CSI-RS antenna port indices configured in the third reference signal configuration are included in the channel state information reference signals configured in the first reference signal configuration are the targets of the third reference signal configuration.

Figure 11:
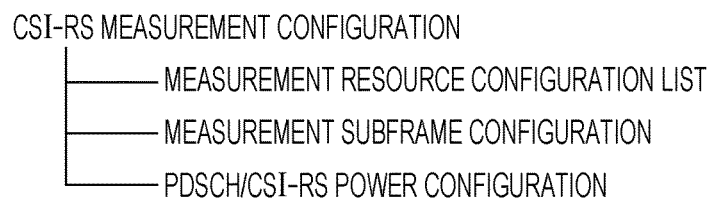
FIG. 11 is a diagram illustrating an example of details of a CSI-RS measurement configuration.
Figure 12:
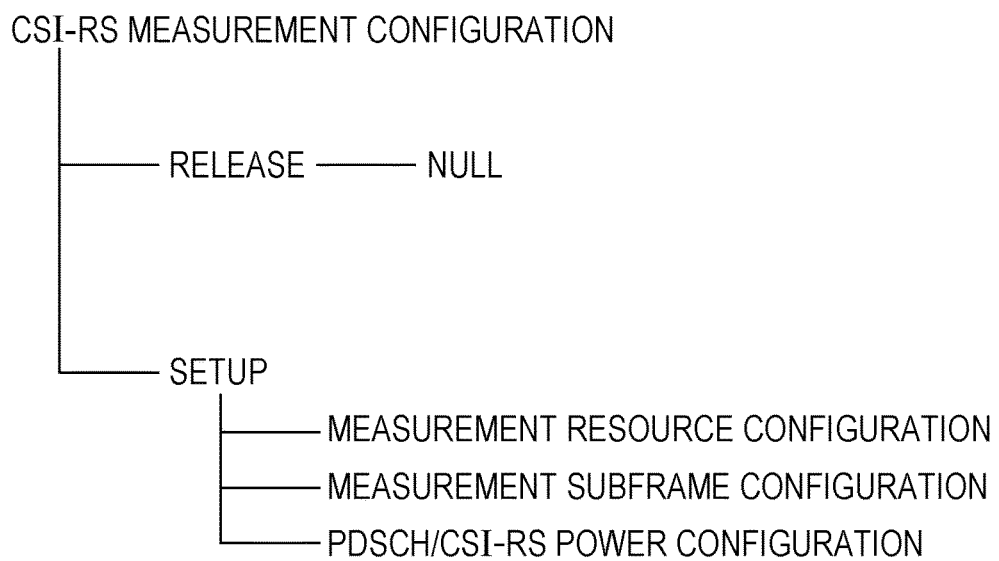
FIG. 12 is a diagram illustrating another example of the details of the CSI-RS measurement configuration.

Next, details of the CSI-RS measurement configuration illustrated in FIG. 9 will be described with reference to FIG. 11 and FIG. 12. In an example, as illustrated in FIG. 11, the CSI-RS measurement configuration can include a measurement resource configuration list, a measurement subframe configuration, and a PDSCH/CSI-RS power configuration. The measurement resource configuration list and the measurement subframe configuration can be the same configurations as the zero transmission power resource configuration list (zeroTxPowerResourceConfigList-r10) and the zero transmission power subframe (zeroTxPowerSubframeConfig-r10) configuration, respectively, illustrated in FIG. 8. In addition, the PDSCH/CSI-RS power configuration can be the same configuration as the PDSCH/CSI-RS power configuration (p-C-r10) illustrated in FIG. 8. In another example, as illustrated in FIG. 12, the CSI-RS measurement configuration can include a measurement resource configuration, a measurement subframe configuration, and a PDSCH/CSI-RS power configuration. The measurement resource configuration, the measurement subframe configuration, and the PDSCH/CSI-RS power configuration can be the same configurations as the resource configuration (resourceConfig-r10), the subframe configuration (subframeConfig-r10), and the PDSCH/CSI-RS power configuration (p-C-r10), respectively, illustrated in FIG. 8. In addition, although the PDSCH/CSI-RS power configuration is assumed in FIG. 11 and FIG. 12, CSI-RS transmission power (channel state information reference signal transmission power) may be transmitted, instead.

Next, details of the third measurement target configuration and the third reporting configuration in step S403 illustrated in FIG. 4 will be described with reference to FIG. 13. In an example, an RRC connection reconfiguration (RRCConnectionReconfiguration) can include an RRC connection reconfiguration-r8-IEs (RRCConnectionReconfiguration-r8-IEs), and the RRC connection reconfiguration-r8-IEs can include a measurement configuration (MeasConfig: Mesurement Config). The measurement configuration can include a measurement object removal list (MeasObjectToRemoveList), a measurement object addition/modification list (MeasObjectToAddModList), a measurement ID removal list, a measurement ID addition/modification list, a report configuration removal list (ReportConfigToRemoveList), and a report configuration addition/modification list (ReportConfigToAddModList).

Figure 14:
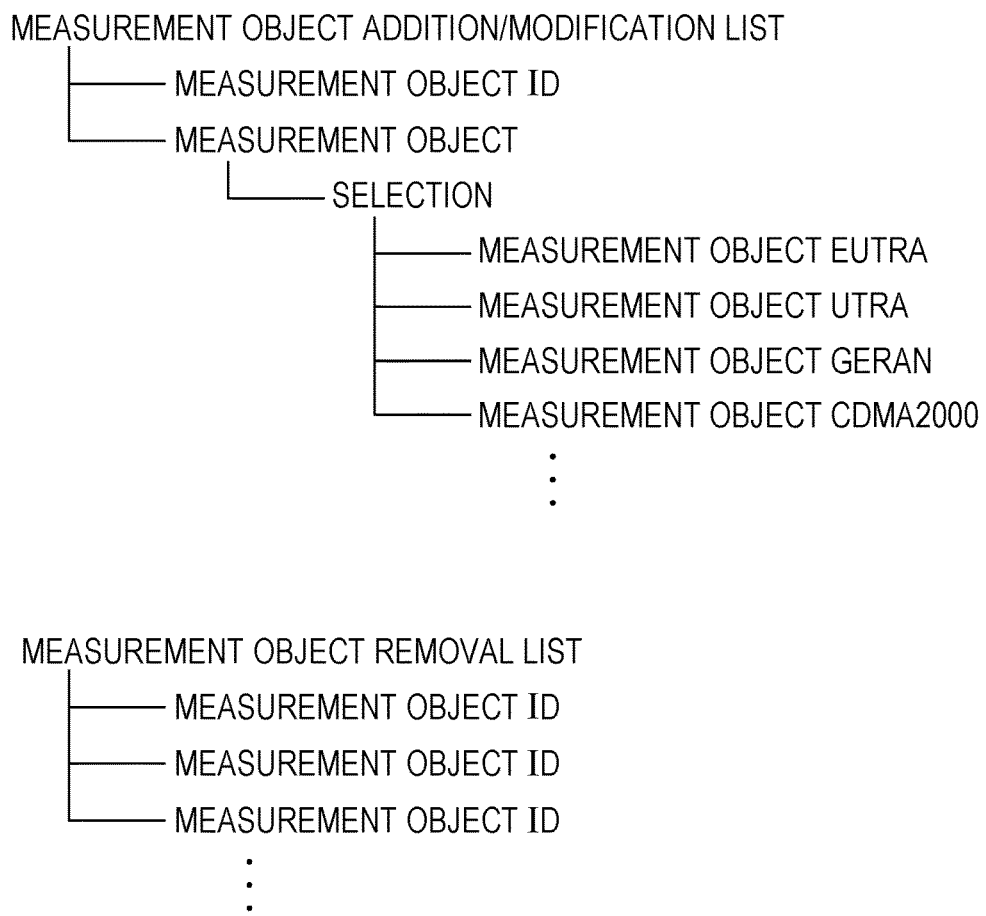
FIG. 14 is a diagram illustrating an example of the details of the third measurement target configuration.

The third measurement target configuration indicated by step S403 illustrated in FIG. 4 refers to the measurement object removal list, the measurement object addition/modification list, the measurement ID removal list, and the measurement ID addition/modification list, and the third reporting configuration refers to the report configuration removal list and the report configuration addition/modification list. In addition, the measurement ID addition/modification list can include a measurement ID, a measurement object ID, and a report configuration ID, and the measurement ID removal list can include a measurement ID. It is to be noted that the measurement object ID is associated with a measurement object, which will be described later, and the report configuration ID is associated with a report configuration, which will be described. It is to be noted that, as illustrated in FIG. 14, the measurement object ID and the measurement object can be selected in the measurement object addition/modification list. In addition, as the measurement object, measurement object EUTRA, measurement object ETRA, measurement object GERAN, measurement object CDMA2000, or the like can be selected. In addition, for example, in the case of the measurement object EUTRA, the received signal power of cell-specific reference signals transmitted from an unconnected cell (cell for which the RRC parameters have not been configured) can be measured when the base station apparatus 101 has transmitted a carrier frequency (central frequency) or the like to the terminal apparatus 102 (refer to FIG. 15). That is, as a result of the third measurement target configuration and the third reporting configuration, the received signal power of cell-specific reference signals from an unconnected cell can be measured.

In addition, the measurement object removal list includes measurement object IDs, and removal from measurement objects can be performed by specifying the measurement object IDs. Since the above-described measurement target configuration is included in the RRC connection reconfiguration, the measurement target configuration is configured through RRC signals during the RRC connection reconfiguration. It is to be noted that the above-described RRC connection reconfiguration and various information elements and various configurations included in the RRC connection reconfiguration may be configured for each terminal apparatus 102 through RRC signals (dedicated signaling). It is to be noted that the above-described physical configuration may be configured for each terminal apparatus 102 through RRC messages. It is to be noted that RRC reconfiguration and RRC reestablishment may be set for each terminal apparatus 102 through RRC messages.

Next, details of the second measurement target configuration and the second reporting configuration in step S403 illustrated in FIG. 4 will be described with reference to FIG. 16. In an example, a dedicated physical configuration (PhysicalConfigDedicated) can include a measurement configuration, and the measurement configuration can include a measurement object removal list, a measurement object addition/modification list, a measurement ID removal list, a measurement ID addition/modification list, a report configuration removal list, and a report configuration addition/modification list. The second measurement target configuration indicated by step S403 illustrated in FIG. 4 refers to the measurement object removal list and the measurement object addition/modification list, and may further include the measurement ID removal list and the measurement ID addition/modification list. The second reporting configuration is assumed to refer to the report configuration removal list and the report configuration addition/modification list. In addition, the measurement object removal list and the measurement object addition/modification list mentioned here are assumed to be the same as the reference signal measurement configuration addition/modification list and the reference signal measurement configuration removal list, respectively, illustrated in FIG. 9 or FIG. 10.

In addition, although the dedicated physical configuration (PhysicalConfigDedicated), which is a terminal-specific physical configuration, has been described with reference to FIG. 16, a dedicated physical configuration for the SCell (PhysicalConfigDedicatedSCell-r11), which is a terminal-specific physical configuration assigned to a secondary cell, may be used, instead. The above-described dedicated physical configuration is configured through RRC signals during the RRC connection reestablishment or the RRC connection reconfiguration. On the other hand, the dedicated physical configuration for the SCell can be included in a SCell addition/modification list, and is configured through RRC signals during addition of an SCell and modification of the configuration. Thus, as a result of the second measurement target configuration and the second reporting configuration, the received signal power of the configured channel state information reference signals of a connected cell can be measured. In addition, the measurement object addition/modification list and the measurement object removal list (second measurement target configuration) illustrated in FIG. 16 may have the same content as the reference signal measurement configuration addition/modification list and the reference signal measurement configuration removal list (third reference signal configuration), respectively, illustrated in FIG. 9 or FIG. 10.

Figure 9:
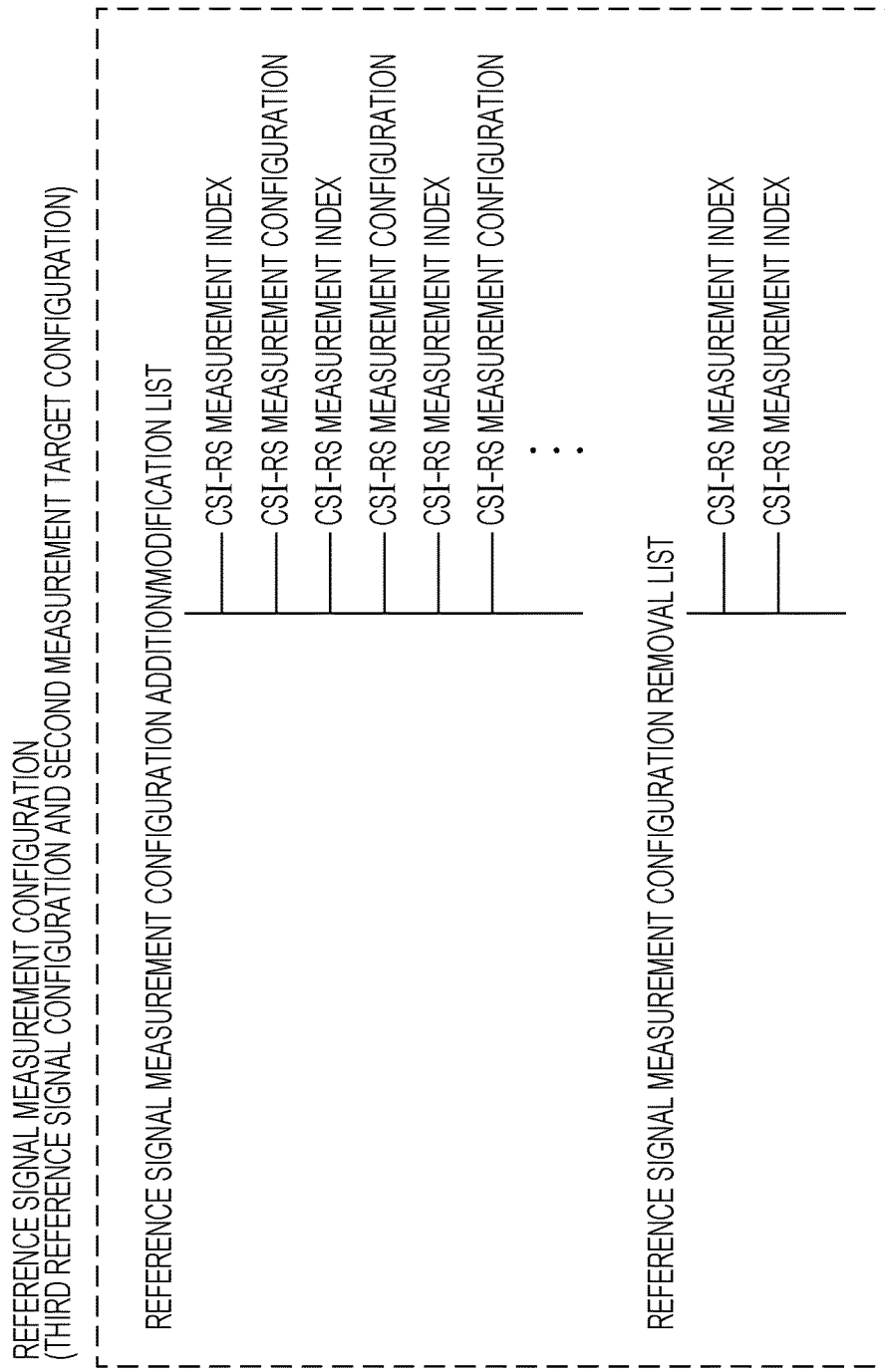
FIG. 9 is a diagram illustrating an example of details of parameters relating to a second measurement target configuration in step S403 illustrated in FIG. 4.
Figure 16:
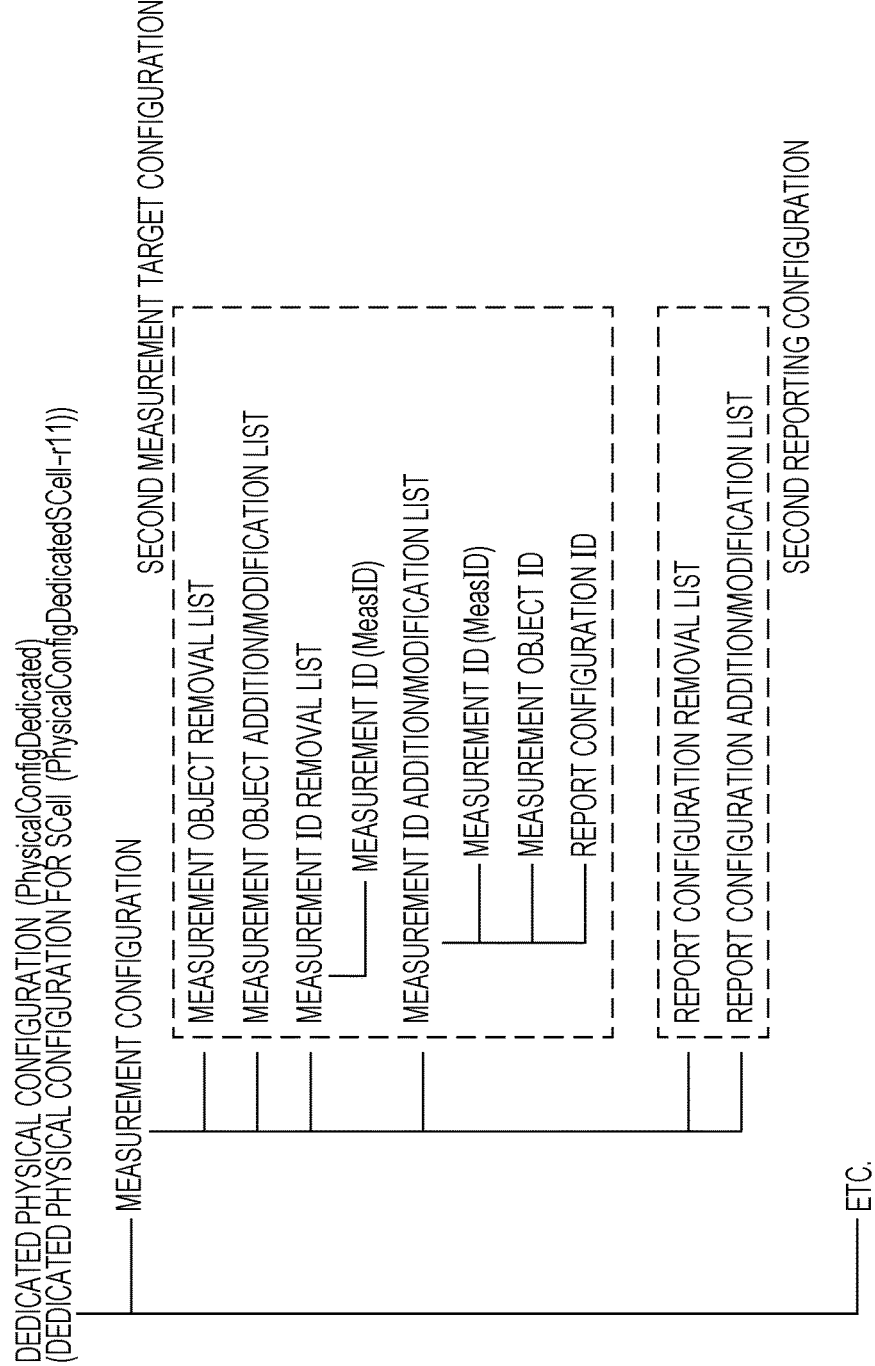
FIG. 16 is a diagram illustrating details of the second measurement target configuration and reporting configuration in step S403 illustrated in FIG. 4.

That is, in the measurement object addition/modification list and the measurement object removal list illustrated in FIG. 16, the third reference signals are configured using the CSI-RS measurement configurations (refer to FIGS. 11 and 12) identified by the CSI-RS measurement indices illustrated in FIG. 9 or the third reference signals are configured using the CSI-RS antenna port indices illustrated in FIG. 10. It is to be noted that although a case is assumed in FIG. 16 in which the dedicated physical configuration (PhysicalConfigDedicated) or the dedicated physical configuration for the SCell (PhysicalConfigDedicatedSCell-r11), which is a terminal-specific physical configuration assigned to a secondary cell, includes the second measurement target configuration, the above-described CSI-RS configuration-r10 illustrated in FIG. 8 may include the second measurement target configuration, instead. In addition, although a case is assumed in which the second measurement target configuration is included in another example, the above-described measurement configuration illustrated in FIG. 13 may be included, instead. It is to be noted that the above-described physical configuration may be configured for each terminal apparatus 102 through RRC signals (dedicated signaling).

Figure 17:
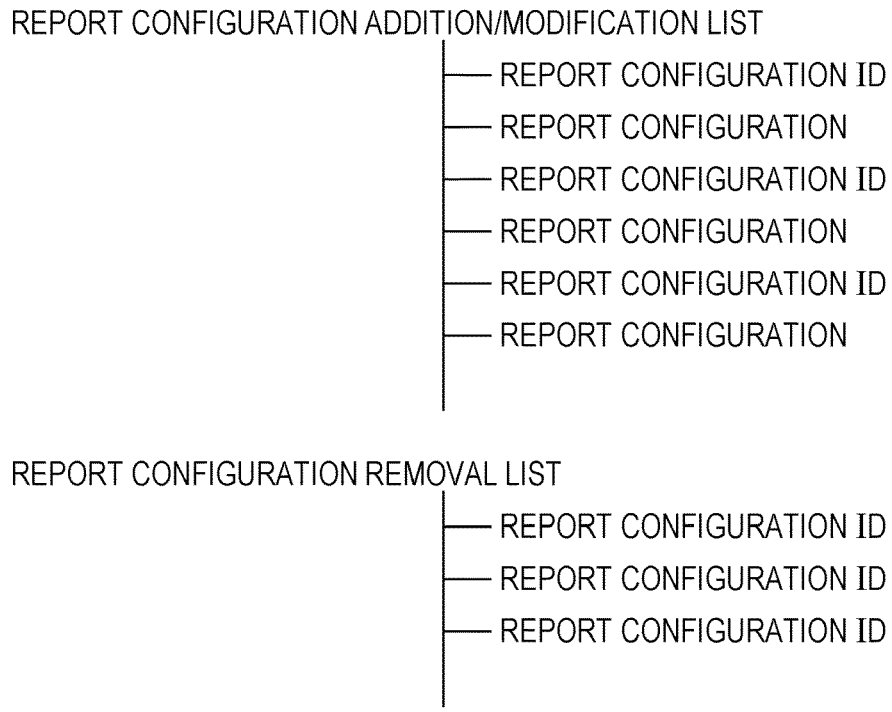
FIG. 17 is a diagram illustrating the details of the second reporting configuration.

Next, details of the second reporting configuration illustrated in FIG. 16 will be described with reference to FIG. 17. In an example, report configuration IDs and report configurations are included in the report configuration addition/modification list as combinations. In addition, report configuration IDs are included in the report configuration removal list. In addition, a plurality of combinations between report configuration IDs and report configurations may be included in the report configuration addition/modification list, or only one combination may be included. In addition, a plurality of report configuration IDs may be included in the report configuration removal list, or only one report configuration ID may be included. It is to be noted that, as in FIG. 17, one or a plurality of combinations between report configuration IDs and report configurations are included in the report configuration addition/modification list illustrated in FIG. 13, and the content of the report configuration is the same as that of the report configuration illustrated in FIG. 17. It is to be noted that, as in FIG. 17, one or a plurality of report configuration IDs are included in the report configuration removal list illustrated in FIG. 13.

Figure 18:
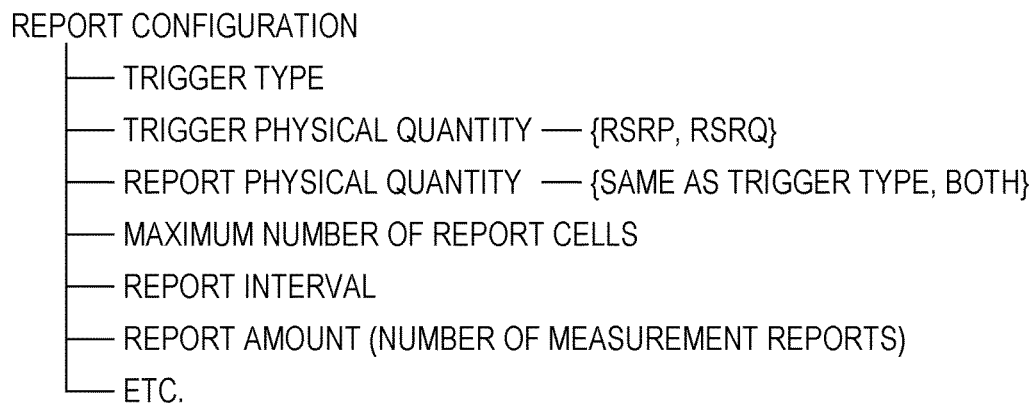
FIG. 18 is a diagram illustrating an example of a report configuration.

Next, the report configuration illustrated in FIG. 17 will be described with reference to FIG. 18. In an example, the report configuration includes a trigger type. In the trigger type, information such as a threshold for an event for performing reporting and reporting intervals is configured.

Next, the first measurement report and the second measurement report list will be described with reference to FIG. 19 as configurations relating to the first measurement report and the second measurement report in step S407 illustrated in FIG. 4. A dedicated control channel message type (UL-DCCH-MessageType) described with reference to FIG. 19 is one of RRC messages transmitted from the terminal apparatus to the base station apparatus 101. The dedicated control channel message type includes at least a measurement report (MeasurementReport). A report included in the measurement report can be selected. At least the first measurement report (measurement report-r8; MeasurementReport-r8-IEs) or the second measurement report list can be selected. The first measurement report includes measurement results (MeasResults), and the measurement results can include a measurement ID (MeasID), a PCell measurement result (measResultPCell), a neighboring cell measurement result (measResultNeighCells), and a serving frequency measurement result list.

As the neighboring cell measurement result, a EUTRA measurement result list (MeasResultListEUTRA), a UTRA measurement result list (MeasResultListUTRA), a GERAN measurement result list (MeasResultListGERAN), or a CDMA2000 measurement result list (MeasResultsCDMA2000) can be selected. As the serving frequency measurement result list, a serving cell index, a SCell measurement result, and a neighboring cell best measurement result may be included. It is to be noted that although it is assumed in FIG. 19 that the first measurement report and the second measurement report list are arranged parallel to each other and one of the two is selected, the second measurement report may be included in the measurement results of the first measurement report, instead.

Next, details of the EUTRA measurement result list illustrated in FIG. 19 will be described with reference to FIG. 20. The EUTRA measurement result list includes physical cell IDs (PhysCellID) and measurement results (measResult). By combining a physical cell ID and a measurement result, the terminal apparatus 102 can inform the base station apparatus 101 of a neighboring cell whose measurement information is being transmitted. In addition, the EUTRA measurement result list may include a plurality of physical cell IDs and a plurality of measurement results, or may include only one physical cell ID and one measurement result. It is to be noted that the PCell measurement result and the serving frequency measurement result list included in FIG. 19 are results of measurement of the measurement targets specified in the above-described first measurement target configuration. In addition, the measurement results included in the EUTRA measurement result list included in FIG. 20 and the like are results of measurement of the measurement targets specified in the third measurement target configuration illustrated in FIG. 13.

Figure 13:
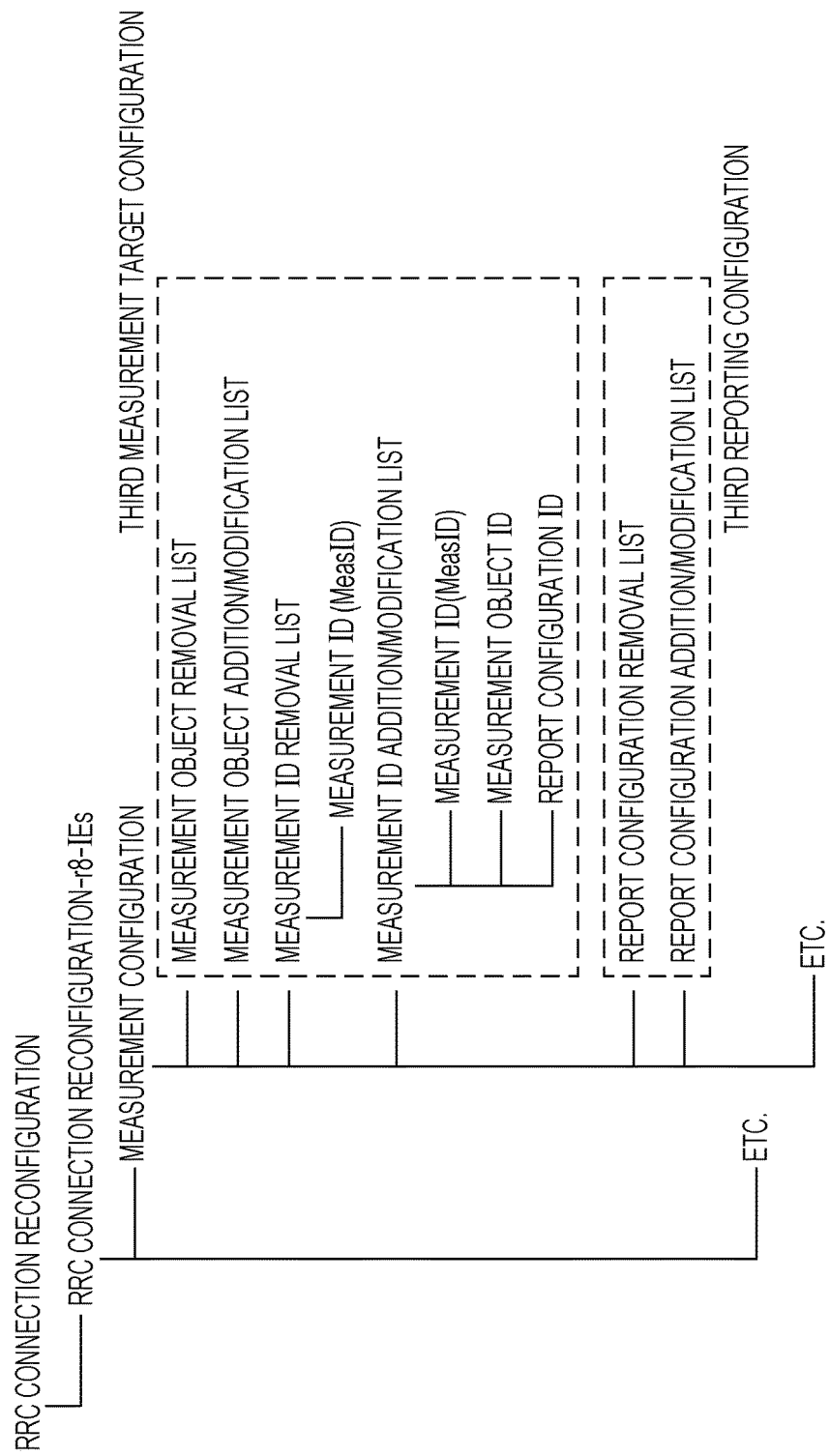
FIG. 13 is a diagram illustrating details of a third measurement target configuration and reporting configuration in step S403 illustrated in FIG. 4.

In addition, the measurement ID illustrated in FIG. 19 refers to the measurement ID illustrated in FIG. 13, and thus the measurement ID is associated with the measurement object included in the third measurement target configuration and the measurement report configuration included in the third reporting configuration. Furthermore, relationships between the measurement report and the first measurement target configuration to the third measurement target configuration will be described. The terminal apparatus 102 can report, to the base station apparatus 101, the received signal power of the cell-specific reference signals transmitted from Antenna Port 0 of a PCell, and the received signal power of the cell-specific reference signals transmitted from Antenna Port 0 of an SCell through the PCell measurement result and the SCell measurement result, respectively, included in the first measurement report. In addition, these are the measurement targets specified by the first measurement target configuration. On the other hand, the terminal apparatus 102 can report, to the base station apparatus 101, the received signal power of the cell-specific reference signals transmitted from Antenna Port 0 of neighboring cells through the physical cell IDs and the measurement results included in the EUTRA measurement result list. In addition, these are the measurement targets specified by the third measurement target configuration.

That is, the terminal apparatus 102 can report, to the base station apparatus 101, the received power of the cell-specific reference signals transmitted from Antenna Port 0 of cells that are not connected to the base station apparatus 101 (cells for which the RRC parameters have not been configured; neighboring cells) using the first measurement report and the third measurement target configuration. In addition, from a different perspective, the cell-specific reference signals transmitted from unconnected cells can be generated using physical IDs (physical cell IDs) different from those of the cell-specific reference signals transmitted from connected cells. In addition, from a different perspective, the terminal apparatus 102 can also report, to the base station apparatus 101, the received power of the cell-specific reference signals transmitted from Antenna Port 0 of the connected cells (the primary cell and the secondary cell) through the first measurement report.

Next, details of the second measurement report list illustrated in FIG. 19 will be described with reference to FIG. 21. The second measurement report included in the second measurement report list includes CSI-RS measurement indices and measurement results. It is to be noted that CSI-RS antenna port indices may be included instead of the CSI-RS measurement indices. The CSI-RS measurement indices and the CSI-RS antenna port indices mentioned here refer to the CSI-RS measurement indices and the CSI-RS antenna port indices, respectively, described with reference to FIG. 9 and FIG. 10, respectively. Therefore, the terminal apparatus 102 can report, to the base station apparatus 101, the received power of the measurement targets configured by the third reference signal configuration through the measurement results of the second measurement report. For example, when the channel state information reference signals transmitted from Antenna Port 15 have been specified by the third reference signal configuration, the terminal apparatus 102 can report, to the base station apparatus 101, the received power of the channel state information reference signals transmitted from Antenna Port 15.

That is, the terminal apparatus 102 can report, to the base station apparatus 101, the received signal power of the configured channel state information reference signals (for example, the channel state information reference signals transmitted from Antenna Port 15 or the like) of the cells connected to the base station apparatus 101 (the primary cell and the secondary cell) through the second measurement report. In addition, although not illustrated, an index that indicates a particular cell (carrier component), such as a serving cell index, may be included in the second measurement report illustrated in FIG. 21. In this case, the terminal apparatus 102 can report, to the base station apparatus 101, a cell and a channel state information reference signal included in the cell from which a result has been obtained as a result of measurement by combining the serving cell index, the CSI-RS measurement index, and the measurement result.

In addition, in the second embodiment, the base station apparatus 101 configures, for each terminal apparatus 102, the second measurement target configuration for measuring only the channel state information reference signals configured by the base station apparatus 101, and configures, for each terminal apparatus 102, the third measurement target configuration for measuring only the cell-specified reference signals generated using physical IDs different from those of the cells to which each terminal apparatus 102 is connected. In addition, the terminal apparatus 102 reports, to the base station apparatus 101, the received signal power of the reference signals that are the measurement targets specified by the second measurement target configuration and the received signal power of the reference signals that are the measurement targets specified by the third measurement target configuration.

In addition, in the second embodiment, the base station apparatus 101 configures, for each terminal apparatus, the first reference signal configuration for configuring the measurement targets for channel state reporting, configures, for each terminal apparatus 102, the second reference signal configuration for specifying resource elements excluded from demodulation of data during the data demodulation, and configures, for each terminal apparatus 102, the third reference signal configuration for configuring the measurement targets for enabling the terminal apparatus 102 to measure the received power of the reference signals. In addition, the terminal apparatus 102 receives information configured by the base station apparatus 101, reports the channel state to the base station apparatus 101 on the basis of the first reference signal configuration, determines resource elements excluded from demodulation of data during the data demodulation, demodulates the data, and measures the received power of the reference signals on the basis of the third reference signal configuration.

By using the above-described embodiment of the present application, the following effects can be produced. Assume that the cell-specific reference signals illustrated in FIG. 2 and the channel state information reference signals transmitted from Antenna Ports 15, 16, 17, and 18 illustrated in FIG. 3 are transmitted only from the base station apparatus 101 using the downlink 105, that the measurement targets configured in the second measurement target configuration and the second reporting configuration configured in step S403 illustrated in FIG. 4, that is, the measurement targets configured in the third reference signal configuration illustrated in FIG. 9, are the channel state information reference signals transmitted from Antenna Port 19, and that the channel state information reference signals are transmitted only from the RRH 103 using the downlink 107 as these measurement targets. In this case, in step S405 illustrated in FIG. 4, by measuring the received signal power of the cell-specific reference signals that are the first measurement targets and the channel state information reference signals transmitted only from the RRH 103, which are the second measurement targets, Path Loss 1, which is the downlink path loss between the base station apparatus 101 and the terminal apparatus 102, and Path Loss 2, which is the downlink path loss between the RRH 103 and the terminal apparatus 102, can be calculated.

Furthermore, since the first reference signal configuration is performed for Antenna Ports 15, 16, 17, and 18, rank information (RI; rank indicator), precoding information (PMI; precoding matrix indicator), and channel quality information (CQI; channel quality indicator) based on this are transmitted and applied to precoding of the terminal-specific reference signals and the data signals and a modulation and coding scheme (MCS) for the data signals. On the other hand, only measurement and reporting of the received power is performed for the channel state information reference signals transmitted from Antenna Port 19, which are the measurement targets configured by the third reference signal configuration. As a result, in the communication system, an antenna port (or measurement targets) for which only the received power (and the path loss) is measured can be configured separately from an antenna port that is actually performing communication using the downlink. For example, the base station apparatus 101 can reduce the transmission frequency of the reference signals corresponding to the antenna port used only for measuring the received power compared to that of the reference signals corresponding to the antenna port that is performing communication using the downlink, and suppress an increase in overhead of the reference signals in the system.

In addition, when the received signal power of the channel state information reference signals transmitted from Antenna Port 19 has increased (that is, the path loss between the RRH 103 and the terminal apparatus 102 has decreased), the base station apparatus 101 can always transmit a downlink signal from an appropriate transmission point (that is, the base station apparatus 101 or the RRH 103) by reconfiguring the channel state information reference signals configured by the first reference signal configuration to an antenna port assigned to the RRH 103. In addition, from a different perspective, whereas Antenna Ports 15, 16, 17, and 18 for the channel state information reference signals configured in the first reference signal configuration can be used for transmitting downlink signals, a path loss obtained from the channel state information reference signals transmitted from Antenna Port 19 configured by the third reference signal configuration can be used for transmitting an uplink signal.

This enables the terminal apparatus 102 to receive a downlink signal from the base station apparatus 101 through the downlink 105 while transmitting an uplink signal to the RRH 103 using the uplink 108. Thus, by configuring the first reference signal configuration for configuring the measurement targets for calculating the CSI feedback at least including any of the CQI, the PMI, and the RI and the third reference signal configuration for configuring the measurement targets for calculating the received signal power and causing at least part of the resources configured by the third reference signal configuration not to be included in the resources configured by the first reference signal configuration, flexible design of the communication system can be performed, that is, for example, connection destinations of a downlink signal and an uplink signal become different.

In addition, from a different perspective, assume that the cell-specific reference signals illustrated in FIG. 2 are transmitted only from the base station apparatus 101 using the downlink 105, that the measurement targets configured by the second measurement target configuration and the second reporting configuration configured in step S403 illustrated in FIG. 4 are the channel state information reference signals illustrated in FIG. 3, and that the channel state information reference signals are transmitted only from the RRH 103 using the downlink 107 as these measurement targets. Furthermore, assume that the base station apparatus 101 and the RRH 103 perform carrier aggregation and communication is performed using two carrier components (CCs; cells) whose central frequencies are different in both the uplink and the downlink. These will be referred to as a first carrier component and a second carrier component, and it is assumed that the base station apparatus 101 and the RRH 103 can perform individual communication and coordinated communication using these carrier components.

In this case, the terminal apparatus 102 connects to the base station apparatus 101 through the first carrier component. Meanwhile, measurement of the measurement targets is performed in accordance with parameters relating to predetermined first measurement. Here, the measurement targets are cell-specific reference signals transmitted from Antenna Port 0 of the connected cell. Meanwhile, parameters relating to third measurement and third reporting are configured, and measurement of the measurement targets is performed. Here, the measurement targets are cell-specific reference signals transmitted from an unconnected Antenna Port 0. Thereafter, the first measurement report illustrated in FIG. 19 is reported from the terminal apparatus 102 to the base station apparatus 101 in step S407 illustrated in FIG. 4. That is, the received power of the cell-specific reference signals transmitted from Antenna Port 0 of the connected cell and the received power of the cell-specific reference signals transmitted from the unconnected Antenna Port 0 are reported to the base station apparatus 101 through the first measurement report. On the other hand, after the first carrier component (primary cell) is connected, the second measurement configuration for the first carrier component is individually performed using the dedicated physical configuration, and when the second carrier component (secondary cell) is added (when the dedicated physical configuration for the SCell is configured), the second measurement configuration for the second carrier component is performed.

That is, by performing the third measurement target configuration, the terminal apparatus 102 measures the cell-specific reference signals transmitted from Antenna Port 0 of the unconnected cell and performs reporting to the base station apparatus 101, but by performing the second measurement configuration and the second measurement report, the terminal apparatus 102 measures an antenna port of only the connected cell for which the channel state information reference signals have been configured, and performs reporting to the base station apparatus 101 through the second measurement report. As a result, the terminal apparatus 102 and the base station apparatus 101 can search for an optimal base station apparatus 101 and cells using only the third measurement target configuration, the third reporting configuration, and the first measurement report, and can search for an optical transmission point (for example, the base station apparatus 101 or the RRH 103) or measure a path loss on the basis of the first measurement target configuration and the second measurement target configuration.

It is to be noted here that the connected cell refers to a cell for which the parameters have been set using RRC signals, that is, the primary cell (first carrier component), the secondary cell (second carrier component), or the like, and the unconnected cell refers to a cell for which the parameters have not been set using RRC signals, that is, a neighboring cell or the like. In addition, from a different perspective, the cell-specific reference signals transmitted from the unconnected cell can be generated using physical IDs (physical cell IDs) different from those for the cell-specific reference signals transmitted from the connected cell.

Third Embodiment

Next, a third embodiment will be described. In the third embodiment, the processing in step S408 and step S409 illustrated in FIG. 4 will be described in detail. In particular, processing performed by the communication system when parameters relating to a plurality of types of uplink power control have been configured will be described in detail. Here, a path loss (first path loss) is calculated on the basis of information regarding the first measurement target configuration and information regarding the uplink power control-related parameter configuration, and first uplink transmission power is set on the basis of the first path loss and the information regarding the uplink power control-related parameter configuration. In addition, the terminal apparatus 102 calculates a path loss (second path loss) on the basis of information regarding the second measurement target configuration and the information regarding the uplink power control-related parameter configuration, and sets second uplink transmission power on the basis of the second path loss and the information regarding the uplink power control-related parameter configuration. That is, the first measurement target configuration, the second measurement target configuration, the first uplink transmission power, and the second uplink transmission power are implicitly (in a fixed manner) set.

A method for calculating the uplink transmission power will be described. The terminal apparatus 102 determines the uplink transmission power of a PUSCH in a subframe i of a serving cell c from Expression (1).

[Expression 1]

$$P_{PUSCH,c}(i) = \min \begin{Bmatrix} P_{CMAX,c}(i), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{Bmatrix} \quad (1)$$

$P_{CMAX,c}$ denotes the maximum transmission power of the terminal apparatus 102 for the serving cell c. $M_{PUSCH,c}$ denotes a transmission bandwidth (the number of resource blocks in the frequency domain) of the serving cell c. In addition, $P_{O\_PUSCH,c}$ denotes the nominal power of the PUSCH in the serving cell c. $P_{O\_PUSCH,c}$ is determined from $P_{O\_NOMINAL\_PUSCH,c}$ and $P_{O\_UE\_PUSCH,c}$. $P_{O\_NOMINAL\_PUSCH,c}$ is an uplink power control-related cell-specific parameter. $P_{O\_UE\_PUSCH,c}$ is an uplink power control-related terminal-specific parameter. α denotes an attenuation coefficient (path loss compensation coefficient) used for fractional transmission power control of the entirety of the cell. $PL_c$ denotes the path loss and is obtained from a reference signal transmitted with known power and the RSRP. For example, when the path loss between the base station apparatus 101 (or the RRH 103) and the terminal apparatus 102 is 5 dB, $PL_c$ is a parameter for compensating the value. In addition, in the present invention, $PL_c$ may be a result of calculation of the path loss obtained from the first embodiment or the second embodiment. $\Delta_{TF,c}$ is obtained from Expression (2).

[Expression 2]

$$\Delta_{TF,c}(i) = 10 \log_{10}((2^{BPRE \cdot K_s} - 1) \cdot \beta_{offset}^{PUSCH}) \quad (2)$$

BPRE denotes the number of bits that can be assigned to each resource element. In addition, $K_s$ is an uplink power control-related parameter transmitted from a higher layer using an RRC signal, and is a parameter depending on the modulation and coding scheme (MCS) for an uplink signal (deltaMCS-Enabled). In addition, $f_c$ is determined from an accumulated-enabled, which is an uplink power control-related parameter, and the TPC command included in an uplink grant (DCI format). It is to be noted that the TPC command may be included in a downlink assignment.

The terminal apparatus 102 determines the uplink transmission power of a PUCCH in the subframe i from Expression (3).

[Expression 3]

$$P_{PUCCH}(i) = \min \begin{Bmatrix} P_{PCMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} \quad (3)$$

$P_{O\_PUCCH}$ denotes the nominal power of the PUCCH. $P_{O\_PUCCH}$ is determined from $P_{O\_NOMINAL\_PUCCH}$ and $P_{O\_UE\_PUCCH}$. $P_{O\_NOMINAL\_PUCCH}$ is an uplink power control-related cell-specific parameter. $P_{O\_UE\_PUCCH}$ is an uplink power control-related terminal-specific parameter. $n_{CQI}$ denotes the number of bits of CQI, $N_{HARQ}$ denotes the number of bits of an HARQ, and $n_{SR}$ denotes the number of bits of an SR. $h(n_{CQI}, n_{HARQ}, n_{SR})$ is a parameter defined depending on these numbers of bits, that is, a PUCCH format. $\Delta_{F\_PUCCH}$ is a parameter transmitted from a higher layer (deltaFList-PUCCH). $\Delta_{TxD}$ is a parameter transmitted from a higher layer when transmission diversity has been configured. g is a parameter used for adjusting the power control for the PUCCH.

The terminal apparatus 102 determines the uplink transmission power of an SRS from Expression (4).

[Expression 4]

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \quad (4)$$

$P_{SRS\_OFFSET}$ denotes an offset for adjusting the transmission power of the SRS, and is included in uplink power control parameters (uplink power control-related terminal-specific parameter configuration). $M_{SRS,c}$ denotes the bandwidth (the number of resource blocks in the frequency domain) of the SRS arranged in the serving cell c.

The terminal apparatus 102 determines the uplink transmission power of a PRACH from Expression (5).

[Expression 5]

$$P_{PRACH} = \min\{P_{CMAX,c}(i), \text{PREAMBLE\_RECEIVED\_TARGET\_POWER} + PL_c\} \quad (5)$$

$P_{CMAX,c}$ of the PRACH denotes the maximum transmission power of the primary cell. $PL_c$ of the PRACH denotes a downlink path loss of the primary cell calculated by the terminal apparatus 102.

In addition, when the transmission power of each of these uplink physical channels exceeds the maximum transmission power $P_{CMAX,c}(i)$ of the terminal apparatus 102 as a result of calculation of various transmission power parameters, path losses, and the like, the terminal apparatus 102 transmits each uplink physical channel with the maximum transmission power.

The terminal apparatus 102 determines PREAMBLE_RECEIVED_TARGET_POWER from Expression (6).

[Expression 6]

PREAMBLE_RECEIVED_TARGET_POWER= preambleInitialReceivedPower+DELTA_PREAMBLE+(PREAMBLE_TRANSMISSION_COUNTER−1)*powerRampingStep  (6)

preambleInitialReceivedPower denotes the initial received power of a random access preamble. DELTA_PREAMBLE denotes a power offset associated with a preamble format. PREAMBLE_TRANSMISSION_COUNTER denotes the number of times of transmission of the PRACH (random access preamble). powerRampingStep is a parameter indicating the amount of increase in power for increasing the transmission power in retransmission of the PRACH by a certain amount when random access has failed.

Here, the terminal apparatus 102 determines the path loss (downlink path loss) $PL_c$ of the serving cell c from Expression (7).

[Expression 7]

$$PL_c = \text{referenceSignalPower} - \text{higher layer filtered RSRP} \tag{7}$$

referenceSignalPower denotes a power value of a path loss measurement reference signal (for example, a CRS) for each resource element, and is included in PDSCH-Config by a higher layer and transmitted. That is, referenceSignalPower denotes the transmission power of a path loss measurement reference signal transmitted from the base station apparatus 101. higher layer filtered RSRP is RSRP filtered by a higher layer. Furthermore, higher layer filtered RSRP is obtained from Expression (8).

[Expression 8]

$$F_n = (1-a) \cdot F_{n-1} + a \cdot M_n \tag{8}$$

$F_n$ denotes a result of measurement to be updated, that is, higher layer filtered RSRP. In addition, $F_{n-1}$ denotes a past result of measurement, that is, past higher layer filtered RSRP. In addition, $M_n$ denotes a latest result of measurement. In addition, a denotes a measurement physical quantity, and is determined by Expression (9).

[Expression 9]

$$a = \tfrac{1}{2}^{(k/4)} \tag{9}$$

k is configured by a filter coefficient (filterCoefficient). In addition, filterCoefficient is configured in quantityConfig or UnlinkPowerControl. When the base station apparatus 101 focuses upon a past result of measurement, the base station apparatus 101 sets a large value of k so that the value of a becomes small, and when the base station apparatus 101 focuses upon a latest result of measurement, the base station apparatus 101 sets a small value of k so that the value of a becomes large.

FIG. 22 is a diagram illustrating an example of information elements included in the (first) uplink power control-related parameter configuration (UplinkPowerControl). The uplink power control-related parameter configuration includes a cell-specific configuration (uplink power control-related cell-specific parameter configuration (UplinkPowerControlCommon)) and a terminal-specific configuration (uplink power control-related terminal-specific parameter configuration (UplinkPowerControlDedicated)), and each configuration includes uplink power control-related parameters (information elements) configured in a cell-specific manner or in a terminal-specific manner. In the cell-specific configuration, nominal PUSCH power (p0-Nominal-PUSCH), which is PUSCH power that can be set in a cell-specific manner, the attenuation coefficient (path loss compensation coefficient) α (alpha) for the fractional transmission power control, nominal PUCCH power (p0-NominalPUCCH), which is PUCCH power that can be set in a cell-specific manner, $\Delta_{F\_PUCCH}$ (deltaFList-PUCCH) included in Expression (3), and a power adjustment value (deltaPreambleMsg3) when Preamble Message 3 is transmitted are included.

In addition, in the terminal-specific configuration, terminal-specific PUSCH power (p0-UE-PUSCH), which is PUSCH power that can be set in a terminal-specific manner, a parameter (deltaMCS-Enabled) relating to a power adjustment value $K_s$ in the modulation and coding scheme used in Expression (2), a parameter (accumulationEnabled) necessary to configure the TPC command, terminal-specific PUCCH power (p0-UE-PUCCH), which is PUCCH power that can be set in a terminal-specific manner, the power offset $P_{SRS\_OFFSET}$ (pSRS-Offset or pSRS-OffsetAp-r10) of the periodic and aperiodic SRSs, and the filter coefficient (filterCoefficient) for the reference signal received power RSRP are included. These configurations can be configured for the primary cell, but the same configurations can be set for the secondary cell. Furthermore, in the terminal-specific configuration for the secondary cell, a parameter (pathlossReference-r10) for specifying calculation of a path loss using path loss measurement reference signals of the primary cell or the secondary cell is included.

Figure 23:
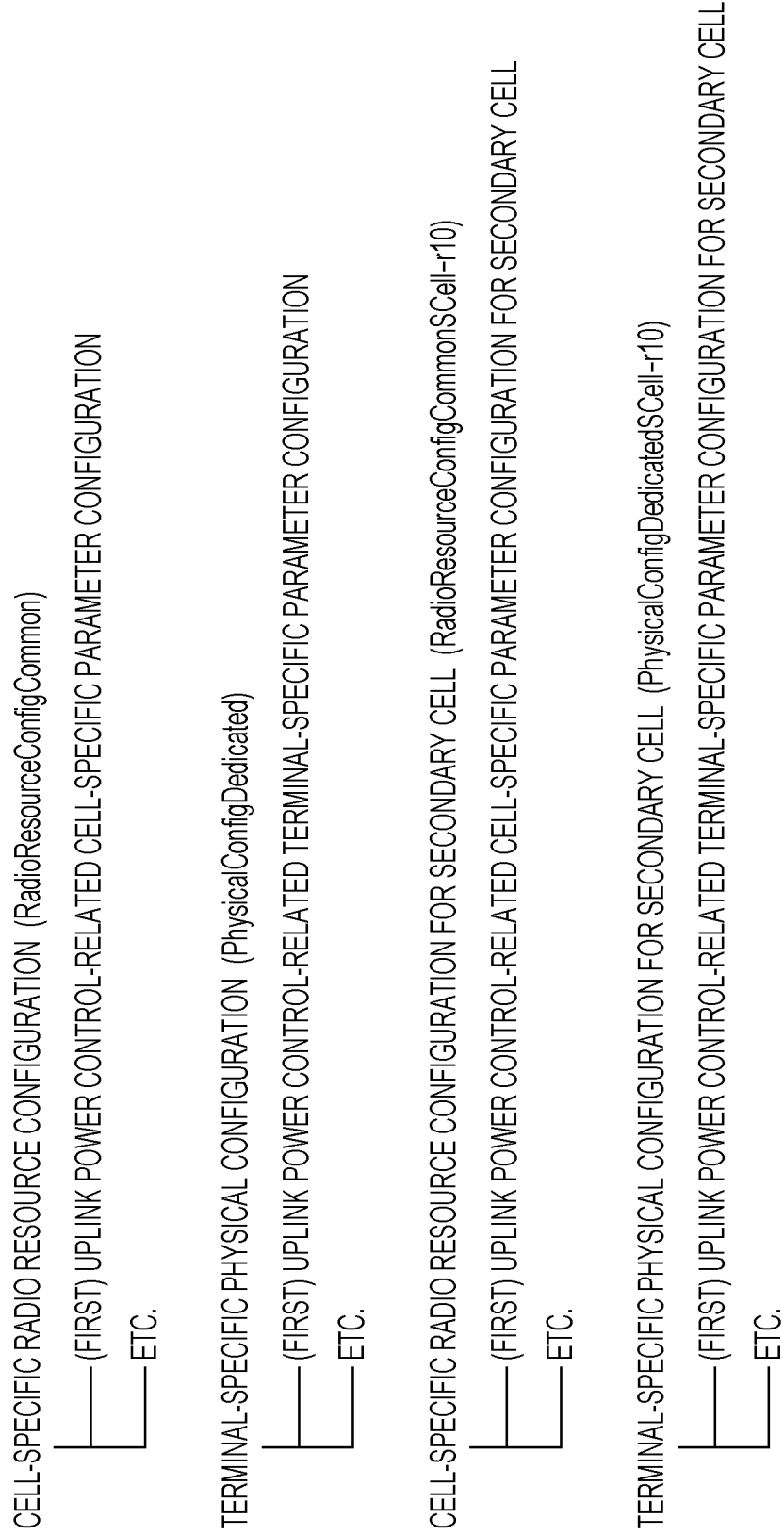
FIG. 23 is a diagram illustrating another example of the details of the uplink power control-related parameter configuration.

FIG. 23 illustrates an example of information including the uplink power control-related parameter configuration (first uplink power control-related parameter configuration). The (first) uplink power control-related cell-specific parameter configuration (UplinkPowerControlCommon1) is included in a cell-specific radio resource configuration (RadioResourceConfigCommon). The (first) uplink power control-related terminal-specific parameter configuration (UplinkPowerControlDedicated1) is included in a terminal-specific physical configuration (PhysicalConfigDedicated). The (first) uplink power control-related cell-specific parameter configuration for the secondary cell (UplinkPowerControlCommonSCell-r10-1) is included in a cell-specific radio resource configuration for the secondary cell (RadioResourceConfigCommonSCell-r10). The (first) uplink power control-related terminal-specific parameter configuration for the secondary cell (UplinkPowerControlDedicatedSCell-r10-1) is included in a terminal-specific physical configuration for the secondary cell (PhysicalConfigDedicatedSCell-r10).

In addition, a terminal-specific physical configuration (for the primary cell) is included in a terminal-specific radio resource configuration (for the primary cell) (RadioResourceConfigDedicated). In addition, the terminal-specific physical configuration for the secondary cell is included in a terminal-specific radio resource configuration for the secondary cell (RadioResourceConfigDedicatedSCell-r10). It is to be noted that the above-mentioned cell-specific radio resource configuration and terminal-specific radio resource configuration may be included in the RRC connection reconfiguration (RRCConnectionReconfiguration) or the RRC reestablishment (RRCConnectionReestablishment) described in the second embodiment, instead. It is to be noted that the above-mentioned cell-specific radio resource configuration for the secondary cell and terminal-specific radio resource configuration for the secondary cell may be included in the SCell addition/modification list described in the second embodiment, instead. It is to be noted that the above-mentioned cell-specific radio resource configuration and terminal-specific radio resource configuration may be configured for each terminal apparatus 102 through RRC signals (dedicated signaling).

It is to be noted that the RRC connection reconfiguration and the RRC reestablishment may be set for each terminal apparatus through RRC messages. It is to be noted that the above-mentioned uplink power control-related cell-specific parameter configuration may be set for the terminal apparatus 102 through the system information. Alternatively, the above-mentioned uplink power control-related terminal-specific parameter configuration may be set for each terminal apparatus 102 through RRC signals (dedicated signaling).

In the third embodiment, the terminal apparatus 102 can calculate the uplink transmission power ($P_{PUSCH1}$, $P_{PUCCH1}$, and $P_{SRS1}$) of various uplink signals (PUSCH, PUCCH, and SRS) on the basis of the first measurement target configuration and the second measurement target configuration described in the first embodiment and the second embodiment. It is to be noted that various uplink signals also refer to a plurality of types of uplink physical channel. In addition, various uplink physical channels indicate that at least one of uplink physical channels, namely the PUSCH, the PUCCH, the UL DMRS, the SRS, the PRACH, and the control information (CQI, PMI, RI, and Ack/Nack) included in the PUCCH is included.

In the third embodiment, the base station apparatus 101 transmits the first measurement target configuration, the second measurement target configuration, and the uplink power control-related parameter configuration to the terminal apparatus 102. In an example, the terminal apparatus 102 calculates a path loss (first path loss) on the basis of the first measurement target configuration and the uplink power control-related parameter configuration in accordance with the transmitted information, and calculates the first uplink transmission power on the basis of the first path loss and the uplink power control-related parameter configuration. In addition, the terminal apparatus 102 calculates a path loss (second path loss) on the basis of the second measurement target configuration and the uplink power control-related parameter configuration, and calculates the second uplink transmission power on the basis of the second path loss and the uplink power control-related parameter configuration.

That is, the first uplink transmission power may always be calculated on the basis of the measurement targets transmitted using the first measurement target configuration, and the second uplink transmission power may always be calculated on the basis of the measurement target transmitted using the second measurement target configuration. More specifically, the first uplink transmission power may always be calculated on the basis of Antenna Port 0 for the cell-specific reference signals that are the measurement targets transmitted using the first measurement target configuration, and the second uplink transmission power may always be calculated on the basis of a resource (or an antenna port) in which the channel state information reference signal has been specified, which is the measurement target transmitted using the second measurement target configuration. Furthermore, in another example, when a plurality of measurement targets (for example, a plurality of resources in which the channel state information reference signals have been specified or a plurality of antenna ports) have been specified in the second measurement target configuration, one of the measurement targets used for calculating the second uplink transmission power might be transmitted. In this case, a path loss reference resource illustrated in FIG. 24, which will be described later, may be configured in the first uplink power control-related cell-specific parameter configuration, the first uplink power control-related cell-specific parameter configuration for the secondary cell, the first uplink power control-related terminal-specific parameter configuration, or the first uplink power control-related terminal-specific parameter configuration for the secondary cell.

Furthermore, in another example, the first uplink transmission power need not be related to the first measurement target configuration, and may always be calculated on the basis of Antenna Port 0 (or Antenna Port 0 and Antenna Port 1) for the cell-specific reference signals, instead. In addition, the terminal apparatus 102 may perform control in such a way as to determine whether to transmit an uplink signal with the above-mentioned first uplink transmission power or the above-mentioned second uplink transmission power in accordance with a frequency resource in which a DCI format (for example, an uplink grant) has been detected and a timing at which a DCI format has been detected.

Thus, the first transmission power and the second uplink transmission power may be associated with the first measurement target configuration and the second measurement target configuration (and the measurement targets specified in the measurement target configurations), respectively, in a fixed manner.

In a more specific example, when carrier aggregation, in which communication is performed using a plurality of carrier components (here, two carrier components), is possible, each carrier component may be associated with the first measurement target configuration or the second measurement target configuration. That is, the first measurement target configuration and the first carrier component may be associated with each other, and the second measurement target configuration and the second carrier component may be associated with each other. In addition, when the first carrier component has been configured as the primary cell and the second carrier component has been configured as the secondary cell, the first measurement target configuration may be associated with the primary cell, and the second measurement target configuration may be associated with the secondary cell. That is, the base station apparatus 101 may configure the first measurement target configuration and the second measurement target configuration for each cell.

When a DCI format (uplink grant) has been detected from the primary cell, the terminal apparatus 102 calculates the first path loss and the first uplink transmission power from the first measurement target configuration, the uplink power control-related cell-specific parameter configuration for the primary cell, and the uplink power control-related terminal-specific parameter configuration for the primary cell. When a DCI format (uplink grant) has been detected from the secondary cell, the terminal apparatus 102 calculates the second path loss and the second uplink transmission power from the second measurement target configuration, the uplink power control-related cell-specific parameter configuration for the secondary cell, and the uplink power control-related terminal-specific parameter configuration for the secondary cell.

From a different perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only by the primary cell, and dynamic transmission control of an uplink signal for Terminal Apparatus B is performed only by the secondary cell. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the primary cell, and when the base station apparatus 101 intends the terminal apparatus 102 to transmit an uplink signal for the RRH 103, the base station apparatus 101 transmits an uplink grant to the terminal apparatus 102 while including the uplink grant in the secondary cell. Furthermore, by using the TPC command, which is a correction value of the transmission power control of an uplink signal included in a DCI format, the base station apparatus 101 can perform the transmission power control of an uplink signal for the base station apparatus 101 or the RRH 103. The base station apparatus 101 sets the value of the TPC command included in an uplink grant to one for the base station apparatus 101 or one for the RRH 103 depending on a cell (carrier component or component carrier) with which the uplink grant is transmitted.

That is, when intending to increase the uplink transmission power for the base station apparatus 101, the base station apparatus 101 sets a large power correction value of the TPC command in the primary cell, and when intending to decrease the uplink transmission power for the RRH 103, the base station apparatus 101 sets a small power correction value of the TPC command in the secondary cell. The base station apparatus 101 performs the transmission of an uplink signal and the uplink transmission power control (UL TPC) for Terminal Apparatus A using the primary cell, and performs the transmission of an uplink signal and the uplink transmission power control for Terminal Apparatus B using the secondary cell. That is, the base station apparatus 101 can perform dynamic uplink transmission power control for the terminal apparatus 102 by setting the power correction value of the TPC command (transmission power control command) in the primary cell to a first value and the power correction value of the TPC command in the secondary cell to a second value. That is, the base station apparatus 101 can perform, for the terminal apparatus 102, power correction (power control) for each cell using the TPC command.

Here, the UL TPC refers to transmission of an uplink signal with appropriate transmission power in accordance with a communication environment. That is, the UL TPC refers to configuration of appropriate uplink power control-related parameters by the base station apparatus 101 on the basis of a result of measurement of an uplink channel and the CSI feedback from the terminal apparatus 102 and transmission to the terminal apparatus 102. In addition, the UL TPC refers to selection of one of a plurality of uplink power control-related parameters and transmission of an uplink signal with appropriate transmission power from the base station apparatus 101 to the terminal apparatus 102.

In an example, assume that downlink subframes are classified into a first subset (first subframe subset) and a second subset (second subframe subset). Now, when an uplink grant has been received in a subframe n (n is a natural number), the terminal apparatus 102 transmits an uplink signal using a subframe n+4, and therefore it is naturally assumed that uplink subframes are also classified into a first subset and a second subset. For example, when Downlink Subframes 0 and 5 are classified into the first subset and Downlink Subframes 1, 2, 3, 4, 6, 7, 8, and 9 are classified into the second subset, Uplink Subframes 4 and 9 are naturally classified into the first subset and Uplink Subframes 0, 1, 2, 3, 5, 6, 7, and 8 are classified into the second subset.

In this case, if a downlink subframe index that has detected the uplink grant is included in the first subset, the terminal apparatus 102 calculates the first path loss and the first uplink transmission power on the basis of the first measurement target configuration and the uplink power control-related parameter configuration, and if the downlink subframe index that has detected the uplink grant is included in the second subset, the terminal apparatus 102 calculates the second path loss and the second uplink transmission power on the basis of the second measurement target configuration and the uplink power control-related parameter configuration. That is, the terminal apparatus 102 can perform control in such a way as to determine whether to transmit an uplink signal with the first uplink transmission power or the second transmission power in accordance with whether the downlink subframe that has detected the uplink grant is included in the first subset or the second subset.

It is to be noted that the first subset may be configured by downlink subframes including a P-BCH (physical broadcast channel), a PSS (primary synchronization signal), and an SSS (secondary synchronization channel). In addition, the second subset may be configured by subframes that do not include the P-BCH, the PSS, and the SSS.

From another perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only by the first subframe subset, and dynamic transmission control of an uplink signal for Terminal Apparatus B is performed only by the second subframe subset. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the first subframe subset, and when the base station apparatus 101 intends the terminal apparatus 102 to transmit an uplink signal for the RRH 103, the base station apparatus 101 transmits an uplink grant to the terminal apparatus 102 while including the uplink grant in the second subframe subset.

Furthermore, by using the TPC command, which is a correction value of the transmission power control of an uplink signal included in an uplink grant, the base station apparatus 101 can perform the transmission power control of an uplink signal for the base station apparatus 101 or the RRH 103. The base station apparatus 101 sets the value of the TPC command included in an uplink grant to one for the base station apparatus 101 or one for the RRH 103 depending on a subframe subset with which the uplink grant is transmitted. That is, when intending to increase the uplink transmission power for the base station apparatus 101, the base station apparatus 101 sets a large power correction value of the TPC command in the first subframe subset, and when intending to decrease the uplink transmission power for the RRH 103, the base station apparatus 101 sets a small power correction value of the TPC command in the second subframe subset. The base station apparatus 101 performs the transmission of an uplink signal and the uplink transmission power control for Terminal Apparatus A using the first subframe subset, and performs the transmission of an uplink signal and the uplink transmission power control for Terminal Apparatus B using the second subframe subset.

That is, the base station apparatus 101 can perform dynamic uplink transmission power control for the terminal apparatus 102 by setting the power correction value of the TPC command (transmission power control command) included in the first subframe subset to a first value and the power correction value of the TPC command included in the second subframe subset to a second value. The base station apparatus 101 may set the first value of the power correction value to be larger than the second value. That is, the base station apparatus 101 can perform, for the terminal apparatus 102, power correction (power control) independently for each subframe subset using the TPC command.

For example, when the terminal apparatus 102 has detected an uplink grant in a first control channel region, the terminal apparatus 102 calculates the first path loss and the first uplink transmission power on the basis of the first measurement target configuration and the uplink power control-related parameter configuration, and when the terminal apparatus 102 has detected an uplink grant in a second control channel, the terminal apparatus 102 calculates the second path loss and the second uplink transmission power on the basis of the second measurement target configuration and the uplink power control-related parameter configuration. That is, the terminal apparatus 102 can perform control in such a way as to determine whether to transmit an uplink signal with the first uplink transmission power or the second uplink transmission power in accordance with a control channel region in which an uplink grant has been detected.

From a different perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only by the first control channel (PDCCH) region, and dynamic transmission control of an uplink signal for Terminal Apparatus B is performed only by in the second control channel (X-PDCCH) region. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the first control channel region, and when the base station apparatus 101 intends the terminal apparatus 102 to transmit an uplink signal for the RRH 103, the base station apparatus 101 transmits an uplink grant to the terminal apparatus 102 while including the uplink grant in the second control channel region.

Furthermore, by using the TPC command, which is a correction value of the transmission power control of an uplink signal included in an uplink grant, the base station apparatus 101 can perform the transmission power control of an uplink signal for the base station apparatus 101 or the RRH 103. The base station apparatus 101 sets the value of the TPC command included in an uplink grant to one for the base station apparatus 101 or one for the RRH 103 depending on a control channel region with which the uplink grant is transmitted. That is, when intending to increase the uplink transmission power for the base station apparatus 101, the base station apparatus 101 sets a large power correction value of the TPC command in the first control channel region, and when intending to decrease the uplink transmission power for the RRH 103, the base station apparatus 101 sets a small power correction value of the TPC command in the second control channel region.

The base station apparatus 101 performs the transmission of an uplink signal and the uplink transmission power control for Terminal Apparatus A using the first control channel region, and performs the transmission of an uplink signal and the uplink transmission power control for Terminal Apparatus B using the second control channel region. That is, the base station apparatus 101 can perform dynamic uplink transmission power control for the terminal apparatus 102 by setting the power correction value of the TPC command (transmission power control command) in the first control channel region to a first value and the power correction value of the TPC command in the second control channel region to a second value. The base station apparatus 101 may set the first value of the power correction value to be larger than the second value. That is, the base station apparatus 101 can perform power correction (power control) for the terminal apparatus 102 using the TPC command on the basis of a control channel region in which a DCI format (for example, an uplink grant) is set.

In addition, in the third embodiment, the base station apparatus 101 transmits a radio resource control signal including the first measurement target configuration and the second measurement target configuration to the terminal apparatus 102, and transmits a radio resource control signal including the uplink power control-related parameter configuration to the terminal apparatus 102. In addition, the terminal apparatus 102 calculates the first path loss and the first uplink transmission power on the basis of the first measurement targets included in the first measurement target configuration and the uplink power control-related parameter configuration, calculates the second path loss and the second uplink transmission power on the basis of the second measurement targets included in the second measurement target configuration and the uplink power control-related parameter configuration, and transmits an uplink signal to the base station apparatus 101 with the first uplink transmission power or the second uplink transmission power.

Referring back to FIG. 1, assume that the base station apparatus 101 and the RRH 103 has performed carrier aggregation and are performing communication using two carrier components (CCs; cells) whose central frequencies are different in both the uplink and the downlink. These will be referred to as a first carrier component and a second carrier component, and it is assumed that the base station apparatus 101 and the RRH 103 can perform individual communication and coordinated communication using these carrier components. The first carrier component is used for the communication between the base station apparatus 101 and the terminal apparatus 102, and the second carrier component is used for the communication between the RRH 103 and the terminal apparatus 102.

That is, the downlink 105 or the uplink 106 is connected using the first carrier component, and the downlink 107 or the uplink 108 is connected using the second carrier component. At this time, when the terminal apparatus 102 has detected an uplink grant from the downlink 105 through the first carrier component, the terminal apparatus 102 can perform transmission to the uplink 106 through the first carrier component with the first uplink transmission power, and when the terminal apparatus 102 has detected an uplink grant from the downlink 107 through the second carrier component, the terminal apparatus 102 can perform transmission to the uplink 108 through the second carrier component with the second uplink transmission power. In addition, when the detected uplink grant includes a carrier indicator, the terminal apparatus 102 may calculate the path loss and the uplink transmission power using a path loss reference resource associated with a carrier (cell, primary cell, secondary cell, serving cell index) indicated by the carrier indicator.

In addition, the base station apparatus 101 can perform control in such a way as to perform appropriate transmission power control on the terminal apparatus 102 by scheduling the terminal apparatus 102 that communicates with the base station apparatus 101 and the terminal apparatus 102 that communicates with the RRH 103 using different carrier components and configuring the first measurement target configuration or the second measurement target configuration for each carrier component. It is to be noted that the scheduling includes resource assignment (time-frequency resource assignment) for downlink signals or uplink signals for the terminal apparatus 102.

In addition, in the case of the aperiodic SRS (A-SRS), various DCI formats and the measurement targets configured in the measurement target configuration may be associated with each other. That is, when the terminal apparatus 102 has detected an SRS request in which a request to transmit the A-SRS is specified in a first DCI format, the terminal apparatus 102 calculates the first path loss on the basis of the first measurement targets configured in the first measurement target configuration and calculates first A-SRS transmission power on the basis of the first path loss. When the terminal apparatus 102 has detected an SRS request in which a request to transmit the A-SRS is specified in a second DCI format, the terminal apparatus 102 calculates the second path loss on the basis of the second measurement targets configured in the second measurement target configuration, calculates second A-SRS transmission power on the basis of the second path loss, and transmits the A-SRS with the above-mentioned A-SRS transmission power. It is to be noted that the path loss reference resources and the measurement targets configured in the measurement target configuration may be associated with each other in advance. In addition, the DCI formats and the measurement target configured in the measurement target configuration may be associated with each other in advance. These pieces of associated information may be broadcast using the system information (SI).

In addition, the above-described pieces of associated information may be transmitted to each terminal apparatus 102 using an RRC signal. In addition, the above-described pieces of associated information may be transmitted to each terminal apparatus 102 using an RRC message. In addition, information indicating association between the first DCI format and the second DCI format and the first measurement target configuration and the second measurement target configuration may be transmitted to each terminal apparatus 102 using an RRC signal. In addition, information indicating the same measurement target configuration or switching between different measurement target configurations between the first DCI format and the second DCI format may be transmitted to each terminal apparatus 102 using an RRC signal. That is, the first DCI format and the second DCI format may be associated with the measurement target configurations using the information indicating the switching.

Here, the first DCI format and the second DCI format may be different types of DCI format. That is, DCI Format 0 may be configured as the first DCI format, and DCI Format 1A may be configured as the second DCI format. Alternatively, DCI Format 2B may be configured as the first DCI format, and DCI Format 2C may be configured as the second DCI format. Alternatively, DCI Format 0 may be configured as the first DCI format, and DCI Format 4 may be configured as the second DCI format.

Alternatively, the first DCI format and the second DCI format may be the same type of DCI format. However, values (or indices) set in a control information field included in the DCI format are different. For example, an SRS request included in DCI Format 4 is indicated by 2-bit information. Here, assume that the 2-bit information is associated with an index of 0 to 3. Therefore, the first DCI format can be configured as DCI Format 4 in which the index "1" of the SRS request is specified, and the second DCI format can be configured as DCI Format 4 in which the index "2" of the SRS request is specified. It is to be noted that the index of the SRS request may be associated with the above-described SRS parameter set. That is, the base station apparatus 101 can instruct the terminal apparatus 102 to transmit an SRS in which a certain parameter is configured by selecting the index of the SRS request.

Referring to FIG. 1, in the terminal apparatus 102, an uplink subframe subset (uplink subset or subframe subset) for transmitting an uplink signal to the base station apparatus 101 and an uplink subframe subset (uplink subset or subframe subset) for transmitting an uplink signal to the RRH 103 are configured. That is, by making a timing at which an uplink signal is transmitted to the base station apparatus 101 and a timing at which an uplink signal is transmitted to the RRH 103 different from each other, the terminal apparatus 102 is controlled such that the uplink signals transmitted therefrom do not interfere with another terminal apparatus 102. Here, if it is assumed that the subframe subset for transmitting an uplink signal to the base station apparatus 101 is referred to as a first subset and the subframe subset for transmitting an uplink signal to the RRH 103 is referred to as a second subset, the terminal apparatus 102 transmits the uplink 106 using the first subset and transmits the uplink 108 using the second subset. When transmitting an uplink signal using the first subset, the terminal apparatus 102 calculates the first path loss and the first uplink transmission power using the first measurement target configuration and the uplink power control-related parameter configuration, and when transmitting an uplink signal using the second subset, the terminal apparatus 102 calculates the second path loss and the second uplink transmission power using the second measurement target configuration and the uplink power control-related parameter configuration.

In addition, by making a timing (subframe subset) at which the base station apparatus 101 and the terminal apparatus 102 communicate with each other and a timing (subframe subset) at which the RRH 103 and the terminal apparatus 102 communicate with each other different from each other and performing appropriate uplink transmission power control on each subset, the base station apparatus 101 can set appropriate uplink transmission power for the terminal apparatus 102 in the uplink 106 or the uplink 108. That is, the base station apparatus 101 can cause the terminal apparatus 102 to perform transmission power control independently for each subframe subset.

Referring to FIG. 1, the terminal apparatus 102 can determine a timing at which transmission using the uplink 106 or the uplink 108 is performed at a timing at which an uplink grant has been detected in accordance with whether a control channel region in which the uplink grant has been detected is the first control channel region or the second control channel region. That is, when the uplink grant has been detected in the first control channel region of the subframe n, the terminal apparatus 102 can transmit an uplink signal to the base station apparatus 101 using the subframe n+4 with the first uplink transmission power. On the other hand, when the uplink grant has been detected in the second control channel region of a subframe n+1, the terminal apparatus 102 can transmit an uplink signal to the RRH 103 using a subframe n+5 with the second uplink transmission power.

When the uplink grant has been detected in the first control channel region, the terminal apparatus 102 can transmit an uplink signal to the uplink 106 with the first uplink transmission power, and when the uplink grant has been detected in the second control channel region, the terminal apparatus 102 can transmit an uplink signal to the uplink 108 with the second uplink transmission power.

In addition, by appropriately scheduling uplink grants in the first control channel region and the second control channel region for the downlinks 105 and 107, the base station apparatus 101 can set appropriate uplink transmission power in the terminal apparatus 102 for the uplink 106 or the uplink 108.

Thus, since the terminal apparatus 102 can separate the uplink transmission for the base station apparatus 101 and the uplink transmission for the RRH 103 from each other on the basis of a frequency resource in which an uplink grant is detected or a timing at which an uplink grant is detected, it is possible to perform control such that the terminal apparatus 102 does not interfere with another terminal apparatus 102 even when terminal apparatuses whose uplink transmission power is significantly different have been configured.

Thus, the terminal apparatus 102 can perform the A-SRS transmission for the base station apparatus 101 or the RRH 103 in accordance with the type of DCI format including an SRS request. In addition, the base station apparatus 101 can simultaneously control a plurality of terminal apparatuses 102 whose A-SRS transmission power is different.

(First Modification of Third Embodiment)

Next, a first modification of the third embodiment will be described. In the first modification of the third embodiment, the base station apparatus 101 can specify reference signals (for example, the cell-specific reference signals or the channel state information reference signals) and resources (or an antenna port) to be measured used for calculating the path loss in the uplink power control-related parameter configuration. In addition, the reference signals used for calculating the path loss may be indicated by the first measurement target configuration or the second measurement target configuration described in the first embodiment or the second embodiment. Details of a method for configuring the reference signals and the measurement targets used for calculating the path loss will be described hereinafter.

Assume that the base station apparatus 101 and the RRH 103 have performed carrier aggregation and are performing communication using two carrier components (CCs; cells) whose central frequencies are different in both the uplink and the downlink. These will be referred to as a first carrier component and a second carrier component, and it is assumed that the base station apparatus 101 and the RRH 103 can perform individual communication and coordinated communication using these carrier components. In addition, the base station apparatus 101 may configure the first carrier component as the primary cell and the second carrier component as the secondary cell. The base station apparatus 101 may specify resources for the reference signals used for calculating the path losses using indices as the path loss reference resources for the primary cell and the secondary cell. Here, the path loss reference resources refer to information elements indicating the reference signals used (referred to) and the resources (or the antenna port) to be measured for calculating the path loss, and refer to the measurement targets configured in the first measurement target configuration and the second measurement target configuration described in the first embodiment or the second embodiment.

Therefore, the base station apparatus 101 may associate the path losses used for calculating the uplink transmission power and the measurement targets (reference signals and antenna ports or measurement indices) used for the calculation with each other using the path loss reference resources. In addition, the path loss reference resources may be Antenna Port Index 0 for the cell-specific reference signals or a CSI-RS antenna port (or a CSI-RS measurement index) for the channel state information reference signals described in the first embodiment or the second embodiment, instead. More specifically, when the index specified by a path loss reference resource is 0, the path loss reference resource may indicate Antenna Port Index 0 for the cell-specific reference signals, and when the index is a value other than 0, the path loss reference resource may be associated with a CSI-RS measurement index or a CSI-RS antenna port index for the channel state information reference signals. Furthermore, the above-described path loss reference resource may be associated with pathlossReference (pathlossReference-r10) described with reference to FIG. 22. That is, when the second carrier component (SCell or secondary cell) has been specified in pathlossReference (pathlossReference-r10) and CSI-RS Measurement Index 1 for the channel state information reference signals has been specified by the path loss reference resource, the path loss may be calculated on the basis of a resource corresponding to CSI-RS Measurement Index 1 included in the second carrier component, and then the uplink transmission power may be calculated.

In another example, when the first carrier component (PCell or primary cell) has been specified in pathlossReference (pathlossReference-r10) and CSI-RS Measurement Index 1 for the channel state information reference signals has been specified by the path loss reference resource, the path loss may be calculated on the basis of a resource corresponding to CSI-RS Measurement Index 1 included in the first carrier component, and then the uplink transmission power may be calculated. In addition, when a detected uplink grant includes a carrier indicator, the terminal apparatus 102 may calculate the path loss and the uplink transmission power using a path loss reference resource associated with a carrier (cell, primary cell, secondary cell, or serving cell index) indicated by the carrier indicator.

By following the above-described procedure, the terminal apparatus 102 can calculate the path loss on the basis of transmitted content of the path loss reference resource transmitted by the base station apparatus 101, and calculate the uplink transmission power on the basis of the path loss and the uplink power control-related parameter configuration.

Figure 24:
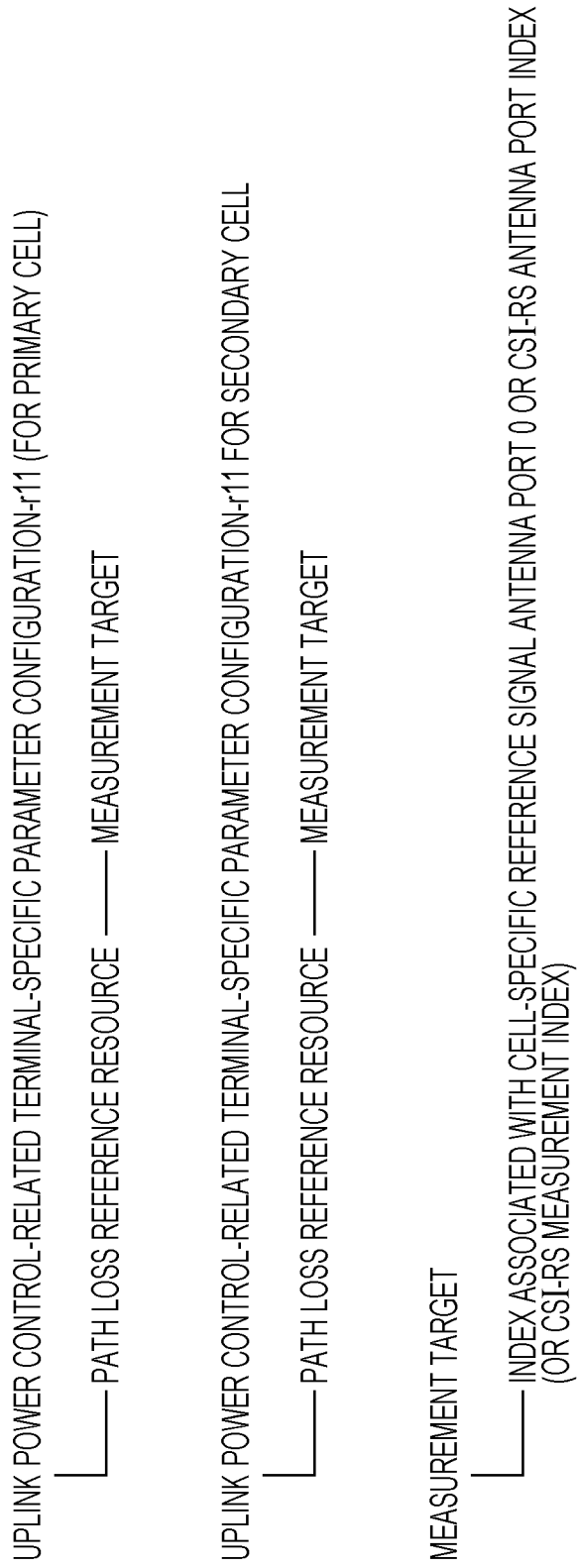
FIG. 24 is a diagram illustrating details of path loss reference resources.

FIG. 24 is a diagram illustrating details of the path loss reference resources. The path loss reference resources are information elements added to the uplink power control-related terminal-specific parameter configuration (for the primary cell) and the uplink power control-related terminal-specific parameter configuration for the secondary cell. In addition, in the path loss reference resource, a downlink reference signal (measurement target) used for measuring the path loss configured in the measurement target configurations is specified. The base station apparatus 101 can specify the measurement targets specified in the measurement target configurations described in the first embodiment or the second embodiment using the path loss reference resources. That is, the base station apparatus 101 can select measurement resources used for measuring the path losses from among the measurement targets configured in the measurement target configurations for the primary cell (first carrier component or PCell) and the secondary cell (second carrier component or SCell), and the terminal apparatus 102 can calculate the path losses for calculating the uplink transmission power for the primary cell and the secondary cell in accordance with the instruction and calculates the uplink transmission power for the primary cell or the secondary cell on the basis of the path loss and the uplink power control-related parameter configuration.

From another perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only in the primary cell, and dynamic transmission control of an uplink signal for Terminal Apparatus B is performed only by in the secondary cell. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the primary cell, and when the base station apparatus 101 intends the terminal apparatus 102 to transmit an uplink signal for the RRH 103, the base station apparatus 101 transmits an uplink grant to the terminal apparatus 102 while including the uplink grant in the secondary cell. Furthermore, by using the TPC command, which is a correction value of the transmission power control of an uplink signal included in an uplink grant, the base station apparatus 101 can perform the transmission power control of an uplink signal for the base station apparatus 101 or the RRH 103. The base station apparatus 101 sets the value of the TPC command included in an uplink grant to one for the base station apparatus 101 or one for the RRH 103 depending on a cell (carrier component or component carrier) with which the uplink grant is transmitted.

That is, when intending to increase the uplink transmission power for the base station apparatus 101, the base station apparatus 101 sets a large power correction value of the TPC command in the primary cell, and when intending to decrease the uplink transmission power for the RRH 103, the base station apparatus 101 sets a small power correction value of the TPC command in the secondary cell. The base station apparatus 101 performs the transmission of an uplink signal and the uplink transmission power control for Terminal Apparatus A using the primary cell, and performs the transmission of an uplink signal and the uplink transmission power control for Terminal Apparatus B using the secondary cell. That is, the base station apparatus 101 can perform uplink transmission power control for the terminal apparatus 102 by setting the power correction value of the TPC command (transmission power control command) in the primary cell to a first value and the power correction value of the TPC command in the secondary cell to a second value. At this time, the first value and the second value may be set to different values. Alternatively, the base station apparatus 101 may set the first value of the power correction value to be larger than the second value. The base station apparatus 101 may perform power correction (power control) independently for each cell using the TPC command. In addition, the terminal apparatus 102 can perform power correction (power control) independently for each cell using the TPC command.

Figure 25:
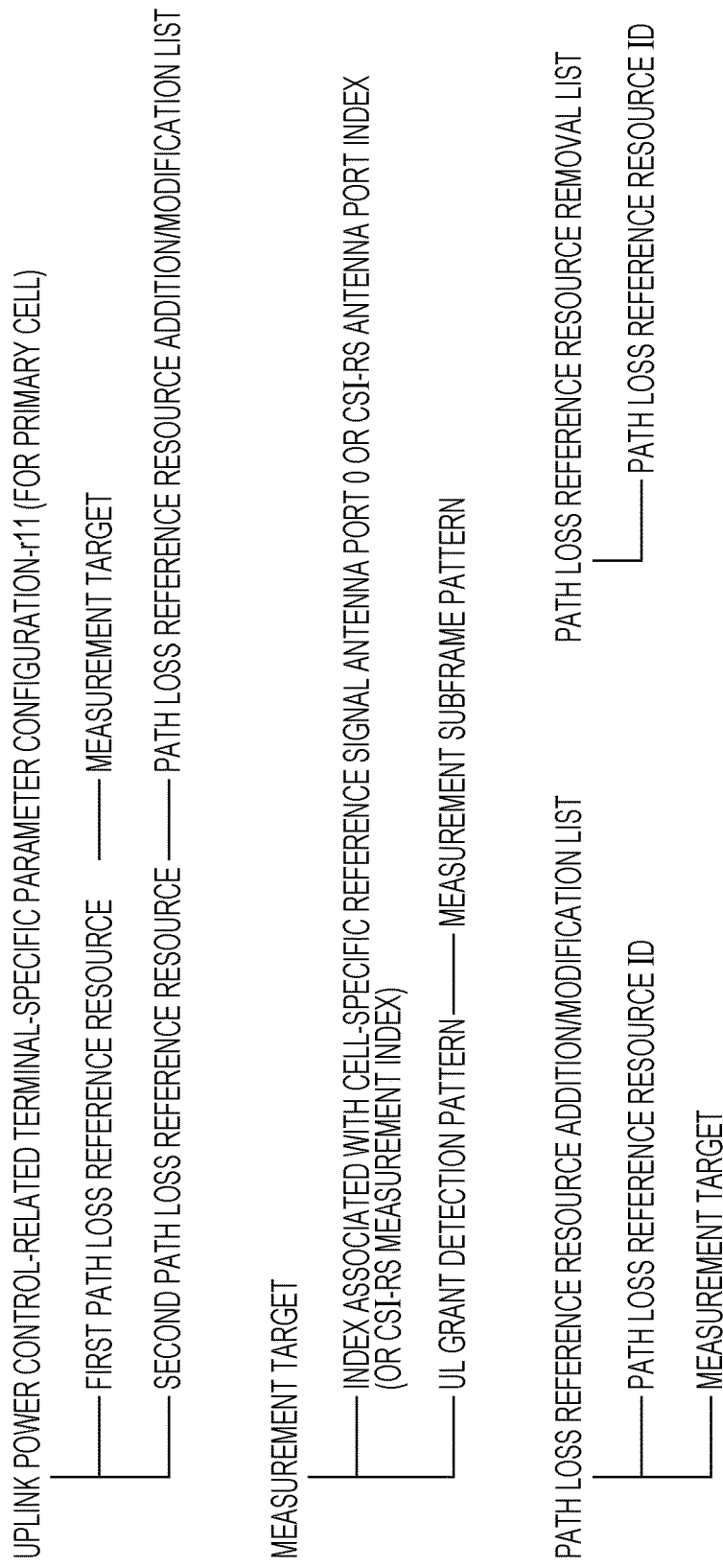
FIG. 25 is a diagram illustrating details of path loss reference resources according to a timing at which the terminal apparatus 102 detects an uplink grant.

FIG. 25 is a diagram illustrating details of path loss reference resources according to a timing at which the terminal apparatus 102 has detected an uplink grant. The base station apparatus 101 can configure two or more path loss reference resources (first path loss reference resource and second path loss reference resource) for the terminal apparatus 102. Here, the second path loss reference resource is a parameter that can be added as needed using an addition/modification list. The path loss reference resources are associated with the measurement targets configured in the measurement target configurations. For example, an uplink grant detection subframe subset (uplink grant detection pattern) is configured for a measurement target, and when an uplink grant has been detected in a downlink subframe included in the uplink grant detection pattern, the terminal apparatus 102 calculates the path loss using a measurement target associated with the uplink grant detection subframe subset, and calculates the uplink transmission power on the basis of the path loss.

That is, when a plurality of path loss reference resources (first path loss reference resource and second path loss reference resource) have been configured, the terminal apparatus 102 associates uplink grant detection subframe subsets with the path loss reference resources. More specifically, the terminal apparatus 102 associates the first path loss reference resource with a first subframe subset. In addition, the terminal apparatus 102 associates the second path loss reference resource with the second subframe subset. Furthermore, the terminal apparatus 102 selects a measurement target configuration used as a basis for calculating the uplink transmission power, and calculates the uplink transmission power on the basis of the path loss calculated on the basis of the received signal power of the measurement targets specified in the measurement target configurations. In an example, the first path loss reference resource may specify the first measurement target configuration, that is, the cell-specific reference signals transmitted from Antenna Port 0, and the cell-specific reference signals may be transmitted from the base station apparatus 101.

In addition, in the second path loss reference resource, the second measurement target configuration, that is, the channel state information reference signals transmitted from Antenna Port 15, may be specified, and the channel state information reference signals may be transmitted from the RRH 103. Therefore, different measurement targets are referred to on the basis of a subframe in which a DCI format (for example, an uplink grant) has been detected, and, as a result, when the uplink grant has been detected in the first subframe subset, transmission power suitable for the base station apparatus 101 is set, and when the uplink grant has been detected in the second subframe subset, transmission power suitable for the RRH 103 is set. That is, appropriate uplink transmission power control can be performed by switching the measurement target used for calculating the path loss in accordance with the timing at which the uplink grant has been detected.

The second path loss reference resource refers to a path loss reference resource that can be added from the path loss reference resource addition/modification list. That is, the base station apparatus 101 can define a plurality of path loss reference resources for one cell (for example, the primary cell). The base station apparatus 101 can instruct the terminal apparatus 102 to simultaneously calculate path losses for a plurality of path loss reference resources. In addition, when the second path loss reference resource is to be added, a path loss reference resource ID and a measurement target can be configured using the path loss reference resource addition/modification list and the second path loss reference resource can be added as needed. When path losses no longer need to be calculated for a plurality of path loss reference resources, unnecessary path loss reference resources can be removed using a path loss reference resource removal list.

An example of a method for calculating the second path loss in this case will be described. The second path loss reference resource might specify a plurality of first measurement target configurations or second measurement target configurations, that is, the channel state information reference signals transmitted from Antenna Port 15, Antenna Port 16, and the like, in the path loss reference resource addition/modification list. In this case, the second path loss may be calculated on the basis of the received signal power of the channel state information reference signals transmitted from Antenna Port 15 and Antenna Port 16. In this case, an average of a path loss calculated from the channel state information reference signals transmitted from Antenna Port 15 and a path loss calculated from the channel state information reference signals transmitted from Antenna Port 16 may be obtained as the second path loss, or, between the two path loss values, a larger one or a smaller one may be selected as the second path loss. Alternatively, the two path losses may be subjected to a linear process and used as the second path loss. In addition, the above operations may be performed using the cell-specific reference signals transmitted from Antenna Port 0 and the channel state information reference signals transmitted from Antenna Port 15.

Furthermore, in another example, the second path loss reference resource might specify a plurality of second measurement target configurations, that is, the channel state information reference signals transmitted from Antenna Port 15, Antenna Port 16, and the like, in the path loss reference resource addition/modification list. In this case, the second path loss and a third path loss may be calculated on the basis of the received power of the channel state information reference signals transmitted from Antenna Port 15 and Antenna Port 16. In this case, the first path loss, the second path loss, and the third path loss may be associated with the first subframe subset, the second subframe subset, and a third subframe subset, respectively.

In addition, the measurement targets included in the first path loss reference resource and the second path loss reference resource may be Antenna Port 0 for the cell-specific reference signals or the CSI-RS antenna port index (CSI-RS measurement index) described in the first embodiment or the second embodiment.

In addition, the measurement targets may include an uplink grant detection pattern. In addition, as the uplink grant detection pattern, a measurement subframe pattern (MeasSubframePattern-r10) included in the measurement object EUTRA in the measurement objects illustrated in FIG. 14 may be used.

In addition, although the measurement targets and the uplink grant detection pattern are associated with each other here, in another example, the measurement targets do not include the uplink grant detection pattern and the measurement targets and a timing at which the measurement report is transmitted may be associated with each other. That is, the terminal apparatus 102 may associate a result of measurement of a measurement target with a subframe pattern transmitted to the base station apparatus 101, and when an uplink grant has been detected in a downlink subframe associated with the subframe pattern, the terminal apparatus 102 can calculate the path loss using the measurement target and calculate the uplink transmission power.

Although a case in which addition to the uplink power control-related terminal-specific parameter configuration for the primary cell has been described here, the same configuration may be added in the case of the secondary cell. In the case of the secondary cell, however, the path loss reference (pathlossReference-r10) is configured, and the path loss is calculated on the basis of a reference signal included in the primary cell or the secondary cell. That is, when the primary cell has been selected, the path loss is calculated on the basis of the path loss reference resource in the uplink power control-related terminal-specific parameter configuration for the primary cell. On the other hand, when the secondary cell has been selected, the path loss is calculated on the basis of the path loss reference resource in the uplink power control-related terminal-specific parameter configuration for the secondary cell. Furthermore, the above-mentioned path loss reference resources may be associated with the path loss reference (pathlossReference-r10).

That is, when the second carrier component (SCell or secondary cell) has been specified in the path loss reference (pathlossReference-r10) and CSI-RS Measurement Index 1 for the channel state information reference signals has been specified by the path loss reference resource, the path loss may be calculated on the basis of a resource corresponding to CSI-RS Measurement Index 1 included in the second carrier component, and then the uplink transmission power may be calculated. In addition, in another example, when the first carrier component (PCell or primary cell) has been specified in the path loss reference (pathlossReference-r10) and CSI-RS Measurement Index 1 for the channel state information reference signals has been specified by the path loss reference resource, the path loss may be calculated on the basis of a resource corresponding to CSI-RS Measurement Index 1 included in the first carrier component, and then the uplink transmission power may be calculated.

From another perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only in the first subframe subset, and dynamic transmission control of an uplink signal for Terminal Apparatus B is performed only in the second subframe subset. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the first subframe subset, and when the base station apparatus 101 intends the terminal apparatus 102 to transmit an uplink signal for the RRH 103, the base station apparatus 101 transmits an uplink grant to the terminal apparatus 102 while including the uplink grant in the second subframe subset. Furthermore, by using the TPC command, which is a correction value of the transmission power control of an uplink signal included in an uplink grant, the base station apparatus 101 can perform the transmission power control of an uplink signal for the base station apparatus 101 or the RRH 103.

The base station apparatus 101 sets the value of the TPC command included in an uplink grant to one for the base station apparatus 101 or one for the RRH 103 depending on a subframe subset with which the DCI format (for example, an uplink grant) is transmitted. That is, when intending to increase the uplink transmission power for the base station apparatus 101, the base station apparatus 101 sets a large power correction value of the TPC command in the first subframe subset, and when intending to decrease the uplink transmission power for the RRH 103, the base station apparatus 101 sets a small power correction value of the TPC command in the second subframe subset. The base station apparatus 101 performs the transmission of an uplink signal and the uplink transmission power control for Terminal Apparatus A using the first subframe subset, and performs the transmission of an uplink signal and the uplink transmission power control for Terminal Apparatus B using the second subframe subset. That is, the base station apparatus 101 can perform dynamic uplink transmission power control for the terminal apparatus 102 by setting the power correction value of the TPC command (transmission power control command) in the first subframe subset to a first value and the power correction value of the TPC command in the second subframe subset to a second value. At this time, the first value and the second value may be set to different values. Alternatively, the base station apparatus 101 may set the first value of the power correction value to be larger than the second value. That is, the base station apparatus 101 may perform power correction (power control) independently for each subframe subset using the TPC command. In addition, the terminal apparatus 102 can perform power correction (power control) for each subframe subset using the TPC command.

Figure 26:
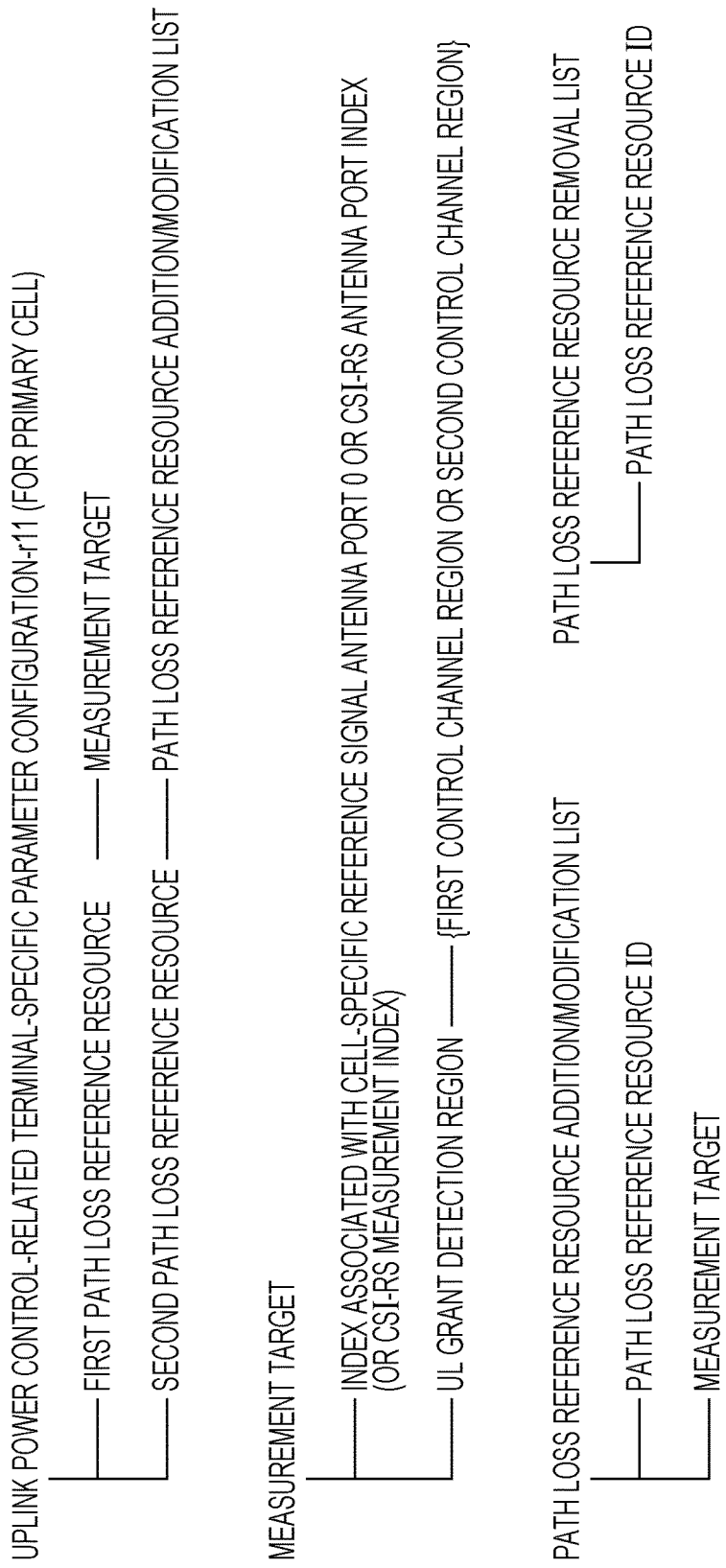
FIG. 26 is a diagram illustrating details of path loss reference resources according to a control channel region in which the terminal apparatus 102 detects an uplink grant.
Figure 27:
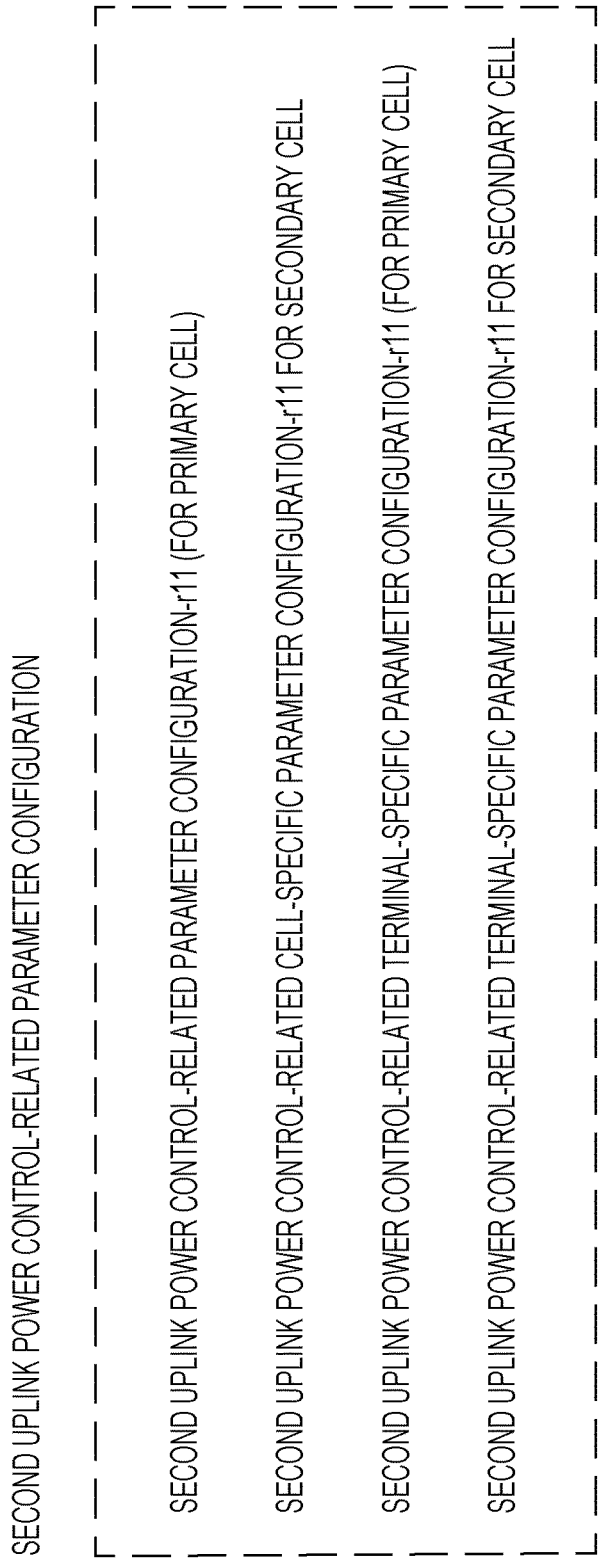
FIG. 27 is a diagram illustrating an example of a second uplink power control-related parameter configuration according to a third embodiment of the present invention.

FIG. 26 is a diagram illustrating details of path loss reference resources according to a control channel region in which the terminal apparatus 102 detects a DCI format (for example, an uplink grant). As in FIG. 25, the base station apparatus 101 can configure two or more path loss reference resources (first path loss reference and second path loss resource) for the terminal apparatus 102. Here, the second path loss reference resource is a parameter that can be added as needed using the addition/modification list. The path loss reference resources are associated with the measurement targets configured in the measurement target configurations. For example, uplink grant detection regions (first control channel region and second control channel region) are configured in the measurement targets, and when an uplink grant has been detected in a downlink control channel region included in the uplink grant detection region, the terminal apparatus 102 calculates the path loss using a measurement target associated with the uplink grant detection region, and sets the uplink transmission power on the basis of the path loss.

That is, when a plurality of path loss reference resources (first path loss reference resource and second path loss reference resource) have been configured, the terminal apparatus 102 associates the uplink grant detection regions with the path loss reference resources. More specifically, the terminal apparatus 102 associates the first path loss reference resource with the first control channel region. In addition, the terminal apparatus 102 associates the second path loss reference resource with the second control channel region. Furthermore, the terminal apparatus 102 selects a measurement target configuration used as a basis for calculating the uplink transmission power, and calculates the uplink transmission power on the basis of the path loss calculated on the basis of the received signal power of the measurement targets specified in the measurement target configurations. As a result, the terminal apparatus 102 can transmit an uplink signal with the uplink transmission power calculated in accordance with the measurement targets depending on a region in which an uplink grant has been detected.

Furthermore, an example of the method for calculating the second path loss when a plurality of second measurement target configurations are associated with the second path loss reference resource will be described. The second path loss reference resource might specify a plurality of first measurement target configurations or second measurement target configurations, that is, for example, the channel state information reference signals transmitted from Antenna Ports 15 and 16, in the path loss reference resource addition/modification list. In this case, the second path loss may be calculated on the basis of the received power of the channel state information reference signals transmitted from Antenna Port 15 and Antenna Port 16. In this case, an average of a path loss calculated from the channel state information reference signals transmitted from Antenna Port 15 and a path loss calculated from the channel state information reference signals transmitted from Antenna Port 16 may be obtained as the second path loss, or, between the two path loss values, a larger one or a smaller one may be obtained as the second path loss. Alternatively, the two path losses may be subjected to a linear process and used as the second path loss. In addition, the above operations may be performed using the cell-specific reference signals transmitted from Antenna Port 0 and the channel state information reference signals transmitted from Antenna Port 15.

Furthermore, in another example, the second path loss reference resource might specify a plurality of second measurement target configurations, that is, the channel state information reference signals transmitted from Antenna Port 15 and Antenna Port 16 and the like, in the path loss reference resource addition/modification list. In this case, the second path loss and the third path loss may be calculated on the basis of the received signal power of the channel state information reference signals transmitted from Antenna Port 15 and Antenna Port 16. In this case, the first path loss, the second path loss, and the third path loss may be associated with the first subframe subset, the second subframe subset, and a third subframe subset, respectively.

In addition, the path loss reference resources may be Antenna Port 0 for the cell-specific reference signals or the CSI-RS antenna port index (CSI-RS measurement index) described in the first embodiment or the second embodiment.

From a different perspective, for example, if it is assumed that the terminal apparatus 102 that communicates with the base station apparatus 101 is referred to as Terminal Apparatus A and the terminal apparatus 102 that communicates with the RRH 103 is referred to as Terminal Apparatus B, dynamic transmission control of an uplink signal for Terminal Apparatus A is performed only in the first control channel (PDCCH) region, and dynamic transmission control of an uplink signal for Terminal Apparatus B is performed only by in the second control channel (X-PDCCH) region. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the first control channel region, and when the base station apparatus 101 intends the terminal apparatus 102 to transmit an uplink signal for the RRH 103, the base station apparatus 101 transmits an uplink grant to the terminal apparatus 102 while including the uplink grant in the second control channel region. Furthermore, by using the TPC command, which is a correction value of the transmission power control of an uplink signal included in an uplink grant, the base station apparatus 101 can perform the transmission power control of an uplink signal for the base station apparatus 101 or the RRH 103.

The base station apparatus 101 sets the value of the TPC command included in an uplink grant to one for the base station apparatus 101 or one for the RRH 103 depending on a control channel region with which the uplink grant is transmitted. That is, when intending to increase the uplink transmission power for the base station apparatus 101, the base station apparatus 101 sets a large power correction value of the TPC command in the first control channel region, and when intending to decrease the uplink transmission power for the RRH 103, the base station apparatus 101 sets a small power correction value of the TPC command in the second control channel region. For example, when a plurality of values (the first value, the second value, and the like) are configured in the TPC command, the base station apparatus 101 may perform control such that the first value is selected as the power correction value of the TPC command in the first subframe subset and the second value is selected as the power correction value of the TPC command in the second subframe subset in accordance with a communication mode. The base station apparatus 101 performs the transmission of an uplink signal and the uplink transmission power control for Terminal Apparatus A using the first control channel region, and performs the transmission of an uplink signal and the uplink transmission power control for Terminal Apparatus B using the second control channel region.

That is, the base station apparatus 101 can perform uplink transmission power control for the terminal apparatus 102 by setting the power correction value of the TPC command (transmission power control command) in the first control channel region to the first value and the power correction value of the TPC command in the second control channel region to the second value. At this time, the base station apparatus 101 may set the first value and the second value to different values. The base station apparatus 101 may set the first value of the power correction value to be larger than the second value. That is, the base station apparatus 101 may perform power correction independently for each subframe subset using the TPC command.

In addition, in the case of the aperiodic SRS (A-SRS), a plurality of CDI formats (here, for example, a first DCI format and a second DCI format) may be associated with a plurality of path loss reference resources (here, for example, a first path loss reference resource and a second path loss reference resource). That is, when the terminal apparatus 102 has detected an SRS request in which a request to transmit the A-SRS is specified in the first DCI format, the terminal apparatus 102 calculates the first path loss using the first path loss reference resource and sets first A-SRS transmission power on the basis of the first path loss. When the terminal apparatus 102 has detected an SRS request in which a request to transmit the A-SRS is specified in the second DCI format, the terminal apparatus 102 calculates the second path loss using the second path loss reference resource, sets second A-SRS transmission power on the basis of the second path loss, and transmits the A-SRS with the above-mentioned A-SRS transmission power. It is to be noted that the path loss reference resources and the measurement targets configured in the measurement target configurations may be associated with each other in advance.

In addition, the DCI formats and the path loss reference resources may be associated with each other in advance. These pieces of associated information may be broadcast using the system information. Alternatively, these pieces of associated information may be transmitted to each terminal apparatus 102 using an RRC signal. Alternatively, these pieces of associated information may be transmitted to each terminal apparatus 102 using an RRC message. In addition, information indicating the same path loss reference resource or switching between different path loss reference resources for the first DCI format and the second DCI format may be transmitted to each terminal apparatus 102 using an RRC signal. That is, the first DCI format and the second DCI format may be associated with the path loss reference resources using the information indicating the switching.

In addition, in the first modification of the third embodiment, the base station apparatus 101 transmits a radio resource control signal including the uplink power control-related parameter configuration in which the path loss reference resource is configured to the terminal apparatus 102, and transmits a DCI format (for example, an uplink grant) to the terminal apparatus 102. In addition, the terminal apparatus 102 sets the path loss and the uplink transmission power on the basis of the path loss reference resource and the uplink power control-related parameter configuration in accordance with information included in the radio resource control signal, and transmits an uplink signal to the base station apparatus 101 with the uplink transmission power.

In addition, in the first modification of the third embodiment, the base station apparatus 101 transmits a radio resource control signal including the uplink power control-related parameter configuration in which the first path loss reference resource and the second path loss reference resource are configured to the terminal apparatus 102. In addition, the terminal apparatus 102 calculates the first path loss on the basis of the first path loss reference resource and the second path loss on the basis of the second path loss reference resource, and sets the uplink transmission power on the basis of the first path loss or the second path loss and information regarding the uplink power control-related parameter configuration.

In addition, in the first modification of the third embodiment, the base station apparatus 101 transmits a radio resource control signal including the uplink power control-related parameter configuration in which the primary cell and secondary cell-specific path loss reference resources are configured to the terminal apparatus 102, and transmits an uplink grant to the terminal apparatus 102. In addition, the terminal apparatus 102 receives the radio resource control signal including the uplink power control-related parameter configuration in which the primary and secondary cell-specific path loss reference resources are configured. When the terminal apparatus 102 has detected the uplink grant in the primary cell, the terminal apparatus 102 calculates the path loss and the uplink transmission power on the basis of the path loss reference resource included in the uplink power control-related terminal-specific parameter configuration for the primary cell and the uplink power control-related parameter configuration, and when the terminal apparatus 102 has detected the uplink grant in the secondary cell, the terminal apparatus 102 calculates the path loss and the uplink transmission power on the basis of the path loss reference resource included in the uplink power control-related terminal-specific parameter configuration for the secondary cell and the uplink power control-related parameter configuration, and transmits an uplink signal to the base station apparatus 101 with the uplink transmission power obtained as a result of the calculation using the cell in which the uplink grant has been detected.

In addition, in the first modification of the third embodiment, the base station apparatus 101 transmits a radio resource control signal including the uplink power control-related parameter configuration in which the first path loss reference resource and the second path loss reference resource are configured to the terminal apparatus 102, and transmits an uplink grant to the terminal apparatus 102. In addition, when the terminal apparatus 102 has detected the uplink grant in a downlink subframe included in the first subframe subset, the terminal apparatus 102 calculates the path loss and the uplink transmission power on the basis of the first path loss reference resource and the uplink power control-related parameter configuration in accordance with information included in the radio resource control signal. When the terminal apparatus 102 has detected the uplink grant in a downlink subframe included in the second subframe subset, the terminal apparatus 102 calculates the path loss and the uplink transmission power on the basis of the second path loss reference resource and the uplink power control-related parameter configuration, and transmits an uplink signal to the base station apparatus 101 with the uplink transmission power using the uplink subframe included in the subframe subset.

In addition, in the first modification of the third embodiment, when the terminal apparatus 102 has detected the uplink grant in the first control channel, the terminal apparatus 102 calculates the first path loss and the first uplink transmission power on the basis of the first path loss reference resource and the uplink power control-related parameter configuration. When the terminal apparatus 102 has detected the uplink grant in the second control channel region, the terminal apparatus 102 calculates the second path loss and the second uplink transmission power on the basis of the second path loss reference resource and the uplink power control-related parameter configuration, and transmits an uplink signal to the base station apparatus 101 with the first uplink transmission power or the second uplink transmission power in accordance with the timing at which the uplink grant has been detected.

Referring back to FIG. 1, more specifically, when a plurality of path loss reference resources (first path loss reference resource and second path loss reference resource) have been configured, the terminal apparatus 102 associates control channel regions in which an uplink grant is detected with the path loss reference resources. More specifically, the terminal apparatus 102 associates the first path loss reference resource with the first control channel region. In addition, the terminal apparatus 102 associates the second path loss reference resource with the second control channel region. Furthermore, the terminal apparatus 102 selects a measurement target configuration used as a basis for calculating the uplink transmission power from among the path loss reference resources, and sets the uplink transmission power on the basis of the path loss calculated on the basis of the received signal power of the measurement targets specified in the measurement target configuration.

In an example, the first path loss may specify the first measurement target configuration, that is, Antenna Port 0 for the cell-specific reference signals, and the cell-specific reference signals may be transmitted from the base station apparatus 101. In addition, the second path loss reference resource may specify the second measurement target configuration, that is, Antenna Port 15 for the channel state information reference signals, and the channel state information reference signals may be transmitted from the RRH 103. Therefore, different measurement targets are referred to in accordance with the control channel region in which an uplink grant is detected, and, as a result, when the uplink grant has been detected in the first control channel region, transmission power suitable for the base station apparatus 101 is set, and when the uplink grant has been detected in the second control channel region, transmission power suitable for the RRH 103 is set. That is, appropriate uplink transmission power control can be performed by switching the measurement target used for calculating the path loss in accordance with the control channel region in which the uplink grant has been detected. In addition, by referring to different measurement targets in accordance with the control channel region, the base station apparatus 101 need not transmit the above-mentioned subframe pattern to the terminal apparatus 102.

In addition, in another example, the base station apparatus 101 can reconfigure the uplink power control-related parameter configuration in various ways for the terminal apparatus 102 in order to perform appropriate uplink transmission power control for the base station apparatus 101 or the RRH 103. As described above, in order to perform appropriate uplink transmission power control for the transmission to the base station apparatus 101 or the RRH 103, the base station apparatus 101 needs to switch between measurement of the path loss using the first measurement target configuration and measurement of the path loss using the second measurement target configuration. When the terminal apparatus 102 communicates only with the base station apparatus or the RRH in order of tens to hundreds of subframes and the switching is performed semi-statically, however, appropriate uplink transmission power control can be performed by updating the measurement target configurations (first measurement target configuration and second measurement target configuration) and the path loss reference resource-related parameter configuration. That is, by configuring only the first path loss reference resource illustrated in FIG. 25 and FIG. 26 and performing appropriate configuration, it is possible to set appropriate transmission power for the base station apparatus 101 or the RRH 103.

(Second Modification of Third Embodiment)

In a second modification of the third embodiment, a plurality of uplink power control-related parameter configurations are set, and the terminal apparatus 102 can calculate the uplink transmission power ($P_{PUSCH}$, $P_{PUCCH}$, and $P_{SRS}$) of various uplink signals (PUSCH, PUCCH, and SRS) using the plurality of uplink power control-related parameter configurations.

In the second modification of the third embodiment, the base station apparatus 101 configures information regarding the plurality of uplink power control-related parameter configurations (for example, information regarding a first uplink power control-related parameter configuration and information regarding a second uplink power control-related parameter configuration), and transmits the information to the terminal apparatus 102. The terminal apparatus 102 calculates the path loss on the basis of the information regarding the first uplink power control-related parameter configuration in accordance with the transmitted information, and sets the uplink transmission power on the basis of the path loss and the information regarding the first uplink power control-related parameter configuration. In addition, the terminal apparatus 102 calculates the path loss on the basis of the information regarding the second uplink power control-related parameter configuration, and sets the uplink transmission power on the basis of the path loss and the second uplink power control-related parameter configuration. Here, the uplink transmission power set on the basis of the information regarding the first uplink power control-related parameter configuration will be referred to as first uplink transmission power, and the uplink transmission power set on the basis of the information regarding the second uplink power control-related parameter configuration will be referred to as second uplink transmission power.

The terminal apparatus 102 performs control in such a way as to determine whether to transmit an uplink signal with the first uplink transmission power or the second uplink transmission power in accordance with a frequency resource in which a DCI format (for example, an uplink grant) has been detected or a timing at which a DCI format has been detected.

The base station apparatus 101 may individually configure information elements included in the first uplink power control-related parameter configuration and the second uplink power control-related parameter configuration. More specifically, for example, referring to FIGS. 27 to 30, FIG. 27 is a diagram illustrating an example of the second uplink power control-related parameter configuration. The second uplink power control-related parameter configuration is configured by a second uplink power control-related cell-specific parameter configuration-r11 (for the primary cell), a second uplink power control-related cell-specific parameter configuration-r11 for the secondary cell, a second uplink power control-related terminal-specific parameter configuration-r11 (for the primary cell), and a second uplink power control-related terminal-specific parameter configuration-r11 for the secondary cell. It is to be noted that the first uplink power control-related parameter configuration is the same as that illustrated in FIG. 22 and FIG. 24. In addition, in this embodiment of the present application, a first uplink power control-related cell-specific parameter configuration-r11 (for the primary cell), a first uplink power control-related cell-specific parameter configuration-r11 for the secondary cell, a first uplink power control-related terminal-specific parameter configuration-r11 (for the primary cell), and a first uplink power control-related terminal-specific parameter configuration-r11 for the secondary cell can be included.

Figure 28:
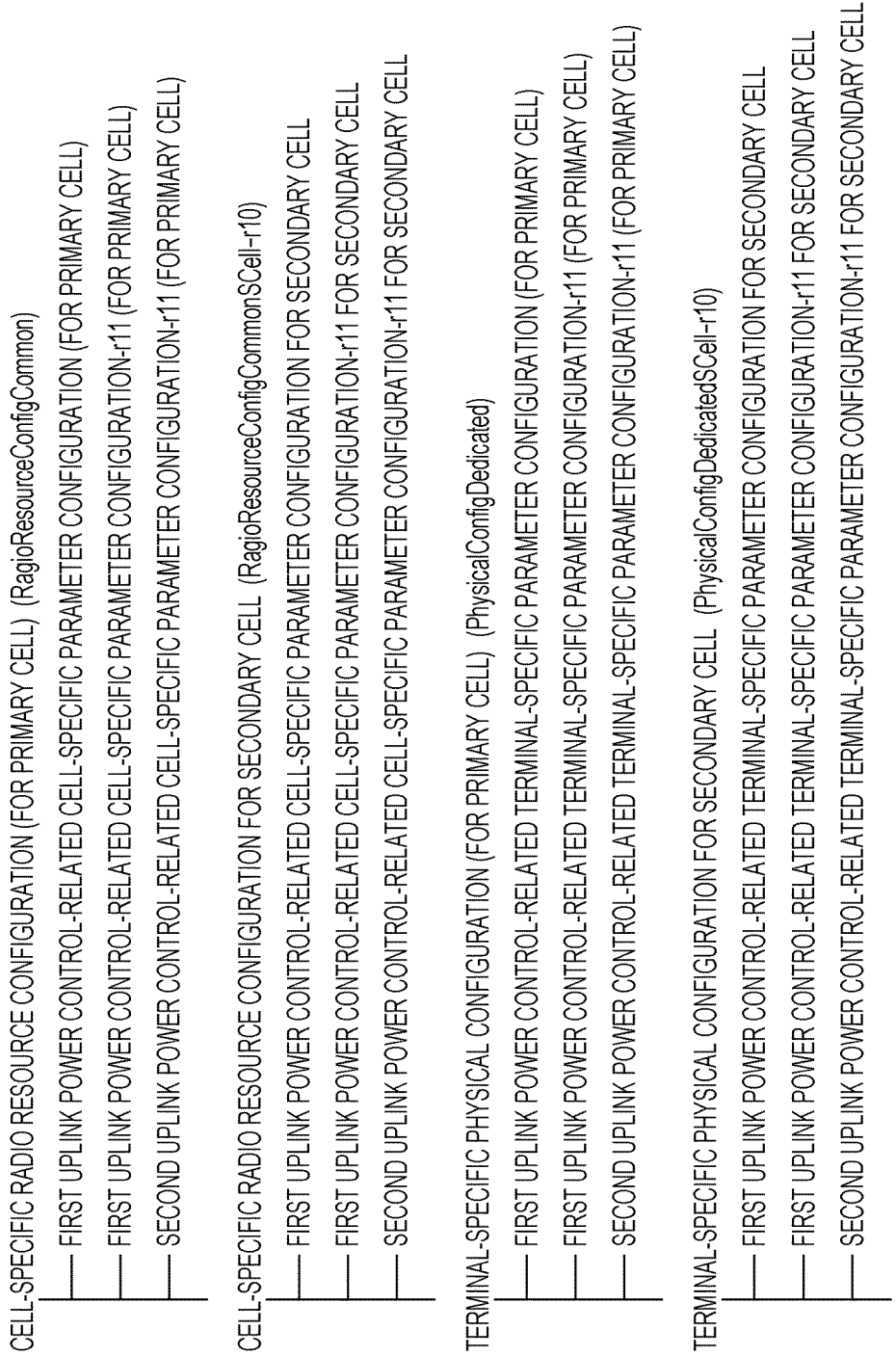
FIG. 28 is a diagram illustrating an example of a first uplink power control-related parameter configuration and the second uplink power control-related parameter configuration included in each radio resource configuration.

FIG. 28 is a diagram illustrating an example of the first uplink power control-related parameter configuration and the second uplink power control-related parameter configuration included in each radio resource configuration. The cell-specific radio resource configuration (for the primary cell) includes the first uplink power control-related cell-specific parameter configuration (for the primary cell) and the second uplink power control-related cell-specific parameter configuration-r11 (for the primary cell). Furthermore, the uplink power control-related cell-specific parameter configuration-r11 (for the primary cell) can be included. In addition, the cell-specific radio resource configuration for the secondary cell includes the first uplink power control-related cell-specific parameter configuration for the secondary cell and the second uplink power control-related cell-specific parameter configuration-r11 for the secondary cell. Furthermore, the uplink power control-related cell-specific parameter configuration-r11 for the secondary cell can be included. In addition, the terminal-specific physical configuration (for the primary cell) includes the first uplink power control-related terminal-specific parameter configuration (for the primary cell) and the second uplink power control-related terminal-specific parameter configuration-r11 (for the primary cell).

In addition, the terminal-specific physical configuration for secondary cell includes the first uplink power control-related terminal-specific parameter configuration for the secondary cell and the second uplink power control-related terminal-specific parameter configuration-r11 for the secondary cell. In addition, the terminal-specific physical configuration (for the primary cell) is included in the terminal-specific radio resource configuration (for the primary cell) (RadioResourceConfigDedicated). In addition, the terminal-specific physical configuration for the secondary cell is included in the terminal-specific radio resource configuration for the secondary cell (RadioResourceConfigDedicatedSCell-r10). It is to be noted that the above-mentioned cell-specific radio resource configuration and terminal-specific radio resource configuration may be included in the RRC connection reconfiguration (RRCConnectionReconfiguration) or the RRC reestablishment (RRCConnectionReestablishment) described in the second embodiment. It is to be noted that the above-mentioned cell-specific radio resource configuration for the secondary cell and terminal-specific radio resource configuration for the secondary cell may be included in the SCell addition/modification list described in the second embodiment. It is to be noted that the above-mentioned cell-specific radio resource configuration and terminal-specific radio resource configuration may be configured for each terminal apparatus 102 using RRC signals (dedicated signaling). It is to be noted that the RRC connection reconfiguration and the RRC reestablishment may be configured for each terminal apparatus 102 using RRC messages.

FIG. 29 is a diagram illustrating an example of the second uplink power control-related cell-specific parameter configuration. Information elements included in the second uplink power control-related cell-specific parameter configuration-r11 (for the primary cell) or the second uplink power control-related cell-specific parameter configuration-r11 for the secondary cell may be configured by including all information elements illustrated in FIG. 29. Alternatively, the information elements included in the second uplink power control-related cell-specific parameter configuration-r11 (for the primary cell) and the second uplink power control-related cell-specific parameter configuration-r11 for the secondary cell may be configured by including at least one of the information elements illustrated in FIG. 29. Alternatively, no information element needs to be included as the information elements included in the second uplink power control-related cell-specific parameter configuration-r11 (for the primary cell) and the second uplink power control-related cell-specific parameter configuration-r11 for the secondary cell. In this case, the base station apparatus 101 selects release and transmits information regarding the release to the terminal apparatus 102. In addition, information elements that have not been configured in the second uplink power control-related cell-specific parameter configuration may be the same as those that have not been configured in the first uplink power control-related cell-specific parameter configuration.

FIG. 30 is a diagram illustrating an example of the first uplink power control-related terminal-specific parameter configuration and the second uplink power control-related terminal-specific parameter configuration. In the first uplink power control-related terminal-specific parameter configuration for the primary cell and/or the secondary cell, path loss reference resources are configured. In addition, in the second uplink power control-related terminal-specific uplink power control for the primary cell and/or the secondary cell, path loss reference resources are configured in addition to the information elements illustrated in FIG. 22. Information elements included in the second uplink power control-related terminal-specific parameter configuration-r11 (for the primary cell) and the second uplink power control-related terminal-specific parameter configuration-r11 for the secondary cell may be configured by including all information elements illustrated in FIG. 30. Alternatively, the information elements included in the second uplink power control-related terminal-specific parameter configuration-r11 (for the primary cell) or the second uplink power control-related terminal-specific parameter configuration-r11 for the secondary cell may be configured by including at least one of the information elements illustrated in FIG. 30.

Alternatively, no information element needs to be included as the information elements included in the second uplink power control-related terminal-specific parameter configuration-r11 (for the primary cell) or the second uplink power control-related terminal-specific parameter configuration-r11 for the secondary cell. In this case, the base station apparatus 101 selects release, and transmits information regarding the release to the terminal apparatus 102. In addition, information elements that have not been configured in the second uplink power control-related terminal-specific parameter configuration may be the same as those that have not been configured in the first uplink power control-related terminal-specific parameter configuration. That is, when a path loss reference resource has not been configured in the second uplink power control-related terminal-specific parameter configuration, the path loss is calculated on the basis of the path loss reference resource configured in the first uplink power control-related terminal-specific parameter configuration.

Figure 32:
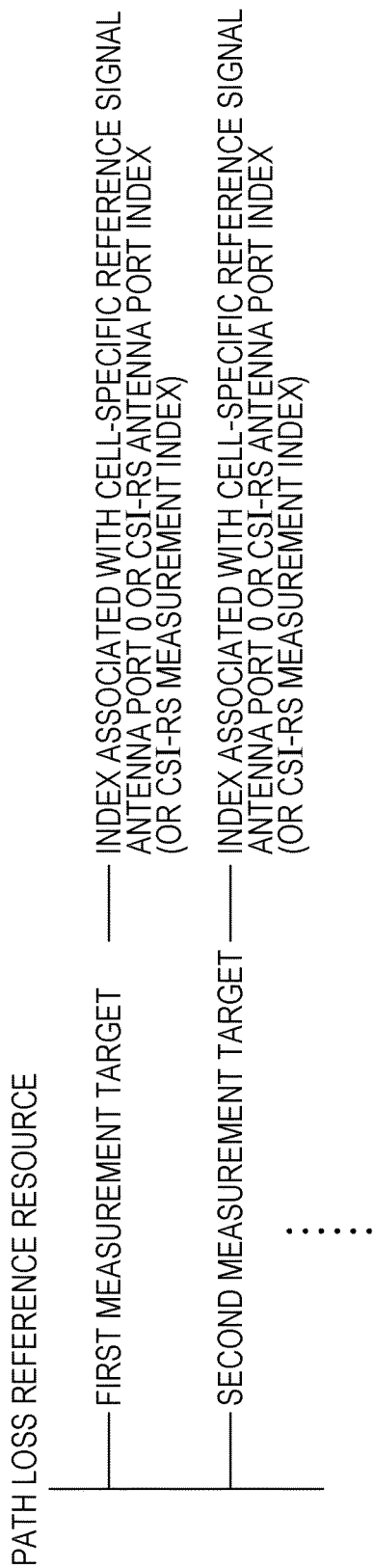
FIG. 32 is a diagram illustrating another example (another example 1) of the path loss reference resource.
Figure 33:
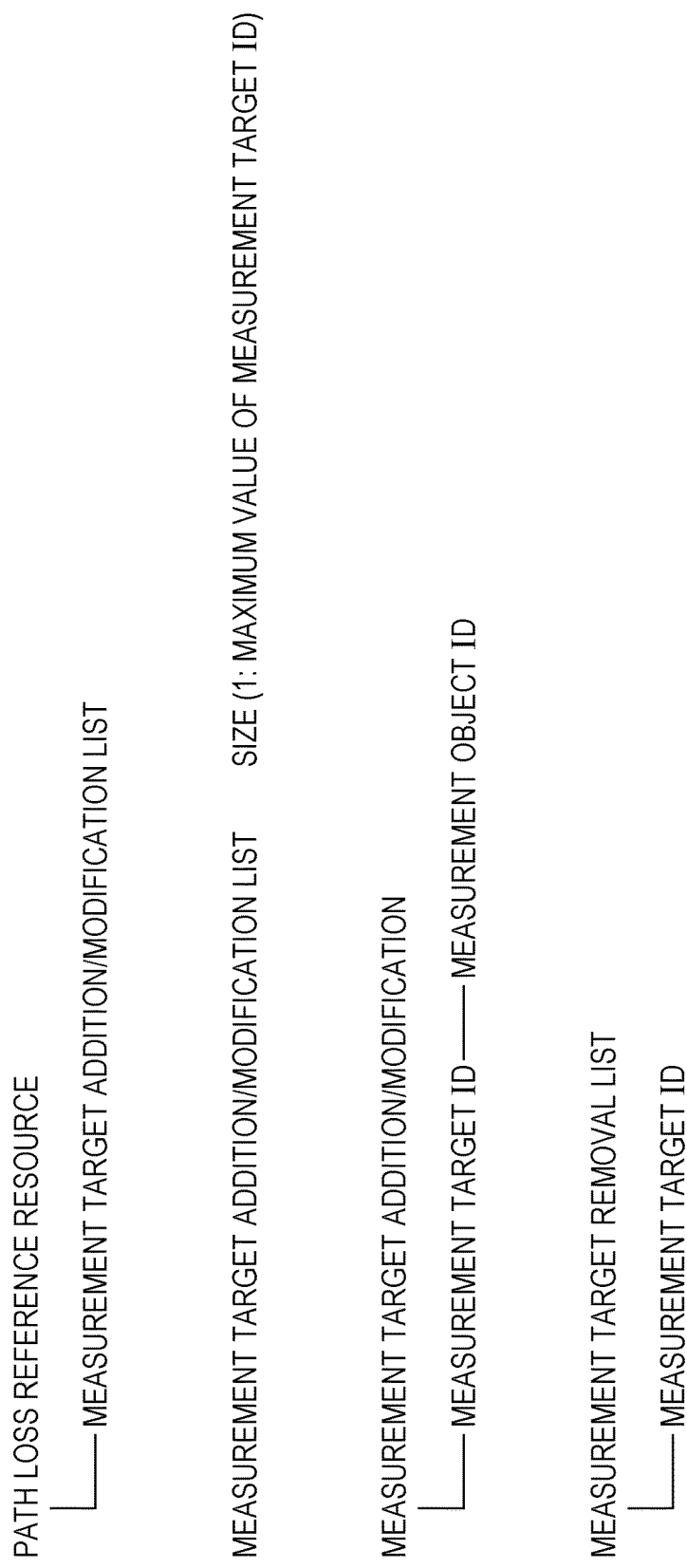
FIG. 33 is a diagram illustrating another example (another example 2) of the path loss reference resource.

The path loss reference resources may be the same as those described in the third embodiment (FIG. 24). That is, the measurement targets indicating the path loss reference resources may be associated with cell-specific reference signal Antenna Port 0 or an index associated with a CSI-RS antenna port index (CSI-RS measurement index) (FIG. 31). In addition, the path loss reference resources may be indicated as in FIG. 32 or FIG. 33. FIG. 32 is a diagram illustrating an example (first example) of the path loss reference resources. A plurality of measurement targets are configured as the path loss reference resources. The terminal apparatus 102 may calculate the path loss using at least one of these measurement targets. FIG. 33 is a diagram illustrating another example (second example) of the path loss reference resources. A measurement target to be added to the path loss reference resources may be added using the addition/modification list.

In addition, the number of measurement targets to be added may be determined by a maximum measurement object ID. A measurement object ID may be determined by a measurement object ID. That is, the number of measurement targets to be added may be the same as the number of measurement target configurations. In addition, unnecessary measurement targets can be removed using the removal list. It is to be noted that the above operations hold true for the third embodiment and the first modification of the third embodiment. Furthermore, an example of a method for calculating the path loss when a plurality of first measurement target configurations and a plurality of second measurement target configurations are associated with the path loss reference resources will be described. The path loss reference resources might specify a plurality of first measurement target configurations and a plurality of second measurement target configurations, that is, Antenna Ports 15 and 16 for the channel state information reference signals and the like, in the path loss reference resource addition/modification list. In this case, the second path loss may be calculated on the basis of the received power of the channel state information reference signals transmitted from Antenna Port 15 and Antenna Port 16. In this case, an average of a path loss calculated from the channel state information reference signals transmitted from Antenna Port 15 and a path loss calculated from the channel state information reference signals transmitted from Antenna Port 16 may be obtained as the second path loss, or, between the two path loss values, a larger one or a smaller one may be selected as the second path loss.

Alternatively, the two path losses may be subjected to a linear process and used as the second path loss. In addition, the above operations may be performed using Antenna Port 0 for the cell-specific reference signals and Antenna Port 15 for the channel state information reference signals. Furthermore, in another example, the second path loss reference resource might specify a plurality of second measurement target configurations, that is, the channel state information reference signals transmitted from Antenna Port 15 and Antenna Port 16 and the like, in the path loss reference resource addition/modification list. In this case, the second path loss and the third path loss may be calculated on the basis of the received signal power of the channel state information reference signals transmitted from Antenna Port 15 and Antenna Port 16. In this case, the first path loss, the second path loss, and the third path loss may be associated with the first subframe subset, the second subframe subset, and the third subframe subset, respectively. In addition, the base station apparatus 101 may set a first value for a TPC command (transmission power control command) included in an uplink grant transmitted using the first subframe subset and a second value, which is different from the first value, for a TPC command included in an uplink grant transmitted using the second subframe subset. That is, the first value of the TPC command may be associated with the first subframe subset, and the second value of the TPC command may be associated with the second subframe subset. At this time, the first value and the second value may be set to different values. That is, the base station apparatus 101 may set the first value to a value larger than the second value. Here, the first value and the second value are power correction values of the TPC command.

For example, assume that downlink subframes are classified into the first subset and the second subset. Now, when an uplink grant has been received in the subframe n (n is a natural number), the terminal apparatus 102 transmits an uplink signal using the subframe n+4, and therefore it is naturally assumed that uplink subframes are also classified into a first subset and a second subset. The first subset and the first uplink power control-related parameter configuration may be associated with each other, and the second subset and the second uplink power control-related parameter configuration may be associated with each other. That is, when the terminal apparatus 102 has detected an uplink grant in a downlink subframe included in the first subset, the terminal apparatus 102 calculates the path loss on the basis of various information elements included in the first uplink power control-related parameter configuration and the path loss reference resources (measurement targets) included in the first uplink power control-related parameter configuration, and calculates the first uplink transmission power. In addition, when the terminal apparatus 102 has detected an uplink grant in a downlink subframe included in the second subset, the terminal apparatus 102 calculates the path loss on the basis of various information elements included in the second uplink power control-related parameter configuration and the path loss reference resources (measurement targets) included in the second uplink power control-related parameter configuration, and calculates the second uplink transmission power.

In addition, in an example, a control channel region including an uplink grant is associated with the uplink power control-related parameter configuration. That is, the base station apparatus 101 can switch the uplink power control-related parameter configuration used for calculating the uplink transmission power in accordance with a control channel region (first control channel region or second control channel region) in which the terminal apparatus 102 has detected an uplink grant. That is, when the terminal apparatus 102 has detected an uplink grant in the first control channel region, the terminal apparatus 102 calculates the path loss using the first uplink power control-related parameter configuration, and calculates the uplink transmission power. On the other hand, when the terminal apparatus 102 has detected an uplink grant in the second control channel region, the terminal apparatus 102 calculates the path loss using the second uplink power control-related parameter configuration, and calculates the uplink transmission power. In addition, in another example, a control channel region including a downlink assignment may be associated with the uplink power control-related parameter configuration. It is to be noted that the uplink grant and the downlink assignment are both a type of DCI format.

In the second modification of the third embodiment, the base station apparatus 101 transmits the first uplink power control-related parameter configuration and the second uplink power control-related parameter configuration to the terminal apparatus 102. In an example, the terminal apparatus 102 calculates the path loss (first path loss) on the basis of the first uplink power control-related parameter configuration in accordance with the transmitted information, and sets the first uplink transmission power on the basis of the first path loss and the first uplink power control-related parameter configuration. In addition, the terminal apparatus 102 calculates the path loss (second path loss) on the basis of the second uplink power control-related parameter configuration, and sets the second uplink transmission power on the basis of the second path loss and the second uplink power control-related parameter configuration. That is, the first uplink transmission power may always be calculated on the basis of the measurement targets transmitted using the first uplink power control-related parameter configuration, and the second uplink transmission power may always be set on the basis of the measurement targets transmitted using the second uplink power control-related parameter configuration.

In addition, the terminal apparatus 102 may perform control in such a way as to determine whether to transmit an uplink signal with the first uplink transmission power or the second uplink transmission power in accordance with a frequency resource in which an uplink grant has been detected or a timing at which a DCI format has been detected. In addition, when transmitting an uplink grant using a downlink subframe in the first subframe subset, the base station apparatus 101 sets the value of the TPC command to the first value, and when transmitting an uplink grant using a downlink subframe in the second subframe subset, the base station apparatus 101 sets the value of the TPC command to the second value. For example, the first value of the power correction value may be set to be larger than the second value. In addition, the base station apparatus 101 can perform a process for demodulating an uplink signal such that an uplink signal transmitted using an uplink subframe in the first subframe subset is demodulated but an uplink signal transmitted using an uplink subframe in the second subframe subset is not subjected to the demodulation process.

Thus, the first uplink transmission power and second uplink transmission power may be associated with the first uplink power control-related parameter configuration and the second uplink power control-related parameter configuration, respectively, in a fixed manner.

In addition, in the second modification of the third embodiment, the base station apparatus 101 transmits radio resource control signals including the first uplink power control-related parameter configuration and the second uplink power control-related parameter configuration, respectively, to the terminal apparatus 102, and transmits a DCI format (for example, an uplink grant) to the terminal apparatus 102. In addition, the terminal apparatus 102 calculates the first path loss and the first uplink transmission power on the basis of the first uplink power control-related parameter configuration, and calculates the second path loss and the second uplink transmission power on the basis of the second uplink power control-related parameter configuration. When the terminal apparatus 102 has detected the uplink grant, the terminal apparatus 102 transmits an uplink signal with the first uplink transmission power or the second uplink transmission power.

By setting a plurality of uplink power control-related parameter configurations, the terminal apparatus 102 can select an appropriate uplink power control-related parameter configuration for the base station apparatus 101 or the RRH 103, and transmit an uplink signal with appropriate uplink transmission power to the base station apparatus 101 or the RRH 103. More specifically, at least one of information elements included in the first uplink power control-related parameter configuration and the second uplink power control-related parameter configuration may be configured as different values. For example, when different types of control are to be performed between the base station apparatus 101 and the terminal apparatus 102 and between the RRH 103 and the terminal apparatus 102, $\alpha$, which is the attenuation coefficient used for the fractional transmission power control in a cell, included in each configuration may be configured as an appropriate $\alpha$ by associating the first uplink power control-related parameter configuration with the transmission power control for the base station apparatus 101 and the second uplink power control-related parameter configuration with the transmission power control with the RRH 103.

That is, different types of fractional transmission power control may be performed between the base station apparatus 101 and the terminal apparatus 102 and between the RRH 103 and the terminal apparatus 102. Similarly, by setting $P_{O\_NOMINAL\_PUSCH,c}$ or $P_{O\_UE\_PUSCH,c}$ to different values in the first uplink power control-related parameter configuration and the second uplink power control-related parameter configuration, the nominal power of the PUSCH can be different values between the case of the base station apparatus 101 and the terminal apparatus 102 and the case of the RRH 103 and the terminal apparatus 102. The same operation can be performed for other parameters. That is, each of various parameters included in the first uplink power control-related parameter configuration and the second uplink power control-related parameter configuration may be set to different values.

In addition, the terminal apparatus 102 can switch the uplink power control-related parameter configuration used for calculating the uplink transmission power in accordance with the type of DCI format included in a received PDCCH. For example, when the PDCCH including an SRS request is DCI Format 0 (first DCI format), the terminal apparatus 102 can calculate the transmission power of the aperiodic SRS using a power offset (first A-SRS power offset) configured in the first uplink power control-related parameter configuration. When the PDCCH including an SRS request is DCI Format 1A (second DCI format), the terminal apparatus 102 can calculate the transmission power of the aperiodic SRS using a power offset (second A-SRS power offset) configured in the second uplink power control-related parameter configuration. That is, the terminal apparatus 102 calculate the transmission power of the aperiodic SRS by associating the type of DCI format including an SRS request with the uplink power control-related parameter configuration.

Whether or not different uplink power control-related parameter configurations are used in accordance with the type of DCI format may be transmitted for each terminal apparatus 102 using an RRC signal. That is, whether or not the same uplink power control-related parameter configuration is used between the first DCI format and the second DCI format may be transmitted using an RRC signal.

In addition, referring to FIG. 1, the terminal apparatus 102 may be controlled for the uplink 106 in such a way as to calculate the path loss and the uplink transmission power using the first uplink power control-related parameter configuration and transmit an uplink signal with the transmission power. The terminal apparatus 102 may be controlled for the uplink 108 in such a way as to calculate the path loss and the uplink transmission power using the second uplink power control-related parameter configuration and transmit an uplink signal with the transmission power.

In addition, in the third embodiment including the first modification and the second modification, the first path loss and the second path loss may be calculated using filter coefficients to which different values are set. That is, the first path loss and the second path loss may be calculated using a first filter coefficient and a second filter coefficient, respectively.

Fourth Embodiment

Next, a fourth embodiment will be described. In the fourth embodiment, a method for configuring parameters necessary for the base station apparatus 101 to connect the terminal apparatus 102 to the base station apparatus 101 or the RRH 103 will be described.

When transmission of an uplink signal with uplink transmission power for the base station apparatus (macro base station apparatus) 101 and transmission of an uplink signal with uplink transmission power for the RRH 103 are performed using the same carrier component at the same timing (uplink subframe), problems such as inter-code interference, interference due to out-of-band radiation, and expansion of a desired dynamic range arise.

The base station apparatus 101 controls the terminal apparatus 102 such that the transmission of an uplink signal to the base station apparatus 101 and the transmission of an uplink signal to the RRH 103 are separated from each other in the time domain. That is, the base station apparatus 101 configures transmission timing of each uplink signal (PUSCH, PUCCH (CQI, PMI, SR, RI, or Ack/Nack), UL DMRS, SRS, or PRACH) such that a timing at which the terminal apparatus 102 transmits each uplink signal to the base station apparatus 101 and a timing at which the terminal apparatus 102 transmits each uplink signal to the RRH 103 become different. That is, the base station apparatus 101 configures each uplink signal such that the transmission to the base station apparatus 101 and the transmission to the RRH 103 do not overlap. It is to be noted that various uplink physical channels include at least one (or one type of) uplink physical channel (uplink signal) among the above-described uplink signals (PUSCH, PUCCH, (CQI, PMI, SR, RI, or Ack/Nack), UL DMRS, SRS, and PRACH).

The base station apparatus 101 may configure a subset for the transmission timings (uplink subframes) of the uplink signals for the base station apparatus 101 and a subject for the transmission timings (uplink subframes) of the uplink signals for the RRH 103, and may schedule each terminal apparatus in accordance with the subsets.

In addition, the base station apparatus 101 appropriately configures the uplink power control-related parameter configurations for the base station apparatus 101 and the RRH 103 so that transmission power is appropriately set for the uplink signals transmitted to the base station apparatus 101 and the uplink signals transmitted to the RRH 103. That is, the base station apparatus 101 can perform appropriate uplink signal power control for the terminal apparatus 102.

First, control performed by the base station apparatus 101 in the time domain will be described. If the uplink subframe subset for the base station apparatus 101 is referred to as a first uplink subset (first uplink subframe subset) and the uplink subframe subset for the RRH 103 is referred to as a second uplink subset (second uplink subframe subset), the base station apparatus 101 sets the values of various parameters such that each uplink signal is included in either the first subset or the second subset in accordance with whether the terminal apparatus 102 is connected to the base station apparatus 101 or the RRH 103.

Configuration of a transmission subframe and a transmission period of each uplink signal will be described. The transmission subframes and the transmission periods of the channel quality indicator (CQI) and the precoding matrix indicator (PMI) are configured using a CQI-PMI configuration index (cqi-pmi-ConfigIndex). In addition, the transmission subframe and the transmission period of the rank indicator (RI) are configured using an RI configuration index. In addition, a cell-specific SRS transmission subframe (transmission subframe and transmission period) of the SRS (sounding reference signal) is configured using a cell-specific SRS subframe configuration (srs-SubframeConfig), and a terminal-specific SRS transmission subframe, which is a subset of the cell-specific SRS transmission subframe, is configured using a terminal-specific SRS configuration index (srs-ConfigIndex). The transmission subframe of the PRACH is configured using a PRACH configuration index (prach-ConfigIndex). In addition, the transmission timing of the SR (scheduling request) is configured using an SR configuration (sr-ConfigIndex).

The CQI-PMI configuration index and the RI configuration index are configured using a CQI report periodic (CQI-ReportPeriodic) included in a CQI report configuration (CQI-ReportConfig). In addition, the CQI report configuration is included in the dedicated physical configuration.

The cell-specific SRS subframe configuration is configured using a cell-specific sounding UL configuration (SoundingRS-UL-ConfigCommon), and the terminal-specific SRS configuration index is configured using a terminal-specific sounding UL configuration (SoundingRS-UL-ConfigDedicated). The cell-specific sounding UL configuration is included in a cell-specific radio resource configuration SIB and the cell-specific radio resource configuration. The terminal-specific sounding UL configuration is included in the terminal-specific radio resource configuration.

The PRACH configuration index is configured using PRACH configuration information (PRACH-ConfigInfo). The PRACH configuration information is included in a PRACH configuration SIB (PRACH-ConfigSIB) and a PRACH configuration (PRACH-Config). The PRACH configuration SIB is included in the cell-specific radio resource configuration SIB, and the PRACH configuration is included in the cell-specific radio resource configuration.

The SR configuration index is included in a scheduling request configuration (SchedulingRequestConfig). The scheduling request configuration is included in the dedicated physical configuration.

In addition, since the PUSCH, aperiodic CSI (channel state information), and the aperiodic SRS are transmitted using an uplink subframe associated with a downlink subframe in which an uplink grant has been detected, the base station apparatus 101 can perform control in such a way as to determine whether to transmit these uplink signals to the terminal apparatus 102 using the first uplink subframe subset or the second subframe subset by controlling a timing at which the uplink grant is transmitted. Here, the aperiodic CSI (A-CSI) refers to CSI transmitted when a transmission request has been received using a CSI request (CSI indicator). In addition, the CSI request is associated with information indicated by two bits. For example, when the CSI request is "00", the CSI is not transmitted.

When the CSI request is "01", CSI regarding the serving cell c is transmitted. When the CSI request is "10", CSI regarding a first cell group (cell set) is transmitted. When the CSI request is "11", CSI regarding a second cell group (cell set) is transmitted. In addition, if it is assumed that the CSI request is indicated by an index of 0 to 3, the CSI is not transmitted in the case of the index of 0 (first value). In the case of the index of 1 (second value), the CSI regarding the serving cell c is transmitted. In the case of the index of 2 (third value), the CSI regarding the first cell group (cell set) is transmitted. In the case of the index of 3 (fourth value), the CSI regarding the second cell group (cell set) is transmitted.

The base station apparatus 101 can perform uplink transmission control for each terminal apparatus such that the uplink signals for the base station apparatus 101 and the uplink signals for the RRH 103 do not interfere with each other by configuring the index relating to the transmission timing of each uplink signal such that the index is included in the first uplink subset or the second uplink subset.

In addition, the resource assignment, the transmission timing, and the transmission power control for each uplink signal may be configured for the secondary cell. More specifically, cell/terminal-specific SRS configurations are configured in a secondary cell-specific manner. In addition, the transmission timing of the PUSCH and the transmission resource for the PUSCH are specified by an uplink grant.

As described in the third embodiment, the uplink transmission power control-related parameter configuration may be configured in a secondary cell-specific manner.

The control of the transmission power of the PRACH will be described. The initial transmission power of the PRACH is calculated using preamble initial received target power (preambleInitialReceivedTargetPower). When random access has failed between the base station apparatus 101 and the terminal apparatus 102, a power ramping step (powerRampingStep) for performing transmission while increasing the transmission power by a certain amount is configured. In addition, when random access using a physical random access channel (PRACH) in which transmission is performed while increasing the power has kept failing and the maximum transmission power of the terminal apparatus 102 or the maximum transmission time of the PRACH has been exceeded, the terminal apparatus 102 determines that the random access has failed, and notifies a higher layer that a random access problem (RAP) has arisen. When the higher layer has been notified of a random access problem, the higher layer determines that a radio resource failure (RLF) has occurred.

The cell-specific radio resource configuration includes P_MAX, which denotes the maximum transmission power of the terminal apparatus 102. In addition, the cell-specific radio resource configuration for the secondary cell also includes P_MAX. The base station apparatus 101 can set the maximum transmission power of the terminal apparatus 102 in a primary cell or secondary cell-specific manner.

In addition, the uplink transmission power of the PUSCH, the PUCCH, and the SRS is as described in the third embodiment.

In an example, the base station apparatus 101 configures the configurations (indices) of the PUSCH, the PUCCH, the SRS, and the PRACH included in the cell-specific/terminal-specific radio resource configurations and the dedicated physical configuration transmitted using the system information along a time axis such that the indices are initially included in the first uplink subframe subset. After an RRC connection is established, the base station apparatus 101 performs channel measurement or the like for each terminal apparatus 102 for the base station apparatus 101 and the RRH 103 in order to determine which of the two (base station apparatus 101 and RRH 103) the terminal apparatus 102 is located closer to. If the base station apparatus 101 determines that the measured terminal apparatus 102 is located closer to the base station apparatus 101 than the RRH 103, the base station apparatus 101 does not particularly change the configurations, and if the base station apparatus 101 determines that the measured terminal apparatus 102 is located closer to the RRH 103 than the base station apparatus 101, the base station apparatus 101 transmits reconfiguration information (for example, transmission power control information and transmission timing information) suitable for a connection to the RRH 103 to the terminal apparatus 102.

Here, the transmission power control information is a general term for transmission power control for each uplink signal. For example, various information elements and the TPC command included in the uplink power control-related parameter configuration are included in the transmission power control information. In addition, the transmission timing information is a general term for information for configuring the transmission timing for each uplink signal. For example, the transmission timing information includes control information (SRS subframe configuration, CQI-PMI configuration index, and the like) relating to the transmission timing.

The transmission control (uplink transmission timing control) of the uplink signals for the base station apparatus 101 or the RRH 103 will be described. The base station apparatus 101 determines whether the terminal apparatus 102 is located closer to the base station apparatus 101 or the RRH 103 on the basis of a result of measurement of each terminal apparatus. If the base station apparatus 101 determines on the basis of the result of the measurement (measurement report) that the terminal apparatus 102 is located closer to the base station apparatus 101 than the RRH 103, the base station apparatus 101 configures the transmission timing information regarding each uplink signal such that the transmission timing information regarding each uplink signal is included in the first uplink subframe subset, and sets the transmission power information to a value suitable for the base station apparatus 101. At this time, the base station apparatus 101 might not particularly transmit information for reconfiguration to the terminal apparatus 102. That is, the configurations might not particularly be updated from the initial configurations. In addition, if the base station apparatus 101 determines that the terminal apparatus 102 is located closer to the RRH 103 than the base station apparatus 101, the base station apparatus 101 configures the transmission timing information regarding each uplink signal such that the transmission timing information regarding each uplink signal is included in the second uplink subframe subset, and sets the transmission power information to a value suitable for the RRH 103.

That is, by changing the transmission timing, the base station apparatus 101 can control the uplink signals for the base station apparatus 101 and the uplink signals for the RRH 103 and control the terminal apparatus 102 such that these signals do not interfere with each other. Here, assume that the terminal apparatus 102 that communicates with the base station apparatus 101 is referred to as Terminal Apparatus A and the terminal apparatus 102 that communicates with the RRH 103 is referred to as Terminal Apparatus B. The base station apparatus 101 can configure various configuration indices including the transmission timings such that the transmission timings of Terminal Apparatus B do not become the same as the transmission timings of Terminal Apparatus A. For example, a terminal-specific SRS subframe configuration may be set to a different value between Terminal Apparatus A and Terminal Apparatus B.

In addition, as described in the third embodiment, the base station apparatus 101 can associate measurement targets with the first uplink subframe subset and the second uplink subframe subset.

The above procedure will be described more specifically. The base station apparatus 101 and/or the RRH 103 broadcast broadcast information that specifies a subframe in the first uplink subframe subset as a configuration of the PRACH along the time axis. The terminal apparatus 102 before initial access or the terminal apparatus 102 in an RRC idle mode attempts the initial access using PRACH resources in one of the subframes in the first uplink subframe subset on the basis of the obtained broadcast information. At this time, the transmission power of the PRACH is set with reference to a CRS transmitted by the base station apparatus 101 or by the base station apparatus 101 and the RRH 103. Therefore, the transmission power becomes relatively high, and the PRACH reaches the base station apparatus 101.

After an RRC connection is established or during establishment of an RRC connection using a random access procedure, semi-statically assigned PUCCH resources for periodic CSI and Ack/Nack, semi-statically assigned SRS resources, and semi-statically assigned PUCCH resources for an SR are configured. Here, all these resources are configured by resources of the subframes in the first uplink subframe subset. In addition, the base station apparatus 101 schedules (assigns), to the terminal apparatus 102, a PDSCH that transmits Ack/Nack using the PUSCH in the subframes in the first uplink subframe subset or the PUCCH in the subframes in the first uplink subframe subset. At this time, the transmission power of the PUSCH, the PUCCH, and the SRS is set with reference to the CRS transmitted by the base station apparatus 101 or by the base station apparatus 101 and the RRH 103. Therefore, the transmission power becomes relatively high, and the PUSCH, the PUCCH, and the SRS reach the base station apparatus 101. Thus, the terminal apparatus 102 that performs the uplink transmission with relatively high transmission power (transmission power that compensates the loss between the base station apparatus 101 and the terminal apparatus 102) uses only the subframes in the first uplink subframe subset. It is to be noted that the periodic CSI (P-CSI) includes at least any of the CQI, the PMI, and the RI.

Next, the base station apparatus 101 determines (judges) whether the terminal apparatus 102 is to transmit an uplink signal to the base station apparatus 101 or to the RRH 103. In other words, the base station apparatus 101 determines whether the terminal apparatus 102 is to perform transmission with transmission power that compensates the loss between the base station apparatus 101 and the terminal apparatus 102 or with transmission power that compensates the loss between the RRH 103 and the terminal apparatus 102. As a determination criterion, as described above, whether the position of the terminal apparatus 102 is closer to the base station apparatus 101 or the RRH 103 may be calculated from a result of measurement, or another determination criterion may be used, instead. For example, a signal such as an SRS transmitted by the terminal apparatus 102 using a subframe in the first uplink subframe subset may be received by the RRH 103 and the determination may be made on the basis of the power of the received signal. If the base station apparatus 101 determines that the terminal apparatus 102 is to transmit an uplink signal to the base station apparatus 101, uplink communication using only the subframes in the first uplink subframe subset continues.

If the base station apparatus 101 determines that the terminal apparatus 102 is to transmit an uplink signal to the RRH 103, the uplink power control-related parameters are configured such that the uplink transmission is performed with relatively low transmission power (transmission power that compensates the loss between the RRH 103 and the terminal apparatus 102) using these resources. Here, as a configuration for decreasing the transmission power, the method described in each of the above embodiments may be used. Alternatively, another method such as a method for gradually decreasing the power by repeating closed loop transmission power control or a method for updating the setting of the CRS power value or the path loss compensation coefficient α using a handover procedure may be used.

In addition, if the base station apparatus 101 determines that the terminal apparatus 102 is to transmit an uplink signal to the RRH 103, the semi-statically assigned PUCCH resources for periodic CSI and Ack/Nack, the semi-statically assigned SRS resources, and the semi-statically assigned PUCCH resources for an SR are reconfigured. Here, all these resources are configured by resources of the subframes in the second uplink subframe subset. In addition, the configuration of the PRACH resources in the system information is updated using the handover procedure (mobility control procedure). Here, all the PRACH resources are configured by resources of the subframes in the second uplink subframe subset. In addition, the base station apparatus 101 schedules (assigns), to the terminal apparatus 102, a PDSCH that transmits Ack/Nack using the PUSCH in the subframes in the second uplink subframe subset or the PUCCH in the subframes in the second uplink subframe subset. Thus, the terminal apparatus 102 that performs the uplink transmission with relatively low transmission power (transmission power that compensates the loss between the RRH 103 and the terminal apparatus 102) uses only the subframes in the second uplink subframe subset.

As described above, the terminal apparatus 102 that performs the uplink transmission with relatively high transmission power (transmission power that compensates the loss between the base station apparatus 101 and the terminal apparatus 102) uses the subframes in the first uplink subframe subset, and the terminal apparatus 102 that performs the uplink transmission with relatively low transmission power (transmission power that compensates the loss between the RRH 103 and the terminal apparatus 102) uses only the subframes in the second uplink subframe subset. As a result, the subframes received by the base station apparatus 101 and the subframes received by the RRH 103 can be separated from each other along the time axis. Therefore, signals whose received power is high and signals whose received power is low need not be simultaneously subjected to a reception process, thereby suppressing interference. In addition, a required dynamic range of the base station apparatus 101 or the RRH 103 can be reduced.

Here, the transmission control (uplink transmission resource control) of the uplink signals for the base station apparatus 101 or the RRH 103 in the case of the carrier aggregation will be described. Assume that the base station apparatus 101 configures two carrier components (first carrier component and second carrier component) for the terminal apparatus 102, and the first carrier component is configured as the primary cell and the second carrier component is configured as the secondary cell. If base station apparatus 101 determines on the basis of a result of measurement that the terminal apparatus 102 is located closer to the base station apparatus 101 than the RRH 103 (Terminal Apparatus A), the base station apparatus 101 sets the secondary cell to deactivation. That is, Terminal Apparatus A performs communication using only the primary cell without using the secondary cell.

In addition, if the base station apparatus 101 determines that the terminal apparatus 102 is located closer to the RRH 103 than the base station apparatus 101 (Terminal Apparatus B), the base station apparatus 101 sets the secondary cell to activation. That is, Terminal Apparatus B communicates with the base station apparatus 101 and the RRH 103 using not only the primary cell but also the secondary cell. The base station apparatus 101 configures resource assignment and transmission power control suitable for transmission to the RRH 103 for the configuration of the secondary cell for Terminal Apparatus B. That is, the base station apparatus 101 control Terminal Apparatus B such that the path loss and the uplink transmission power are calculated while assuming that the measurement of the path loss is transmitted from the RRH 103. However, uplink signals transmitted by Terminal Apparatus B through the secondary cell are the PUSCH, the UL DMRS for demodulating the PUSCH, and the SRS. The PUCCH (CQI, PMI, or RI), the UK DMRS for demodulating the PUCCH, and the PRACH are transmitted through the primary cell. For example, if Terminal Apparatus B is permitted by a higher layer to simultaneously transmit the PUSCH and the PUCCH, Terminal Apparatus B is controlled in such a way as to transmit the PUCCH through the primary cell and the PUSCH through the secondary cell.

At this time, the transmission power of Terminal Apparatus B for the primary cell is controlled by the base station apparatus 101 in such a way as to be transmission power for the base station apparatus 101, and the transmission power for the secondary cell is controlled in such a way as to be transmission power for the RRH 103. In addition, if Terminal Apparatus A is permitted by a higher layer to simultaneously transmit the PUSCH and the PUCCH, the base station apparatus 101 controls Terminal Apparatus A such that both the PUSCH and the PUCCH are transmitted through the primary cell. That is, by changing the transmission resources, the base station apparatus 101 can control the uplink signals for the base station apparatus 101 and the uplink signals for the RRH 103 and control the terminal apparatuses 102 such that these uplink signals do not interfere with each other.

In addition, for Terminal Apparatus B, the base station apparatus 101 can reconfigure the first carrier component as the secondary cell and the second carrier component as the primary cell using handover. At this time, Terminal Apparatus B performs the same process as that performed by the above-described Terminal Apparatus A. That is, Terminal Apparatus B deactivates the secondary cell. That is, Terminal Apparatus B communicates with the RRH 103 using only the primary cell without using the secondary cell. At this time, Terminal Apparatus B is controlled in such a way as to transmit all the uplink signals through the primary cell. In addition, the uplink transmission power at this time is all subjected to the uplink transmission power control for the RRH 103. That is, the PUSCH, the PUCCH, the PRACH, and the SRS are reconfigured to the transmission power for the RRH 103. The reconfiguration information at this time is included in the RRC connection reconfiguration.

In addition, by providing an access (transmission) limitation (ac-BarringFactor) in the uplink transmission power for the carrier component or the cell, the base station apparatus 101 can control the terminal apparatus such that communication is not performed through the second carrier component with high transmission power.

In addition, as described in the third embodiment, the base station apparatus 101 can associate the first carrier component and the second carrier component or the primary cell and the secondary cell with the measurement targets.

The above procedure will be described from a different perspective. The base station apparatus 101 and the RRH 103 perform communication using a combination between carrier components that are a subset of two downlink carrier components (component carriers) and two uplink carrier components (component carriers). The base station apparatus 101 and/or the RRH 103 broadcast information that limits the initial access (inhibiting the initial access) in a second downlink carrier component. On the other hand, in a first downlink carrier component, broadcast information for enabling the initial access is broadcast (broadcast information that limits the initial access is not broadcast).

The terminal apparatus before the initial access or the terminal apparatus 102 in the RRC idle mode attempts the initial access using PRACH resources not in a second uplink carrier component but in a first uplink carrier component on the basis of the obtained broadcast information. At this time, the transmission power of a PRACH is set with reference to a CRS transmitted by the base station apparatus 101 or the base station apparatus 101 and the RRH 103 using the first downlink carrier component. Therefore, the transmission power becomes relatively high, and the PRACH reaches the base station apparatus 101.

After an RRC connection is established or during establishment of an RRC connection using a random access procedure, semi-statically assigned PUCCH resources for periodic CSI and Ack/Nack, semi-statically assigned SRS resources, and semi-statically assigned PUCCH resources for an SR are configured. Here, all these resources are configured by resources in the first uplink carrier component, that is, resources in the primary cell (PCell; a cell including the first downlink carrier component and the first uplink carrier component). In addition, the base station apparatus 101 schedules (assigns), to the terminal apparatus 102, a PUSCH in the first uplink carrier component. Furthermore, the terminal apparatus 102 transmits Ack/Nack for a PDSCH in the first downlink carrier component using a PUCCH in the first uplink carrier component. At this time, the transmission power of the PUSCH, the PUCCH, and the SRS is set with reference to the CRS transmitted by the base station apparatus 101 or by the base station apparatus 101 and the RRH 103. Therefore, the transmission power becomes relatively high, and the PUSCH, the PUCCH, and the SRS reach the base station apparatus 101.

When the carrier aggregation is performed, the secondary cell (SCell) is configured as a cell that includes the second downlink carrier component (does not include an uplink carrier component). The semi-statically assigned PUCCH resources for periodic CSI and Ack/Nack in the SCell are configured by resources in the first uplink carrier component, that is, resources in the PCell. In addition, the terminal apparatus 102 transmits Ack/Nack for the PDSCH in the second downlink carrier component (SCell) using the PUCCH in the first uplink carrier component (PCell). At this time, the transmission power of the PUSCH, the PUCCH, and the SRS is set with reference to a CRS transmitted by the base station apparatus 101 or the base station apparatus 101 and the RRH 103 through the PCell. Therefore, the transmission power becomes relatively high, and the PUSCH, the PUCCH, and the SRS reach the base station apparatus 101. Thus, the terminal apparatus 102 that performs the uplink transmission with relatively high transmission power (transmission power that compensates the loss between the base station apparatus 101 and the terminal apparatus 102) uses only the first uplink carrier component regardless of whether or not the carrier aggregation is performed.

Next, the base station apparatus 101 determines whether the terminal apparatus 102 is to transmit an uplink signal to the base station apparatus 101 or the RRH 103. In other words, the base station apparatus 101 determines whether the terminal apparatus 102 is to transmit an uplink signal with transmission power that compensates the loss between the base station apparatus 101 and the terminal apparatus 102 or transmission power that compensates the loss between the RRH 103 and the terminal apparatus 102. As a determination criterion, the above-described method may be used. If the base station apparatus 101 determines that the terminal apparatus 102 is to transmit an uplink signal to the base station apparatus 101, the uplink communication that uses only the first uplink carrier component, that is, the communication in which the cell including the first downlink carrier component and the first uplink carrier component has been determined as the PCell, continues.

If the base station apparatus 101 determines that the terminal apparatus 102 is to transmit an uplink signal to the RRH 103, the PCell is changed using the handover procedure. That is, the PCell including the first downlink carrier component and the first uplink carrier component is changed to a PCell including the second downlink carrier component and the second uplink carrier component. In the handover procedure, the uplink power control-related parameters are configured such that the uplink transmission is performed with relatively low transmission power (transmission power that compensates the loss between the RRH 103 and the terminal apparatus 102) after the handover. For example, another method such as the method for updating the setting of the CRS power value, the path loss compensation coefficient α, or the initial value of the uplink transmission power in the system information. In addition, system information that does not limit the initial access is configured.

In addition, if the PCell has been changed, a random access procedure in the second uplink carrier component is performed to establish an RRC connection. After the RRC connection is established or during the establishment of the RRC connection using the random access procedure, the semi-statically assigned PUCCH resources for periodic CSI and Ack/Nack, the semi-statically assigned SRS resources, and the semi-statically assigned PUCCH resources for an SR are reconfigured. Here, all these resources are configured by resources in the second uplink carrier component. The base station apparatus 101 schedules (assigns), to the terminal apparatus 102, a PDSCH that transmits Ack/Nack using the PUSCH in the second uplink carrier component or the PUCCH in the second uplink carrier component. At this time, the uplink power control-related parameters are configured such that the transmission power of the PUSCH, the PUCCH, and the SRS becomes relatively low transmission power (transmission power that compensates the loss between the RRH 103 and the terminal apparatus 102).

When the carrier aggregation is performed, the SCell is configured as a cell that includes the first downlink carrier component (does not include an uplink carrier component).

The semi-statically assigned PUCCH resources for periodic CSI and Ack/Nack in the SCell are configured by resources in the second uplink carrier component, that is, resources in the PCell. In addition, the terminal apparatus 102 transmits Ack/Nack for the PDSCH in the SCell using the PUCCH in the second uplink carrier component. At this time, the uplink power control-related parameters are configured such that the transmission power of the PUCCH becomes relatively low transmission power (transmission power that compensates the loss between the RRH 103 and the terminal apparatus 102). Thus, the terminal apparatus 102 that performs the uplink transmission with relatively low transmission power (transmission power that compensates the loss between the RRH 103 and the terminal apparatus 102) uses only the second uplink carrier component regardless of whether or not the carrier aggregation is performed.

As described above, the terminal apparatus 102 that performs the uplink transmission with relatively high transmission power (transmission power that compensates the loss between the base station apparatus 101 and the terminal apparatus 102) uses the first uplink carrier component, and the terminal apparatus 102 that performs the uplink transmission with relatively low transmission power (transmission power that compensates the loss between the RRH 103 and the terminal apparatus 102) uses only the second uplink carrier component. As a result, the subframes received by the base station apparatus 101 and the subframes received by the RRH 103 can be separated from each other along a frequency axis. Therefore, signals whose received power is high and signals whose received power is low need not be simultaneously subjected to the reception process, thereby suppressing interference. In addition, the required dynamic range of the base station apparatus 101 or the RRH 103 can be reduced.

Here, transmission control of an uplink signal (uplink signal power control) for the base station apparatus 101 or the RRH 103 using the control channel (PDCCH) region including an uplink grant will be described. If the base station apparatus 101 determines from a result of measurement that a certain terminal apparatus (Terminal Apparatus A) is located closer to the base station apparatus 101, the base station apparatus 101 performs the dynamic transmission control of an uplink signal of Terminal Apparatus A using only the first control channel (PDCCH) region. On the other hand, if the base station apparatus 101 determines from a result of measurement that a certain terminal apparatus (Terminal Apparatus B) is located closer to the RRH 103, the base station apparatus 101 performs the dynamic transmission control of an uplink signal of Terminal Apparatus B using only the second control channel (X-PDCCH) region. That is, when the base station apparatus 101 intends the terminal apparatus 102 to transmit an uplink signal for the base station apparatus 101, the base station apparatus 101 transmits an uplink grant to the terminal apparatus 102 while including the uplink grant in the first control channel region, and when the base station apparatus 101 intends the terminal apparatus 102 to transmit an uplink signal for the RRH 103, the base station apparatus 101 transmits an uplink grant to the terminal apparatus 102 while including the uplink grant in the second control channel region.

Furthermore, by using the TPC command, which is a correction value of the transmission power control of an uplink signal included in an uplink grant, the base station apparatus 101 can perform the transmission power control of an uplink signal for the base station apparatus 101 or the RRH 103. The base station apparatus 101 sets the value of the TPC command included in an uplink grant to one for the base station apparatus 101 or one for the RRH 103 depending on a control channel region with which the uplink grant is transmitted. That is, when intending to increase the uplink transmission power for the base station apparatus 101, the base station apparatus 101 sets a large power correction value of the TPC command in the first control channel region, and when intending to decrease the uplink transmission power for the RRH 103, the base station apparatus 101 sets a small power correction value of the TPC command in the second control channel region. The base station apparatus 101 performs the transmission of an uplink signal and the uplink transmission power control for Terminal Apparatus A using the first control channel region, and performs the transmission of an uplink signal and the uplink transmission power control for Terminal Apparatus B using the second control channel region.

That is, the base station apparatus 101 can perform uplink transmission power control for the terminal apparatus 102 by setting the power correction value of the TPC command (transmission power control command) for the base station apparatus 101 to the first value and the power correction value of the TPC command (transmission power control command) for the RRH 103 to the second value. The base station apparatus 101 may set the first value of the power correction value to be larger than the second value.

In addition, as described in the third embodiment, the base station apparatus 101 can associate measurement targets with the first control channel region and the second control channel region.

In addition, in the fourth embodiment, the base station apparatus 101 configures transmission timing information regarding a physical random access channel included in the system information in a subframe in the first subframe subset and transmission timing information regarding various uplink physical channels in subframes in the first subframe subset. When reconfiguring the radio resource control information for some terminal apparatuses 102, the base station apparatus 101 configures transmission timing information regarding a physical random access channel included in a radio resource control signal in a subframe in the second subframe subset different from the first subframe subset and transmission timing information regarding various uplink physical channels in subframes in the second subframe subset.

Furthermore, the base station apparatus 101 configures transmission power control information regarding various uplink signals as first transmission power control information by associating the transmission power control information with the first subframe subset, and when reconfiguring the radio resource control information for some terminal apparatuses 102, the base station apparatus 101 configures transmission power control information regarding various uplink signals as second transmission power control information by associating the transmission power control information with the second subframe subset.

Furthermore, the base station apparatus 101 configures the first transmission power control information for the terminal apparatus 102 that transmits an uplink signal using the first subframe subset and the second transmission power control information for the terminal apparatus 102 that transmits an uplink signal using the second subframe subset.

In addition, in the fourth embodiment, the base station apparatus 101 transmits signals through the first downlink carrier component and the second downlink carrier component. The base station apparatus 101 configures the first transmission power control information as primary cell-specific transmission power control information for the terminal apparatus 102 for which the first downlink carrier component has been configured as the primary cell and the second transmission power control information as the primary cell-specific transmission power control information for the terminal apparatus 102 for which the second downlink carrier component has been configured as the primary cell.

Furthermore, the base station apparatus 101 receives signals through the first uplink carrier component and the second uplink carrier component. The base station apparatus 101 configures the first transmission power control information for the terminal apparatus 102 that performs communication through the first uplink carrier component and the second transmission power control information for the terminal apparatus 102 that performs communication through the second uplink carrier component.

The base station apparatus 101 can perform appropriate transmission timing control, appropriate radio resource control, and appropriate uplink transmission power control by controlling transmission of an uplink signal of the terminal apparatus 102 that accesses (communicates with or connects to) the base station apparatus 101 and the terminal apparatus 102 that accesses the RRH 103 using time, frequency, and a control channel region including an uplink grant for each terminal apparatus 102. In addition, the base station apparatus 101 can determine whether or not a received uplink signal is a signal transmitted thereto on the basis of time and frequency resources of the received uplink signal and whether or not to demodulate the received signal. In addition, the RRH 103 can determine whether or not a received uplink signal is a signal transmitted thereto on the basis of time and frequency resources of the received uplink signal and whether or not to demodulate the received signal.

For example, if the base station apparatus 101 has received an uplink signal through the first uplink carrier component, which is the primary cell, the base station apparatus 101 can determine that the signal has been transmitted thereto and perform the process for demodulating the received uplink signal, but if the base station apparatus 101 has received an uplink signal through the second uplink carrier component, which is the secondary cell, the base station apparatus 101 can determine that the signal is not a signal transmitted thereto and perform control such that the process for demodulating the received uplink signal is not performed. In addition, if the base station apparatus 101 has received an uplink signal through an uplink subframe in the first subframe subset, the base station apparatus 101 can determine that the signal has been transmitted thereto and perform the process for demodulating the received uplink signal, but if the base station apparatus 101 has received an uplink signal through an uplink subframe in the second subframe subset, the base station apparatus 101 can determine that the signal is not a signal transmitted thereto and perform control such that the process for demodulating the received uplink signal is not performed.

In addition, the RRH 103 can perform the same process. If the RRH 103 has received an uplink signal through the first uplink carrier component, which is the primary cell, the RRH 103 can determine that the signal is not a signal transmitted thereto and does not perform the process for demodulating the received uplink signal, but if the RRH 103 has received an uplink signal through the second uplink carrier component, which is the secondary cell, the RRH 103 can determine that the signal has been transmitted thereto and perform the process for demodulating the received uplink signal. In addition, if the RRH 103 has received an uplink signal through an uplink subframe in the first subframe subset, the RRH 103 can determine that the signal is not a signal transmitted thereto and does not perform the process for demodulating the received uplink signal, but if the RRH 103 has received an uplink signal through an uplink subframe in the second subframe subset, the RRH 103 can determine that the signal has been transmitted thereto and perform control such that the process for demodulating the received uplink signal is performed.

The base station apparatus 101 configures various parameters such that the transmission power control information and the transmission timing information relating to uplink signals included in the system information are all appropriately configured for the base station apparatus 101. During communication between the base station apparatus 101 and the terminal apparatus 102 after establishment of an initial connection (RRC connection establishment), the base station apparatus 101 determines, on the basis of a result of channel measurement or the like, whether the terminal apparatus 102 is located closer to base station apparatus 101 or to the RRH 103. If the base station apparatus 101 determines that the terminal apparatus 102 is located closer to the base station apparatus 101, the base station apparatus 101 does not particularly transmit configuration information or configures transmission power control information, transmission timing control information, and transmission resource control information that are more suitable for the communication with the base station apparatus 101 and transmits these pieces of information to the terminal apparatus 102 through the RRC connection reconfiguration. On the other hand, if the base station apparatus 101 determines that the terminal apparatus 102 is located closer to the RRH 103, the base station apparatus 101 configures transmission power control information, transmission timing control information, and transmission resource control information that are more suitable for the communication with the RRH 103, and transmits these pieces of information to the terminal apparatus 102 through the RRC connection reconfiguration.

Fifth Embodiment

Next, a fifth embodiment will be described. In the fifth embodiment, the base station apparatus 101 transmits an RRC signal including a plurality of (two or more) uplink power control-related parameter configurations (for example, a first uplink power control-related parameter configuration and a second uplink power control-related parameter configuration) to the terminal apparatus 102, and transmits a DCI format including an instruction to transmit an uplink signal to the terminal apparatus 102. The terminal apparatus 102 receives the DCI format and determines the type of DCI format. If the received DCI format is a first DCI format, the terminal apparatus 102 calculates the path loss and the transmission power of the uplink signal on the basis of the first uplink power control-related parameter configuration, and if the received DCI format is a second DCI format, the terminal apparatus 102 calculates the path loss and the transmission power of the uplink signal on the basis of the second uplink power control-related parameter configuration, and transmits the uplink signal with the uplink transmission power.

Here, the first DCI format may be an uplink grant and the second DCI format may be a downlink assignment. Alternatively, the first DCI format may be a downlink assignment and the second DCI format may be an uplink grant. That is, the first DCI format and the second DCI format may be different types of DCI format. For example, the first DCI format may be DCI Format 0, and the second DCI format may be DCI Format 1A. In addition, the first DCI format may be DCI Format 4, and the second DCI format may be DCI Format 2B/2C.

In addition, even when the first DCI format and the second DCI format are the same type of DCI format (for example, DCI Format 0), they can be determined as the first DCI format and the second DCI format if different values are set for at least one of various pieces of control information (control fields) included in the DCI formats. For example, DCI Format 0 includes control information regarding the TPC command, and the first DCI format and the second DCI format may be distinguished from each other from a difference in the value (index) of the TPC command. Although the TPC command has been taken as an example here, another piece of control information may be used, instead. For example, DCI Format 0 includes information indicating a cyclic shift of the UL DMRS. If the information indicating a cyclic shift of the UL DMRS is different, the first DCI format and the second DCI format may be distinguished from each other. For example, if the information indicating a cyclic shift of the UL DMRS is a first value, the DCI format may be determined as the first DCI format, and if the information indicating a cyclic shift of the UL DMRS is a second value, the DCI format may be determined as the second DCI format.

In addition, an information field (or an information bit) indicating switching between the plurality of uplink power control-related parameter configurations may be configured in the DCI format. That is, for example, the uplink power control-related parameter configuration may be switched between two uplink power control-related parameter configurations using the information indicating the switching. Here, the base station apparatus 101 can configure the two uplink power control-related parameter configurations for different uses. By performing the uplink power control for the terminal apparatus 102 using the DCI format, more dynamic scheduling can be performed. For example, appropriate uplink transmission power control is different between when communication is performed only with the RRH 103 and when coordinated communication configured by the base station apparatus 101 and the RRH 103 is performed. The base station apparatus 101 can dynamically perform the uplink power control using the DCI format in order to perform more appropriate scheduling. A reference signal for channel measurement such as the SRS is desirably transmitted with appropriate transmission power for each reference point.

The base station apparatus 101 can select appropriate uplink transmission power for a plurality of base station apparatuses (Base Station Apparatus 1, Base Station Apparatus 2, Base Station Apparatus 3, and so on) or a plurality of RRHs (RRH 1, RRH 2, RRH 3, and so on) by configuring a plurality of uplink power control-related parameter configurations for a single terminal apparatus 102, and can suppress interference with other connected terminal apparatuses among the plurality of base station apparatuses 101 (or the plurality of RRHs 103). That is, the base station apparatus 101 (or the RRH 103) can select the base station apparatus 101 or the RRH 103, whichever is closer to the terminal apparatus 102 (with which the path loss is smaller), as an uplink reception point, and the base station apparatus 101 or the RRH 103 as the reception point can configure parameters suitable for the uplink transmission power control for the closer device for the terminal apparatus 102. For example, a closer base station apparatus (RRH) refers to a base station apparatus 101 (RRH 103) that has transmitted a path loss reference resource, the path loss calculated with which is smaller, and a further base station apparatus refers to a base station apparatus 101 (RRH 103) that has transmitted a path loss reference resource, the path loss calculated with which is larger. The terminal apparatus 102 can identify the base station apparatus 101 and the RRH 103 (a plurality of downlink transmission points and uplink reception points, or a plurality of reference points) on the basis of differences in the path loss reference resource.

In addition, the base station apparatus 101 can instruct the terminal apparatus 102 to switch between the plurality of uplink power control-related parameter configurations (here, the first uplink power control-related parameter configuration and the second uplink power control-related parameter configuration) transmitted through an RRC signal in accordance with the type of DCI format. The base station apparatus 101 can perform appropriate uplink transmission power control in accordance with various parameters configured by a cell (the base station apparatus 101 or the RRH 103) to which the terminal apparatus 102 is connected. That is, the terminal apparatus 102 connected to a plurality of reception points (here, the base station apparatus 101 and the RRH 103) can obtain optimum throughput by performing appropriate uplink transmission power control for each reception point (reference point). Since the switching of the uplink transmission power (uplink transmission power control) can be dynamically performed, interference with other reception points and interference with terminal apparatuses 102 connected to the other reception points can be reduced even in an area in which a lot of reception points (reference points) are included. That is, interference with terminal apparatuses that perform communication using the same frequency resources can be suppressed.

For example, when the first uplink power control-related parameter configuration and the second uplink power control-related parameter configuration are configured, the base station apparatus 101 may transmit an RRC signal to the terminal apparatus 102 such that information indicating switching between the configurations is added to the DCI format.

When the terminal apparatus 102 is connected to the base station apparatus 101, the uplink transmission power is set using the first uplink power control-related parameter configuration in which an uplink physical channel (uplink signal) is configured for the base station apparatus 101. On the other hand, when the terminal apparatus 102 is connected to the RRH 103, the uplink transmission power is set using the second uplink power control-related parameter configuration in which an uplink physical channel is configured for the RRH 103. In addition, as the uplink transmission power obtained from the first uplink power control-related parameter configuration and the second uplink power control-related parameter configuration, nominal PUSCH power that compensates power attenuating in accordance with a distance between the base station apparatus 101 (or the RRH 103) and the terminal apparatus 102 may be set in advance. That is, the terminal apparatus 102 can transmit an uplink signal while switching the uplink signal between an uplink signal whose transmission power is relatively high and an uplink signal whose transmission power is relatively low by switching between the first uplink power control-related parameter configuration and the second uplink power control-related parameter configuration. Here, the relatively high transmission power refers to transmission power that does not interfere with another terminal apparatus or that compensates a large path loss. In addition, the relatively low transmission power refers to transmission power with which a transmission signal can reach a reception point or that compensates a small path loss.

In addition, the DCI format may include information (information bit) indicating the switching between the two uplink power control-related parameter configurations. For example, if the information indicating the switching is a first value (for example, "0"), the terminal apparatus 102 calculates the uplink transmission power on the basis of the first uplink control-related parameter configuration, and if the information indicating the switching is a second value (for example, "1"), the terminal apparatus 102 sets the uplink transmission power on the basis of the second uplink control-related parameter configuration.

The information indicating the switching may be associated with the control information included in the DCI format. For example, a value of the cyclic shift index of the UL DMRS and the information indicating the switching may be associated with each other.

In addition, when one of pieces of the control information included in the DCI format is a certain value, the information indicating the switching may be represented by a code point with which the terminal apparatus 102 recognizes that the information indicating the switching is included in the DCI format. For example, when certain information (value) is configured in first control information included in a DCI format transmitted from the base station apparatus 101 or the RRH 103, the terminal apparatus 102 can reread the information included in the DCI format. At this time, in the communication system configured by the terminal apparatus 102 and the base station apparatus 101 (or the RRH 103), the certain information configured in the first control information can be defined as a certain code point.

Here, a certain code point when the first control information is configured by virtual resource block localized/distributed allocation identification information and resource block assignment information is a code point in which, when the virtual resource block localized/distributed allocation identification information is indicated by 1 bit and the resource block assignment information is indicated by 5 bits, the 1 bit indicates "0" and all the 5 bits indicate "1". Only when the terminal apparatus 102 has detected this code point, the terminal apparatus 102 can recognize that the information indicating the switching is included in the DCI format. That is, the certain code point need not be configured by certain information in one of the pieces of the control information. That is, only when a plurality of pieces of control information are certain information, the terminal apparatus 102 detects the certain code point and recognizes that the information indicating the switching is included in the DCI format. For example, when the virtual resource block localized/distributed allocation identification information and the resource block arrangement information are each indicated by certain information, the terminal apparatus 102 recognizes that the indication information is included in the DCI format. In other cases, the terminal apparatus 102 assigns resources on the basis of the virtual resource block localized/distributed allocation identification information and the resource block arrangement information. For example, control information configuring a code point may be configured by certain information for information regarding the cyclic shift of the UL DMRS (cyclic shift for DM RS and OCC index) and PUSCH frequency hopping permission information.

Alternatively, when modulation and coding scheme (MCS) information, HARQ process number information, and NDI (new data indicator) information included in the DCI format are each certain information, the terminal apparatus 102 detects the certain code point and recognizes that the indication information is included in the DCI format. When the code point has been detected, the terminal apparatus 102 can recognize part or all of pieces of control information that are not used for the code point of the DCI format as the information indicating the switching. For example, control information recognized as the information indicating the switching may be the virtual resource block localized/distributed allocation identification information. Alternatively, the control information recognized as the information indicating the switching may be the resource block assignment information. Alternatively, the control information recognized as the information indicating the switching may be the SRS request. Alternatively, the control information recognized as the information indicating the switching may be the CSI request. Alternatively, the control information recognized as the information indicating the switching may be the information regarding the cyclic shift of the UL DMRS. The control information recognized as the information indicating the switching may be indicated by using some of the above-described pieces of control information.

When only the macro base station apparatus 101 transmits a PDCCH or an RRC signal including control information, the macro base station apparatus 101 can determine whether the terminal apparatus 102 is to perform the uplink signal transmission for the base station apparatus 101 or the uplink signal transmission for the RRH 103 using the DCI format. That is, the macro base station apparatus 101 can perform control such that the terminal apparatus 102 transmits an uplink signal to an uplink reception point with which the terminal apparatus 102 can perform appropriate uplink transmission power control while estimating the position or the loss in the transmission power of the terminal apparatus 102.

Two or more sets of uplink power control-related parameter configurations may be configured for various uplink physical channels (PUSCH, PUCCH, SRS, and PRACH). In an example, when two sets of uplink power control-related parameter configurations have been configured for various uplink physical channels, information indicating switching between the sets is included in the DCI format. It may be indicated by 1 bit. For example, if the received information indicating the switching indicates a first value (for example, "0"), the terminal apparatus 102 calculates various values of uplink transmission power using the first uplink power control-related parameter configuration. If the information indicating the switching indicates a second value (for example, "1"), the terminal apparatus 102 calculates various values of uplink transmission power using the second uplink power control-related parameter configuration.

For example, the DCI format may include control information associated with the first uplink power control-related parameter configuration and the second uplink power control-related parameter configuration. That is, when the control information has instructed the terminal apparatus 102 to calculate the uplink transmission power using the first uplink power control-related parameter configuration, that is, when first power control has been indicated, the terminal apparatus 102 calculates the uplink transmission power on the basis of the first uplink power control-related parameter configuration. On the other hand, when the control information has instructed the terminal apparatus 102 to calculate the uplink transmission power using the second uplink power control-related parameter configuration, that is, when second power control has been indicated, the terminal apparatus 102 calculates the uplink transmission power on the basis of the second uplink power control-related parameter configuration. At this time, the first uplink power control-related parameter configuration and the second uplink power control-related parameter configuration are included in an RRC signal and transmitted to the terminal apparatus 102.

Similarly, the information indicating the switching may be indicated by 2 bits in the DCI format. In addition, when the control information has instructed the terminal apparatus 102 to calculate the uplink transmission power using a third uplink power control-related parameter configuration, that is, when third power control has been indicated, the terminal apparatus 102 may calculate the uplink transmission power on the basis of the third uplink power control-related parameter configuration, and when the control information has instructed the terminal apparatus 102 to calculate the uplink transmission power using a fourth uplink power control-related parameter configuration, that is, when fourth power control has been indicated, the terminal apparatus 102 may calculate the uplink transmission power on the basis of the fourth uplink power control-related parameter configuration. As described above, when the control information has instructed the terminal apparatus 102 to calculate the uplink transmission power using uplink power control-related parameters selected from a plurality of uplink power control-related parameter configurations, the terminal apparatus 102 may calculate the uplink transmission power on the basis of the selected uplink power control-related parameter configuration. That is, the base station apparatus 101 may perform independent switching of the uplink transmission power control for the terminal apparatus 102 on the basis of the control information included in the DCI format.

In addition, a parameter set used for the A-SRS is uniquely selected from a plurality of parameter sets for the A-SRS on the basis of information indicated by the SRS request (SRS indicator) indicating a request to transmit the A-SRS included in the DCI format. Here, the uplink power control-related parameter configurations may be included in the parameter sets for the A-SRS associated with the SRS request. That is, a first SRS (A-SRS) parameter set may include the first uplink power control-related parameter configuration, and a second SRS (A-SRS) parameter set may include the second uplink power control-related parameter configuration. Similarly, a third SRS (A-SRS) parameter set may include the third uplink power control-related parameter configuration, and a fourth SRS (A-SRS) parameter set may include the fourth uplink power control-related parameter configuration.

Thus, a plurality of SRS (A-SRS) parameter sets and a plurality of uplink power control-related parameter configurations may be associated with each other, and the association may be made between four or more SRS (A-SRS) parameter sets and four or more uplink power control-related parameter configurations. It is to be noted that the SRS (A-SRS) parameter set includes the SRS cyclic shift. In addition, the SRS parameter set includes the transmission bandwidth of the SRS. In addition, the SRS parameter set includes the number of antenna ports for the SRS. The SRS parameter set includes a transmission comb, which is a frequency offset of the SRS. In addition, the SRS parameter set includes a hopping bandwidth.

The base station apparatus 101 can implicitly control switching of an uplink reception point for the terminal apparatus 102 by switching the uplink power control-related parameter configuration.

The uplink transmission power control can be dynamically performed for a terminal apparatus 102 that moves at high speed or a terminal apparatus 102 whose transmission and reception points frequently change, thereby making it likely to obtain appropriate throughput.

It is to be noted that the first uplink power control-related parameter configuration and the second uplink power control-related parameter configuration in this embodiment may each include a path loss reference resource. In addition, the path loss reference resource may be that described in the third embodiment. That is, the path loss reference resource may include information associated with an antenna port, or may include information associated with the third reference signal configuration described in the second embodiment. In addition, the association with an antenna port may refer to association with Antenna Port 0, that is, association with the cell-specific reference signals (CRSs), or may refer to association with Antenna Ports 15 to 22, that is, association with the channel state information reference signals (CSI-RSs). Furthermore, the first uplink power control-related parameter configuration and the second uplink power control-related parameter configuration in this embodiment may be those described in the third embodiment.

That is, α, which is the attenuation coefficient used for the fractional transmission power control in a cell (that is, the path loss compensation coefficient), may be used, or $P_{O\_NOMINAL\_PUSCH,c}$ or $P_{O\_UE\_PUSCH,c}$ (that is, the cell-specific or terminal-specific power control parameter relating to the nominal power of the PUSCH) may be used. Furthermore, the power offset or the filtering coefficient for the sounding reference signal may be used. $P_{O\_NOMINAL\_PUCCH,c}$ or $P_{O\_UE\_PUCCH,c}$ (that is, the cell-specific or terminal-specific power control parameter relating to the nominal power of the PUCCH) may be used.

Sixth Embodiment

Next, a sixth embodiment will be described. In the sixth embodiment, the base station apparatus 101 transmits an RRC signal including configuration information regarding a plurality of path loss measurement reference signals to the terminal apparatus 102 and transmits a DCI format (PDCCH) to the terminal apparatus 102. The terminal apparatus 102 simultaneously performs a plurality of operations of path loss measurement in accordance with the information included in the RRC signal, and if a detected DCI format is a first DCI format, the terminal apparatus 102 transmits an uplink signal with uplink transmission power calculated on the basis of first path loss measurement, and if a detected DCI format is a second DCI format, the terminal apparatus 102 transmits an uplink signal with uplink transmission power calculated on the basis of second path loss measurement.

Here, a case will be described in which the first DCI format and the second DCI format are different types of DCI format. In an example, if the first DCI format is an uplink grant, the path loss is calculated on the basis of a path loss reference resource included in uplink transmission power control configured to schedule the PUSCH, and the uplink transmission power is calculated from the path loss. In addition, if the second DCI format is a downlink assignment, the path loss is calculated on the basis of a path loss reference resource included in uplink transmission power control configured to perform the coordinated communication, and the uplink transmission power is calculated from the path loss. That is, by associating the types of DCI format and the path loss reference resources, the terminal apparatus 102 can perform path loss measurement suitable for the communication mode and appropriate uplink transmission power control.

It is to be noted that different measurement targets (path loss measurement reference signals) may be configured in path loss reference resources associated with various DCI formats. The measurement targets mentioned here may be the same as those described in first embodiment and the second embodiment. In addition, the path loss reference resources mentioned here may be the same as those described in the third embodiment. In addition, the path loss reference resources mentioned here may be associated with downlink antenna ports. In addition, the path loss reference resources mentioned here may be associated with downlink reference signals.

Furthermore, the first DCI format and the second DCI format might include an SRS request (SRS indicator) indicating a request to transmit the A-SRS. At this time, the transmission power of the A-SRS is calculated using a path loss calculated on the basis of the path loss reference resource associated with each DCI format. That is, if the DCI format including the SRS request is an uplink grant, the path loss is calculated on the basis of the path loss reference resource (first path loss reference resource) included in the uplink transmission power control configured to schedule the PUSCH, and the transmission power of the A-SRS is calculated from the path loss. On the other hand, if the DCI format including the SRS request is a downlink assignment, the path loss is calculated on the basis of the path loss reference resource (second path loss reference resource) included in uplink transmission power control configured to perform the coordinated communication, and the transmission power of the A-SRS is calculated from the path loss.

The base station apparatus 101 can perform dynamic scheduling according to appropriate path loss measurement by switching the path loss reference resource in accordance with the DCI format.

In addition, a path loss reference resource used for calculating the path loss for the P-SRS may be configured using an RRC signal, and the path loss reference resource for the A-SRS may be implicitly switched in accordance with the type of DCI format. That is, the path loss reference resource for the transmission power of the P-SRS may be transmitted to the terminal apparatus 102 in accordance with the information included in the RRC signal, and the path loss reference resource for the transmission power of the A-SRS may be determined on the basis of the type of DCI format. In addition, the path loss reference resource for the A-SRS may be determined on the basis of information indicating the path loss reference resource for the A-SRS included in the DCI format.

In addition, a path loss reference resource for at least one of the uplink physical channels, namely the PUSCH, the PUCCH, the P-SRS, and the A-SRS, may be independently configured.

In addition, the first DCI format and the second DCI format may be of the same type, or control information included in the DCI formats may be indicated by different pieces of information (different values). For example, when the control information is indicated by an index, the first DCI format and the second DCI format may be regarded as different DCI formats when different values are assigned to the indices.

When the first DCI format and the second DCI format include an SRS request, the path loss reference resource for the A-SRS may be determined in accordance with the type of DCI format including the SRS request.

When the terminal apparatus 102 is connected to the base station apparatus 101, the uplink transmission power is calculated using the uplink power control-related parameter configuration in which uplink physical channels (uplink signals) are configured for the base station apparatus 101 (first uplink power control-related parameter configuration). On the other hand, when the terminal apparatus 102 is connected to the RRH 103, the uplink transmission power is calculated using the uplink power control-related parameter configuration in which uplink physical channels are configured for the RRH 103 (second uplink power control-related parameter configuration). Information regarding uplink power control-related parameter reconfiguration is transmitted using an RRC signal.

In addition, the DCI format may include information (path loss reference resource indication information) for indicating the path loss reference resource with which the path loss is to be calculated. That is, when the indication information is configured by a first value and a second value (a plurality of values) and if the indication information is the first value (for example, an index is "0"), the terminal apparatus 102 calculates the path loss using the first path loss reference resource, and if the indication information is the second value (for example, the index is "1"), the terminal apparatus 102 calculates the path loss using the second path loss reference resource. The indication information may configure only the path loss reference resource for the A-SRS. Alternatively, the indication information may configure the path loss reference resources for all the uplink physical channels. That is, the indication information can specify at least one path loss reference resource for an uplink physical channel.

The indication information may be associated with the control information included in the DCI format. For example, the value of the cyclic shift index of the UL DMRS and the information indicating the switching may be associated with each other.

In addition, when one of pieces of the control information included in the DCI format is a certain value, the indication information may be represented by a code point with which the terminal apparatus 102 recognizes that the indication information is included in the DCI format. For example, when certain information (value) is configured in first control information included in a DCI format transmitted from the base station apparatus 101 or the RRH 103, the terminal apparatus 102 can reread the information included in the DCI format. At this time, in the communication system configured by the terminal apparatus 102 and the base station apparatus 101 (or the RRH 103), the certain information configured in the first control information can be defined as a certain code point.

Here, a certain code point when the first control information is configured by the virtual resource block localized/distributed allocation identification information and the resource block assignment information is a code point in which, when the virtual resource block localized/distributed allocation identification information is indicated by 1 bit and the resource block assignment information is indicated by 5 bits, the 1 bit indicates "0" and all the 5 bits indicate "1". Only when the terminal apparatus 102 has detected this code point, the terminal apparatus 102 can recognize that the indication information is included in the DCI format. That is, the certain code point need not be configured by certain information for one of the pieces of the control information. That is, only when a plurality of pieces of control information are certain information, the terminal apparatus 102 detects the certain code point and recognizes that the indication information is included in the DCI format. For example, when the virtual resource block localized/distributed allocation identification information and the resource block arrangement information are each indicated by certain information, the terminal apparatus 102 recognizes that the indication information is included in the DCI format.

In other cases, the terminal apparatus 102 assigns resources on the basis of the virtual resource block localized/distributed allocation identification information and the resource block arrangement information. For example, control information indicating a code point may be configured by certain information for the information regarding the cyclic shift of the UL DMRS (cyclic shift for DM RS and OCC index) and the PUSCH frequency hopping permission information. Alternatively, when the modulation and coding scheme (MCS) information, the HARQ process number information, and the NDI (new data indicator) information included in the DCI format are each certain information, the terminal apparatus 102 detects the certain code point and recognizes that the indication information is included in the DCI format. When the code point has been detected, the terminal apparatus 102 can recognize part or all of pieces of control information that are not used for the code point of the DCI format as the information indicating the switching.

For example, control information recognized as the information indicating the switching may be the virtual resource block localized/distributed allocation identification information. Alternatively, the control information recognized as the information indicating the switching may be the resource block assignment information. Alternatively, the control information recognized as the information indicating the switching may be the SRS request. Alternatively, the control information recognized as the information indicating the switching may be the CSI request. Alternatively, the control information recognized as the information indicating the switching may be the information regarding the cyclic shift of the UL DMRS. The control information recognized as the information indicating the switching may be indicated by using some of the above-described pieces of control information.

The base station apparatus 101 can implicitly control switching of an uplink reception point for the terminal apparatus 102 by switching the path loss reference resource for the terminal apparatus 102.

In addition, an SRS request (SRS indicator) included in DCI Format 4 is represented by a plurality of indices (values, or numbers). For example, DCI Format 4 in which "SRS Request Index 1" associated with a first A-SRS parameter set is configured may be determined as a first DCI format, and DCI Format 4 in which "SRS Request Index 2" associated with a second A-SRS parameter set is configured may be determined as a second DCI format. That is, the A-SRS may be associated with an SRS request index and a path loss reference resource. In addition, a path loss reference resource for the A-SRS may be configured one of A-SRS parameters included in an A-SRS parameter set.

In addition, the base station apparatus 101 can perform appropriate switching (reconfiguration) of a reception point and appropriate resource assignment by calculating the transmission power of the A-SRS on the basis of a path loss for the A-SRS calculated from a path loss reference resource associated with an uplink reception point for the terminal apparatus 102 and performing channel measurement for the reception point on the basis of the A-SRS. That is, the base station apparatus 101 can dynamically perform appropriate uplink scheduling. In addition, in other words, if the SRS request index is a first value (for example, SRS Request Index 1), the terminal apparatus 102 calculates the path loss for the A-SRS on the basis of the first path loss reference, and if the SRS request index is a second value (for example, SRS Request Index 2), the terminal apparatus 102 calculates the path loss for the A-SRS on the basis of the second path loss reference resource. At least one of a plurality of indices included in an SRS request may be associated with a path loss reference resource configured for backhaul for reconnecting to the base station apparatus 101 or the RRH 103.

In addition, at least one of the plurality of indices included in the SRS request may be associated with a path loss reference resource configured for a reference point (the base station apparatus 101 or the RRH 103) to which the terminal apparatus 102 is connected. An SRS request index and a path loss reference resource may be associated with each other. In the communication system configured by the base station apparatus 101, the terminal apparatus 102, and the RRH 103, a path loss reference resource for backhaul may be configured in advance.

In addition, a path loss reference resource used for calculating the path loss for the P-SRS may be switched using an RRC signal, and the path loss reference resource for the A-SRS may be switched in accordance with the information indicating the switching of the path loss reference resource included in the DCI format. That is, the path loss reference resource for the transmission power of the P-SRS is transmitted in accordance with the information included in the RRC signal, and the path loss reference resource for the transmission power of the A-SRS is transmitted in accordance with the information included in the DCI format.

In addition, path loss reference resources for uplink signals transmitted to a plurality of uplink reception points may be independently configured. That is, the uplink reception points (reference points) and the path loss reference resources may be associated with each other.

In addition, the DCI format may include control information associated with the first path loss reference resource and the second path loss reference resource. For example, if first path loss control is configured for the control information, the terminal apparatus 102 calculates the path loss on the basis of the first path loss reference resource. In addition, if second path loss control is configured for the control information, the terminal apparatus 102 calculates the path loss on the basis of the second path loss reference resource. The terminal apparatus 102 can calculate the path loss while switching between the first path loss reference resource and the second path loss reference resource on the basis of the control information, calculate the transmission power of an uplink physical channel on the basis of a result of the calculation of the path loss, and transmit the uplink physical channel with the transmission power. In addition, if third path loss control is configured for the control information, the terminal apparatus 102 calculates the path loss on the basis of a third path loss reference resource. In addition, if fourth path loss control is configured for the control information, the terminal apparatus 102 calculates the path loss on the basis of a fourth path loss reference resource.

In addition, when the path loss reference resource for the A-SRS has been switched (reconfigured) in accordance with the DCI format, the path loss reference resource for the P-SRS may also be switched (reconfigured).

Seventh Embodiment

Next, a seventh embodiment will be described. In the seventh embodiment, the base station apparatus 101 configures uplink physical channels, configures a path loss reference resource for each of the uplink physical channel, and transmits an RRC signal including configuration information to the terminal apparatus 102. The terminal apparatus 102 configures the uplink physical channels and the uplink power control-related parameters for each of the uplink physical channels in accordance with the information (configuration information and control information) included in the RRC signal, and then sets the transmission power of various uplink physical channels on the basis of the uplink power control-related parameters and transmits the uplink physical channels with the transmission power.

In addition, when the path loss reference resources for various uplink physical channels are transmitted through an RRC signal, a path loss reference resource for calculating the transmission power of the PUSCH can be configured in a terminal-specific PUSCH configuration (PUSCH-ConfigDedicated). A path loss reference resource for calculating the transmission power of the PUCCH can be configured in a terminal-specific PUCCH configuration (PUCCH-ConfigDedicated). A path loss reference resource for calculating the transmission power of the P-SRS can be configured in a terminal-specific sounding reference signal UL configuration (SoundingRS-UL-ConfigDedicated). A path loss reference resource for calculating the transmission power of the A-SRS can be configured in an SRS configuration aperiodic (SRS-ConfigAp). A path loss reference resource for calculating the transmission power of the PRACH can be configured in PRACH configuration information (PRACH-ConfigInfo).

These pieces of configuration information are transmitted from the base station apparatus 101 to the terminal apparatus 102 using an RRC signal. That is, the path loss reference resources can be set in terminal-specific parameter configurations of various uplink physical channels. That is, the base station apparatus 101 configures a path loss reference resource for each uplink physical channel assigned to each terminal apparatus 102 for each terminal apparatus 102, and transmits configuration information while including the configuration information in an RRC signal. It is to be noted that the path loss reference resource may include information associated with an antenna port, or may include information associated with the third reference signal configuration described in the second embodiment. In addition, the association with an antenna port may refer to association with Antenna Port 0, that is, association with the cell-specific reference signals (CRSs), or may refer to association with Antenna Ports 15 to 22, that is, association with the channel state information reference signals (CSI-RSs).

In addition, the path loss reference resources for various uplink physical channels may be configured in such a way as to be included in cell-specific parameter configurations.

Alternatively, the path loss reference resources for various uplink physical channels (PUSCH, PUCCH, SRSs (P-SRS and A-SRS), and PRACH) may be configured in the uplink power control-related terminal-specific parameter configuration (UplinkPowerControlDedicated). The path loss reference resources for various uplink physical channels may be configured in the uplink power control-related cell-specific parameter configuration (UplinkPowerControlCommon), instead. It is to be noted that the above-described various uplink signals and various uplink physical channels are synonymous.

When the base station apparatus 101 (or the RRH 103) that receives an uplink physical channel is different depending on the type of uplink physical channel, one of a plurality of base station apparatuses located closer to the terminal apparatus 102 (path loss is smaller) is referred to as Base Station Apparatus A, and one of the plurality of base station apparatuses located farther from the terminal apparatus 102 (path loss is larger) is referred to as Base Station Apparatus B. The PUSCH is transmitted to Base Station Apparatus A, and the SRS is transmitted to Base Station Apparatus B. Because common path loss reference resources are transmitted from different base station apparatuses, the common path loss reference resources are combined and received by the terminal apparatus 102. If the path losses for both the uplink physical channels are calculated from the same path loss reference resource and the transmission power is calculated, accurate path losses between Base Station Apparatus A and the terminal apparatus 102 and between Base Station Apparatus B and the terminal apparatus 102 cannot be obtained since the path losses are calculated from the received power of the combined path loss reference resources.

As a result, the PUSCH is transmitted to Base Station Apparatus A with transmission power higher than appropriate transmission power, and the SRS is transmitted to Base Station Apparatus B with power lower than appropriate power. In Base Station Apparatus A, the PUSCH transmitted from the terminal apparatus 102 interferes with another terminal apparatus, and in Base Station Apparatus B, appropriate channel measurement cannot be performed using the SRS transmitted from the terminal apparatus 102, thereby making it impossible to perform appropriate scheduling. In particular, since the SRS is a channel necessary to perform the channel measurement between the base station apparatus 101 and the terminal apparatus 102 and the uplink scheduling is performed on the basis of a result of the channel measurement, a base station apparatus 101 closest to the terminal apparatus 102 cannot be selected when appropriate channel measurement is not performed between Base Station Apparatus A and the terminal apparatus 102 and between Base Station Apparatus B and the terminal apparatus 102, thereby making it difficult to obtain appropriate throughput with appropriate transmission power. It is to be noted that the distance between the terminal apparatus 102 and the base station apparatus 101 (whether the base station apparatus 101 is located close to the terminal apparatus 102 or far from the terminal apparatus 102) is estimated from the path loss. That is, the base station apparatus 101 (or the RRH 103) determines that the base station apparatus 101 is located close to the terminal apparatus 102 when the path loss is small, and determines that the base station apparatus 101 is located far from the terminal apparatus 102 when the path loss is large. It is to be noted that the magnitude of the path loss may be determined on the basis of a threshold. The base station apparatus 101 performs control such that the terminal apparatus 102 is connected to a reception point closer to the terminal apparatus 102.

The terminal apparatus 102 that can calculate path losses from a plurality of path loss reference resources may use results of the calculation of the path losses for the transmission power control of various uplink physical channels. That is, the terminal apparatus 102 may calculate the transmission power of various uplink physical channels on the basis of the path losses based on different path loss reference resources. For example, a first path loss reference resource may be configured for the PUSCH, a second path loss reference resource may be configured for the PUCCH, a third path loss reference resource may be configured for the PRACH, a fourth path loss reference resource may be configured for the P-SRS, and a fifth path loss reference resource may be configured for the A-SRS.

It is to be noted that these path loss resources may be those described in the third embodiment. Alternatively, these path loss reference resources may be downlink reference signals associated with antenna ports. Alternatively, these path loss reference resources may be specified by downlink antenna ports. Here, the configuration information regarding these path loss reference resources may be transmitted to the terminal apparatus 102 using an RRC signal. In addition, the configuration information regarding these path loss reference resources may be included in the DCI format and transmitted to the terminal apparatus 102. Here, the configuration information regarding these path loss reference resources may be included in a cell-specific or terminal-specific configuration of each uplink physical channel. Alternatively, the configuration information regarding these path loss reference resources may be included in the uplink power control-related parameter configuration included in the configuration of each uplink physical channel. In addition, the path loss reference resources configured for various uplink physical channels may be independently configured, and these path loss reference resources need not necessarily be configured by path loss reference resources of the same type. That is, the information associated with an antenna port for these path loss reference resources need not be the same.

In addition, a plurality of path loss reference resources may be configured for part of the uplink physical channels. For example, a parameter set corresponding to values of the SRS request may be configured for the A-SRS, and a path loss reference resource may be configured for each of the values. For example, as the path loss reference resources for the A-SRS, first to fourth path loss reference resources may be configured. In addition, a fifth path loss reference resource may be configured for the P-SRS.

The path losses for the PUSCH, the PUCCH, the PRACH, and the P-SRS may be calculated on the basis of the same path loss reference resource, and the path loss for the A-SRS may be calculated on the basis of a different path loss reference resource. That is, a path loss reference resource may be independently configured for part of the uplink physical channels. In addition, a path loss reference resource for at least one of the plurality of uplink physical channels may be transmitted using an RRC signal. In addition, a path loss reference resource for at least one of the plurality of uplink physical channels may be transmitted using a DCI format.

Path loss reference resources of the same type transmitted by a plurality of base station apparatuses 101 and RRHs 103 (a plurality of reference points) are combined by the terminal apparatus 102. If the path losses are calculated on the basis of the combined path loss reference resources, a path loss at a reference point farther from the terminal apparatus 102 cannot be reflected. If the uplink transmission power is calculated using that path loss and an uplink signal is transmitted, the uplink signal might not reach the farther reference point. In addition, if the path losses are calculated on the basis of the received power of the combined path loss reference resources and the uplink transmission power is calculated, an uplink signal does not reach the base station apparatus 101 or the RRH 103 when the uplink transmission power of the uplink signal transmitted from the terminal apparatus 102 is relatively low. On the other hand, when the uplink transmission power is relatively high, the uplink signal interferes with another terminal apparatus.

In addition, combined downlink signals transmitted from the base station apparatus 101 and the RRH 103 (a plurality of downlink transmission points) cannot be demultiplexed by the terminal apparatus 102, and therefore path losses based on the downlink signals transmitted from the base station apparatus 101 and the RRH 103 cannot be accurately measured. The base station apparatus 101 needs to configure a path loss reference resource for each downlink transmission point in order to measure the path losses of downlink signals transmitted from a plurality of downlink transmission points as necessary.

When the terminal apparatus 102 transmits PRACHs to the base station apparatus 101 and the RRH 103 (or a plurality of reference points), path loss reference resources used for calculating the transmission power of the PRACHs transmitted to the base station apparatus 101 and the RRH 103 may be different from each other. That is, the transmission power control of the PRACHs for the base station apparatus 101 and the RRH 103 may be performed on the basis of path loss reference resources transmitted from the base station apparatus 101 and the RRH 103, respectively. In addition, in order to perform random access for the base station apparatus 101 and the RRH 103, the base station apparatus 101 can transmit information for instructing the terminal apparatus 102 to switch the path loss reference resource for the PRACH to the terminal apparatus 102 while including the information in an RRC signal. The terminal apparatus 102 can configure (reconfigure) the path loss reference resource for the PRACH using the switching information included in the RRC signal.

Figure 34:
FIG. 34 illustrates an example of an uplink power control-related parameter configured in each uplink physical channel according to a seventh embodiment of the present invention.
Figure 35:
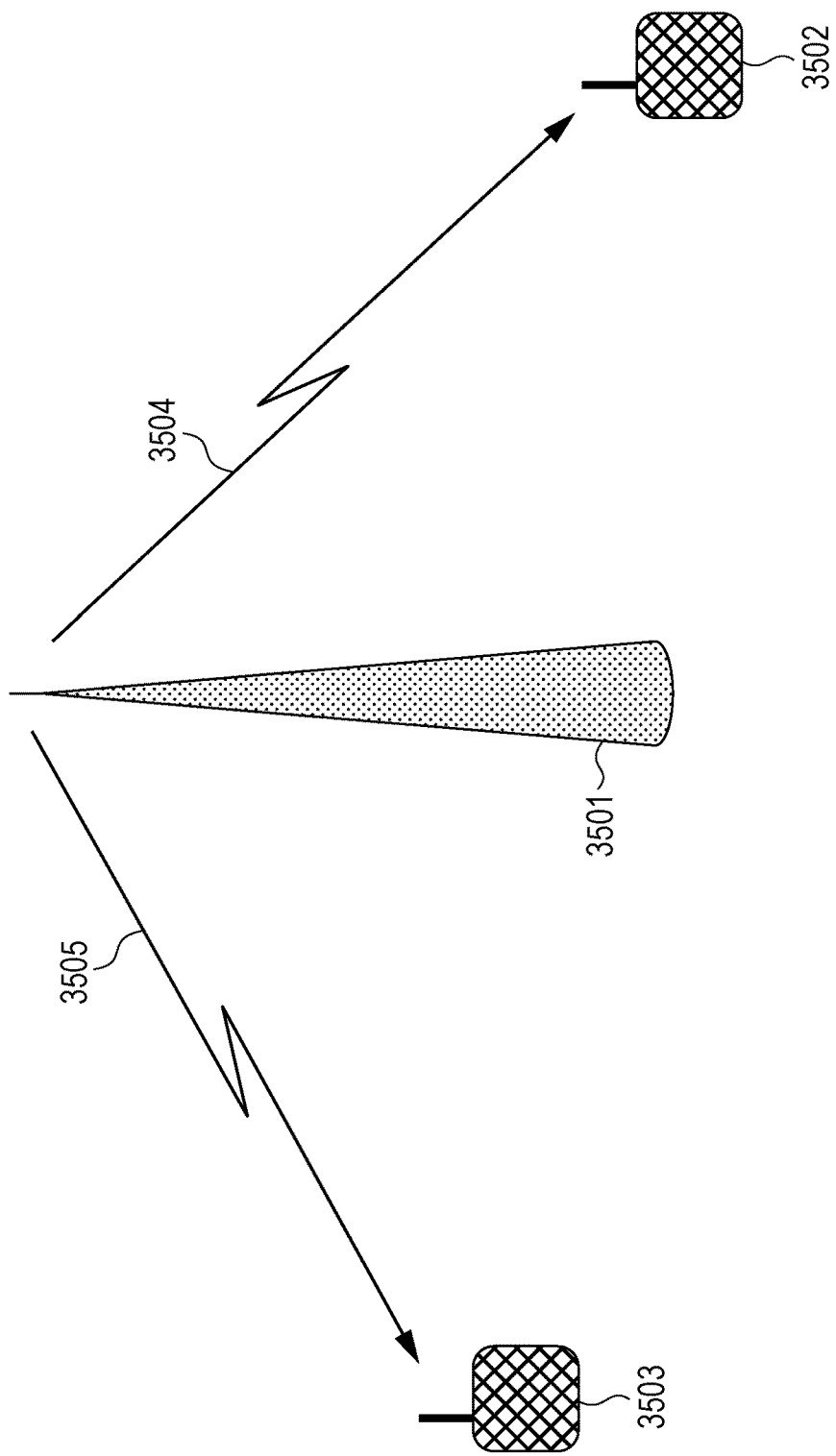
FIG. 35 is a diagram illustrating an example in which a multi-user MIMO scheme is implemented.
Figure 36:
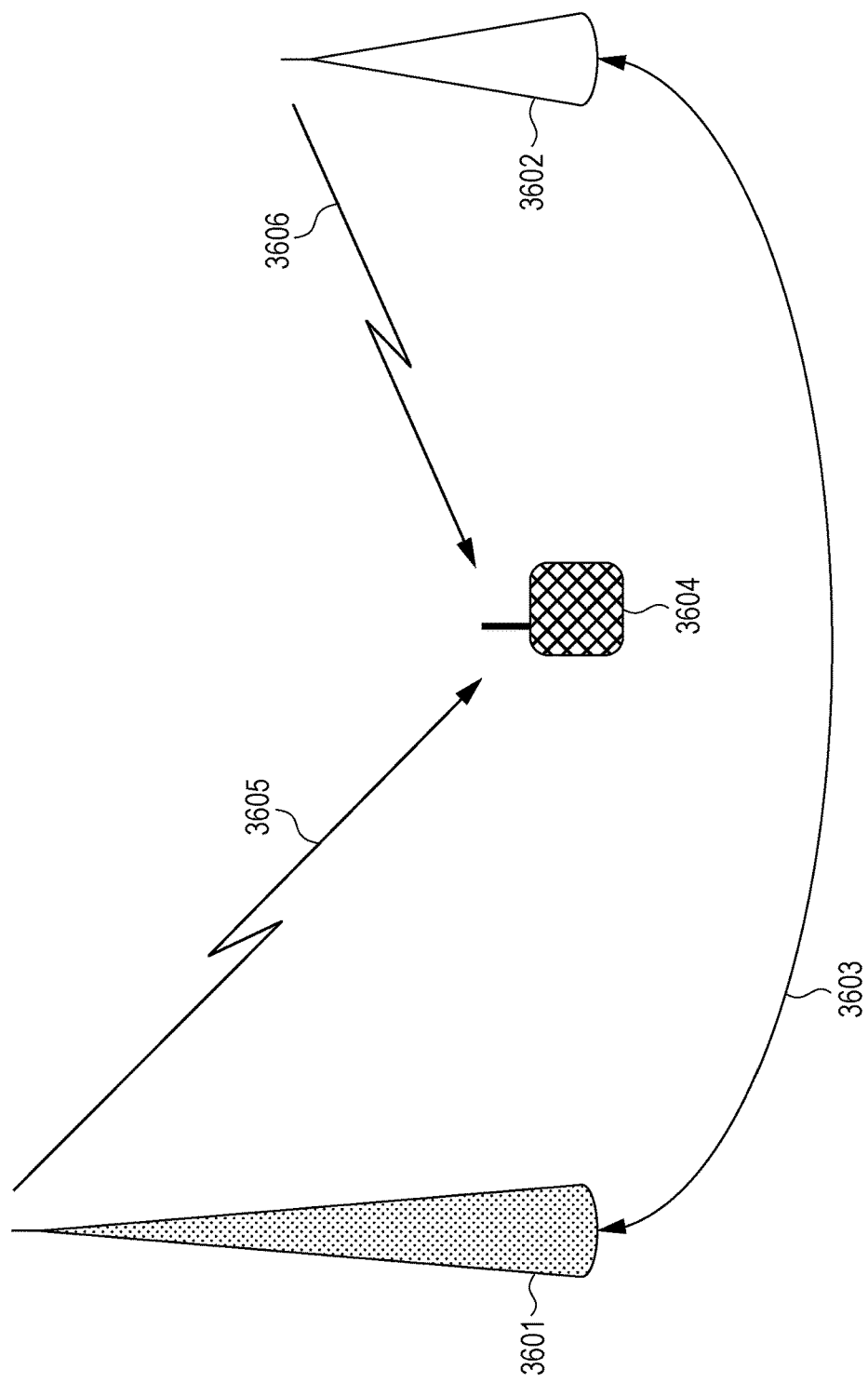
FIG. 36 is a diagram illustrating an example in which a downlink CoMP scheme is implemented.
Figure 37:
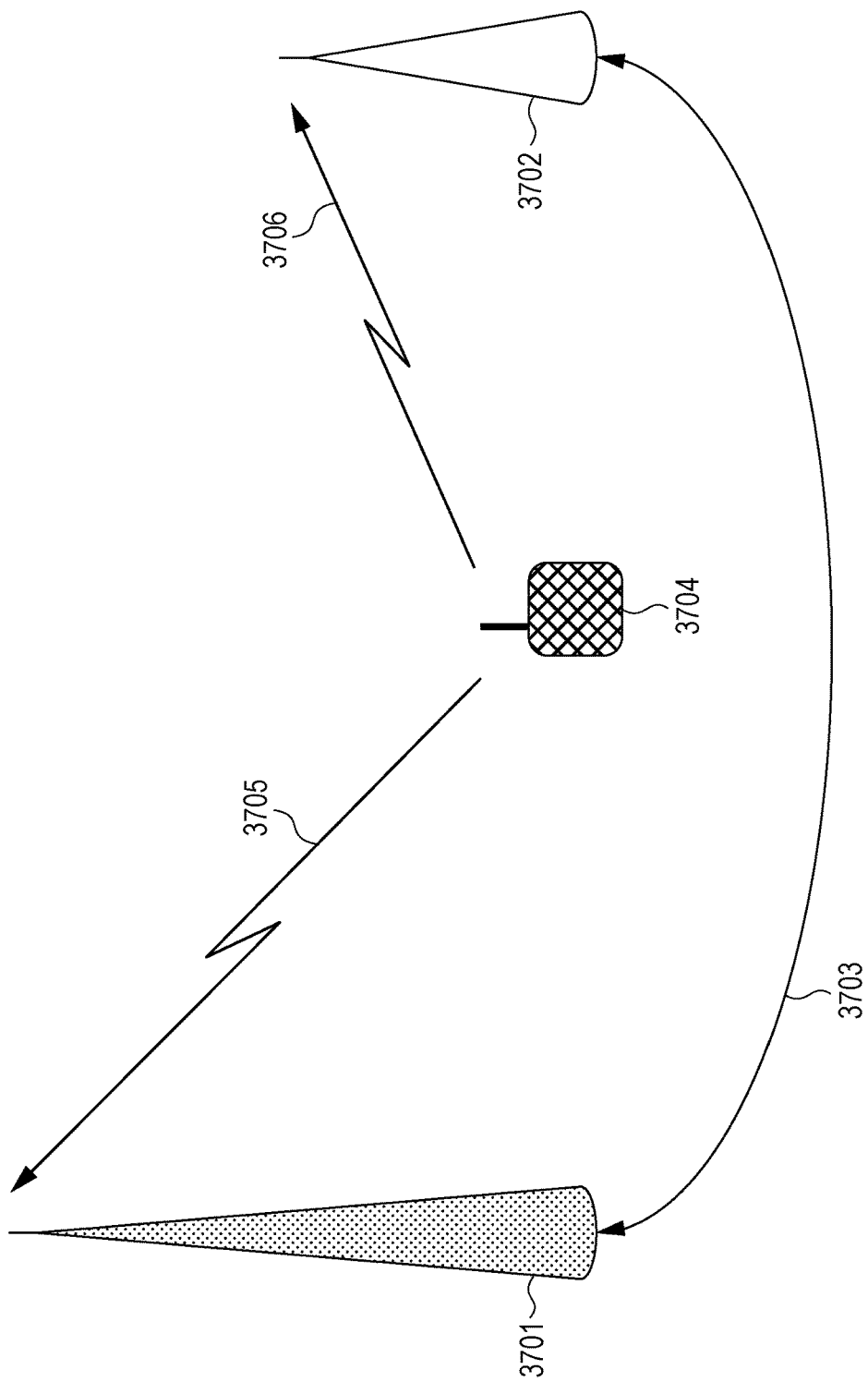
FIG. 37 is a diagram illustrating an example in which an uplink CoMP scheme is implemented.

In addition, in the terminal apparatus 102, uplink power control-related parameters or parameter sets in which different values are set for various uplink physical channels can be configured. FIG. 34 illustrates an example of an uplink power control-related parameter configured for each uplink physical channel. In FIG. 34, an uplink power control-related parameter configuration (UplinkPowerControl) is configured for each of terminal-specific configurations for the PUCCH, the PUSCH, the P-SRS, and the A-SRS (terminal-specific PUCCH configuration-v11x0 (PUCCH-ConfigDedicated-v11x0)), terminal-specific PUSCH configuration-v11x0 (PUSCH-ConfigDedicated-v11x0), terminal-specific sounding reference signal UL configuration-v11x0 (SoundingRS-UL-ConfigDedicated-v11x0), and aperiodic SRS configuration-r11 (SRS-ConfigAp-r11)). In addition, with respect to the PRACH and a random access channel (RACH), a power ramping step (powerRampingStep) and preamble initial received target power (preambleInitialReceivedTargetPower) are configured. The uplink power control-related parameter configuration may be that illustrated in FIG. 22, instead.

Path loss reference resources may be configured for these configurations. It is to be noted that the path loss reference resource may include information associated with an antenna port, or may include information associated with the third reference signal configuration described in the second embodiment. In addition, the association with an antenna port may refer to association with Antenna Port 0, that is, association with the cell-specific reference signals (CRSs), or may refer to association with Antenna Ports 15 to 22, that is, association with the channel state information reference signals (CSI-RSs).

For example, if the path loss is not taken into consideration, various power control parameter sets (first power control parameter sets) configured in such a way as to obtain relatively high transmission power and various power control parameter sets (second power control parameter sets) configured in such a way as to obtain relatively low transmission power are configured for the terminal apparatus 102. The base station apparatus 101 includes information indicating switching between the first power control parameter sets and second power control parameter sets in an RRC signal or a DCI format (PDCCH) and transmits the information to the terminal apparatus 102. The terminal apparatus 102 calculates the uplink transmission power for each of various uplink physical channels on the basis of the information, and transmits the uplink physical channels (uplink signals). It is to be noted that the values of various parameters included in these power control parameter sets are set by the base station apparatus 101 in consideration of results of measurement reporting, results of channel measurement using the SRS, results of measurement included in power headroom reporting (PHR) for transmitting a power capacity value of the terminal apparatus 102, and the like.

For example, information indicating switching between the uplink power control-related parameter sets may be configured in each uplink physical channel. The information indicating the switching may be transmitted to each terminal apparatus 102 using an RRC signal. Alternatively, the information indicating the switching may be included in a DCI format.

In addition, the DCI format may include information (information bit) indicating the switching between the two uplink power control-related parameter configurations. For example, if the information indicating the switching is a first value (for example, "0"), the terminal apparatus 102 calculates the uplink transmission power on the basis of the first uplink control-related parameter configuration, and if the information indicating the switching is a second value (for example, "1"), the terminal apparatus 102 sets the uplink transmission power on the basis of the second uplink control-related parameter configuration.

The information indicating the switching may be associated with the control information included in the DCI format. For example, a value of the cyclic shift index of the UL DMRS and the information indicating the switching may be associated with each other.

In addition, when one of pieces of the control information included in the DCI format is a certain value, the information indicating the switching may be represented by a code point with which the terminal apparatus 102 recognizes that the information indicating the switching is included in the DCI format. For example, when certain information (value) is configured in first control information included in a DCI format transmitted from the base station apparatus 101 or the RRH 103, the terminal apparatus 102 can reread the information included in the DCI format. At this time, in the communication system configured by the terminal apparatus 102 and the base station apparatus 101 (or the RRH 103), the certain information configured in the first control information can be defined as a certain code point.

Here, a certain code point when the first control information is configured by virtual resource block localized/distributed allocation identification information and resource block assignment information is a code point in which, when the virtual resource block localized/distributed allocation identification information is indicated by 1 bit and the resource block assignment information is indicated by 5 bits, the 1 bit indicates "0" and all the 5 bits indicate "1". Only when the terminal apparatus 102 has detected this code point, the terminal apparatus 102 can recognize that the information indicating the switching is included in the DCI format. That is, the certain code point need not be configured by certain information in one of the pieces of the control information. That is, only when a plurality of pieces of control information are certain information, the terminal apparatus 102 detects the certain code point and recognizes that the information indicating the switching is included in the DCI format.

For example, when the virtual resource block localized/distributed allocation identification information and the resource block arrangement information are each indicated by certain information, the terminal apparatus 102 recognizes that the indication information is included in the DCI format. In other cases, the terminal apparatus 102 assigns resources on the basis of the virtual resource block localized/distributed allocation identification information and the resource block arrangement information. For example, control information configuring a code point may be configured by certain information for information regarding the cyclic shift of the UL DMRS (cyclic shift for DM RS and OCC index) and PUSCH frequency hopping permission information. Alternatively, when modulation and coding scheme (MCS) information, HARQ process number information, and NDI (new data indicator) information included in the DCI format are each certain information, the terminal apparatus 102 detects the certain code point and recognizes that the indication information is included in the DCI format.

When the code point has been detected, the terminal apparatus 102 can recognize part or all of pieces of control information that are not used for the code point of the DCI format as the information indicating the switching. For example, control information recognized as the information indicating the switching may be the virtual resource block localized/distributed allocation identification information. Alternatively, the control information recognized as the information indicating the switching may be the resource block assignment information. Alternatively, the control information recognized as the information indicating the switching may be the SRS request. Alternatively, the control information recognized as the information indicating the switching may be the CSI request. Alternatively, the control information recognized as the information indicating the switching may be the information regarding the cyclic shift of the UL DMRS. The control information recognized as the information indicating the switching may be indicated by using some of the above-described pieces of control information.

For example, a plurality of $P_{O\_NOMINAL\_PUSCH}$'s and $P_{O\_UE\_PUSCH}$'s are configured for the PUSCH. A plurality of $P_{O\_NOMINAL\_PUCCH}$'s and $P_{O\_UE\_PUCCH}$'s are configured for the PUCCH. Alternatively, a plurality of values may be set for each of various power control parameters. Alternatively, a plurality of values may be set for each parameter set. In addition, a plurality of SRS power offsets may be configured for the SRS. A plurality of values of the initial received power of the random access preamble and a plurality of power ramping steps may be set for the PRACH. The terminal apparatus 102 sets the transmission power of the uplink physical channels on the basis of these parameters.

One uplink power control-related parameter is configured for each of various uplink physical channels. The uplink power control-related parameter may include at least one power control parameter among the above-described uplink power control-related parameter configurations configured in a cell-specific or terminal-specific manner. For example, $P_{O\_NOMINAL\_PUSCH}$ or $P_{O\_UE\_PUSCH}$ may be may be configured. Alternatively, $P_{O\_NOMINAL\_PUCCH}$ or $P_{O\_UE\_PUCCH}$ may be may be configured. Alternatively, the SRS power offset may be configured. Alternatively, the initial received power of the random access preamble or the power ramping step may be configured. Alternatively, the filtering coefficient or the path loss compensation coefficient α may be configured.

In addition, the base station apparatus 101 can set the transmission power of a downlink reference signal transmitted to each terminal apparatus 102. The base station apparatus 101 may set second reference signal power (referenceSignalPower2) to the terminal-specific PDSCH configuration (PDSCH-ConfigDedicated) and transmit configuration information to the terminal apparatus 102. For example, the second reference signal power may be set as the transmission power of the DL DMRS or the CSI-RS. In addition, not only the second reference signal power but also reference signal power relating to a downlink antenna port may be set. In addition, reference signal power may be set for each path loss reference resource. In addition, information associated with an antenna port and reference signal power may be associated with each other.

In addition, the base station apparatus 101 may set the transmission power of various downlink reference signals or a downlink reference signal associated with a downlink antenna port for each terminal apparatus 102.

In addition, the base station apparatus 101 may add a path loss reference resource to the cell-specific parameter configuration of each uplink physical channel.

In addition, the base station apparatus 101 may add a path loss reference resource to the terminal-specific parameter configuration of each uplink physical channel.

A plurality of path loss reference resources and a plurality of uplink power control-related parameter configurations may be associated with each other. For example, when a path loss reference resource for the PUSCH has been configured for CRS Antenna Port 0, the terminal apparatus 102 may calculate the transmission power of the PUSCH on the basis of the first uplink power control-related parameter configuration. In addition, when a path loss reference resource for the PUSCH has been configured for CSI-RS Antenna Port 15, the terminal apparatus 102 may calculate the transmission power of the PUSCH on the basis of the second uplink power control-related parameter configuration.

In addition, with respect to part of the uplink physical channels, a plurality of path loss reference resources may be configured. For example, the first path loss reference resource and the second path loss reference resource include information associated with different antenna ports. In addition, different downlink reference signals are configured for the first path loss reference resource and the second path loss reference resource. In an example, the first path loss reference resource may be a CRS, and the second path loss reference resource may be a CSI-RS. In addition, in another example, the first path loss reference resource may be a resource configured for Antenna Port 15, and the second path loss reference resource may be a resource configured for Antenna Port 22. The first path loss reference resource and the second path loss reference resource need to be part of information associated with antenna ports.

An uplink power control-related parameter configuration may be configured for each of various uplink physical channels, and, for example, the first uplink power control-related parameter configuration may be configured for the PUSCH, the second uplink power control-related parameter configuration may be configured for the PUCCH, the third uplink power control-related parameter configuration may be configured for the PRACH, the fourth uplink power control-related parameter configuration may be configured for the P-SRS, and a fifth uplink power control-related parameter configuration may be configured for the A-SRS. Power control parameters configured for the first to fifth uplink power control-related parameter configurations need not necessarily match. For example, the first to third uplink power control-related parameter configurations may include only terminal-specific configurations. In addition, the fourth and fifth uplink power control-related parameter configurations may include cell-specific and terminal-specific configurations. In addition, the first to fifth uplink power control-related parameter configurations may each include cell-specific and terminal-specific configurations, but the values of various power control parameters need not necessarily match. That is, the same values need not be set for various power control parameters. That is, power control-related parameters for which different values have been set may be configured as the first power control-related parameter configuration and the second power control-related parameter configuration.

In addition, a single uplink power control-related parameter configuration may be configured for various uplink physical channels. That is, the same power control parameter set may be configured for various uplink physical channels, but a value included in the power control parameter is determined for each uplink physical channel.

In addition, a plurality of uplink power control-related parameter configurations may be configured for at least part of the uplink physical channels. For example, SRS parameter sets associated with an SRS request (SRS indicator) indicating a request to transmit the A-SRS may each include an uplink power control-related parameter configuration. That is, when four SRS parameter sets have been configured, four uplink power control-related parameter configurations are configured. In addition, a plurality of uplink power control-related parameter configurations may be configured for the PRACH. In addition, a plurality of uplink power control-related parameter configurations may be configured for the PUSCH.

In addition, when the first uplink power control-related parameter and the second uplink power control-related parameter (or power control parameter sets) have been configured for at least part of the uplink physical channels, the first uplink power control-related parameter and the second uplink power control-related parameter are configured as different parameters. In addition, different values are set to the first uplink power control-related parameter and the second uplink power control-related parameter. In addition, the same parameters need not necessarily be configured as various parameters included in the first uplink power control-related parameter set and the second uplink power control related parameter. In an example, various parameters included in the first uplink power control-related parameter set may be only the SRS power offset, and various parameters included in the second uplink power control-related parameter set may be the SRS power offset and the nominal PUSCH power.

In addition, in another example, various parameters included in the first uplink power control-related parameter set may be various parameters included in the uplink power control-related cell-specific parameter configuration, and various parameters included in the second uplink power control-related parameter set may be various parameters included in the uplink power control-related terminal-specific parameter configuration. In addition, in another example, various parameters included in the uplink power control-related cell-specific and terminal-specific parameter configurations may be configured as various parameters included in the first uplink power control-related parameter set and the second uplink power control-related parameter set. That is, the uplink power control-related parameter sets need to include at least one of the parameters illustrated in FIG. 22. In addition, the uplink power control-related parameter sets may include only path loss reference resources.

When an uplink power control-related parameter configuration or a path loss reference resource has been configured for each of various uplink physical channels, the terminal apparatus 102 can calculate the transmission power of each uplink physical channel on the basis of the configuration. The P-SRS or the A-SRS may be used in channel measurement for backhaul or preliminary investigation for switching a reference point. The base station apparatus 101 can control the terminal apparatus 102 on the basis of a result of channel measurement using the SRS such that the terminal apparatus 102 always communicates with an appropriate reference point.

The base station apparatus 101 can appropriately perform the uplink transmission power control for various uplink physical channels for each reference point (uplink reception point) by configuring the uplink power control-related parameter configuration for each uplink physical channel. For example, when the terminal apparatus 102 can communicate with a reference point with which the path loss is small, transmission power that can be assigned to the PUSCH and the PUCCH becomes high. Therefore, because the uplink communication can be performed while applying a modulation method of a large modulation factor, such as 16QAM or 64QAM, throughput improves.

It is to be noted that although resource elements and resource blocks are used as units of mapping of information data signals, control information signals, PDSCHs, PDCCHs, and reference signals and subframes and radio frames are used as units of transmission in the time domain in each of the above-described embodiments, the present invention is not limited by these. The same effects can be produced even if regions configured by arbitrary frequency and time and time units are used instead of these. It is to be noted that although a case in which demodulation is performed using an RS subjected to the precoding process has been described and a port equivalent to a MIMO layer has been used for describing a port corresponding to the RS subjected to the precoding in each of the above-described embodiments, the present invention is not limited by this. The same effects can also be produced by applying the present invention to ports corresponding to different reference signals. For example, an unprecoded (nonprecoded) RS may be used instead of a precoded RS, and, as a port, a port equivalent to an output end after the precoding process or a port equivalent to a physical antenna (or a combination between physical antennas) may be used.

It is to be noted that, in each of the above-described embodiments, the uplink transmission power control refers to transmission power control of the uplink physical channels (PUSCH, PUCCH, PRACH, and SRS), and the transmission power control includes switching or (re)configuration of various parameters used for calculating the transmission power of various uplink physical channels.

It is to be noted that although downlink/uplink coordinated communication including the base station apparatus 101, the terminal apparatus 102, and the RRH 103 has been described in each of the above-described embodiments, the present invention may be applied to coordinated communication including two or more base station apparatuses 101 and a terminal apparatus 102, coordinated communication including two or more base station apparatuses 101, an RRH 103, and a terminal apparatus 102, coordinated communication including two or more base station apparatuses 101 or RRHs 103 and a terminal apparatus 102, coordinated communication including two or more base station apparatuses 101, two or more RRHs 103, and a terminal apparatus 102, and coordinated communication including two or more transmission points/reception points. In addition, the present invention may be applied to coordinated communication including base station apparatuses 101 (a plurality of base station apparatuses) having different cell IDs. In addition, the present invention may be applied to coordinated communication including a base station apparatus 101 and an RRH 103 having different cell IDs. In addition, the present invention may be applied to coordinated communication including RRHs 103 (a plurality of RRHs) having different cell IDs.

That is, the above-described coordinated communication may be applied to a communication system including a plurality of base station apparatuses 101, a plurality of terminal apparatuses 102, and a plurality of RRHs 103. In addition, the above-described coordinated communication may be applied to a communication system including a plurality of transmission points and a plurality of reception points. In addition, these transmission points and reception points may be configured by a plurality of base station apparatuses 101, a plurality of terminal apparatuses 102, and a plurality of RRHs 103. In addition, although a case has been described in each of the above-described embodiments in which the terminal apparatus 102 is subjected to uplink transmission power control suitable for the base station apparatus 101 or the RRH 103, whichever is closer (path loss is smaller), on the basis of a result of calculation of the path loss, the same process may be performed when the terminal apparatus 102 is subjected to uplink transmission power control suitable for the base station apparatus 101 or the RRH 103, whichever is farther (path loss is larger), on the basis of a result of measurement of the path loss.

It is to be noted that the base station apparatus 101 and the RRH 103 are downlink transmission points and uplink reception points in each of the above-described embodiments. In addition, the terminal apparatus 102 is a downlink reception point and an uplink transmission point.

Programs operating on the base station apparatus 101 and the terminal apparatus 102 according to the present invention are programs for controlling CPUs or the like (programs for causing computers to function) in such a way as to realize the functions of the above-described embodiments according to the present invention. In addition, information handled by these devices is temporarily accumulated in RAMs during processing, and then stored in various ROMs and HDDs and read, corrected, rewritten by the CPUs as necessary. As a recording medium storing such programs may be any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), and the like. In addition, not only the functions of the above-described embodiments are realized by executing loaded programs but also the functions of the present invention might be realized by performing processing in cooperation with an operating system, another application program, or the like on the basis of instructions from the programs.

In addition, when the programs are to be distributed in the market, the programs can be stored in a portable recording medium and distributed, or the programs can be transferred to a server computer connected through a network such as the Internet. In this case, a storage device of the server computer is also included in the present invention. In addition, part or the entirety of the base station apparatus 101 and the terminal apparatus 102 in the above-described embodiments may be realized as LSI, which is typically an integrated circuit. The function blocks of the base station apparatus 101 and the terminal apparatus 102 may be individually realized as chips, or part of or all the function blocks may be integrated and realized as a chip. In addition, a method for realizing these devices as integrated circuits is not limited to LSI, but dedicated circuits or general-purpose processors may be used. In addition, if a technique for realizing these devices as integrated circuits that replaces LSI appears as a result of evolution of semiconductor technologies, integrated circuits realized by the technique may be used.

Although the embodiments of the present invention have been described with reference to the drawings, specific configurations are not limited to those according to the embodiments, and the present invention includes design changes and the like that do not deviate from the scope of thereof. In addition, the present invention may be modified in various ways within the scope disclosed in the claims, and an embodiment obtained by appropriately combining technical means disclosed in different embodiments is also included in the technical scope of the present invention. In addition, a configuration in which elements that have been described in each of the above-described embodiments and that produce the same effects are replaced by each other is also included. The present invention is desirable for a radio base station apparatus device, a radio terminal apparatus device, a radio communication system, and a radio communication method.

REFERENCE SIGNS LIST

101, 3501 base station apparatus
102, 3502, 3503, 3604, 3704 terminal apparatus
103, 3602, 3702 RRH
104, 3603, 3703 line
105, 107, 3504, 3505, 3605, 3606 downlink
106, 108, 3705, 3706 uplink
501 higher layer processing unit
503 control unit
505 reception unit
507 transmission unit
509 channel measurement unit
511 transmission and reception antenna
5011 radio resource control section
5013 SRS configuration section
5015 transmission power setting section
5051 decoding section
5053 demodulation section
5055 demultiplexing section
5057 radio reception section
5071 coding section
5073 modulation section
5075 multiplexing section
5077 radio transmission section
5079 downlink reference signal generation section
601 higher layer processing unit
603 control unit
605 reception unit
607 transmission unit
609 channel measurement unit
611 transmission and reception antenna
6011 radio resource control section
6013 SRS control section
6015 transmission power control section
6051 decoding section
6053 demodulation section
6055 demultiplexing section
6057 radio reception section
6071 coding section
6073 modulation section 6075 multiplexing section
6077 radio transmission section
6079 uplink reference signal generation unit
3601, 3701 macro base station apparatus

The invention claimed is:

1. A terminal apparatus comprising:
a receiver that:
receives a higher layer signal including two or more uplink power control configurations for a serving cell, the two or more uplink power control configurations being used for an uplink power control for a physical uplink shared channel, and
receives a physical downlink control channel including a downlink control information for scheduling the physical uplink shared channel, the downlink control information having a first field, a first value of the first field identifying a first uplink power control configuration of the two or more uplink power control configurations; and
a transmitter that sets a transmit power for the physical uplink shared channel based on the first uplink power control configuration identified by the first value, wherein
each of the two or more uplink power control configurations comprises a cell-specific configuration and a terminal-specific configuration, and
each of the two or more uplink power control configurations includes:
a nominal power value,
a pathloss compensation coefficient,
a pathloss reference resource associated with a channel state information reference signal, and
a power adjustment value.

2. A base station apparatus comprising:
a transmitter that:
transmits a higher layer signal including two or more uplink power control configurations for a serving cell, the two or more uplink power control configurations being used for an uplink power control for a physical uplink shared channel, and
transmits a physical downlink control channel including a downlink control information for scheduling the physical uplink shared channel, the downlink control information having a first field, a first value of the first field identifying a first uplink power control configuration of the two or more uplink power control configurations; and
a receiver that receives the physical uplink shared channel transmitted at a transmit power set by a terminal apparatus based on the first uplink power control configuration identified by the first value, wherein
each of the two or more uplink power control configurations comprises a cell-specific configuration and a terminal-specific configuration, and
each of the two or more uplink power control configurations includes:
a nominal power value,
a pathloss compensation coefficient,
a pathloss reference resource associated with a channel state information reference signal, and
a power adjustment value.

3. A method for a terminal apparatus, comprising
receiving a higher layer signal including two or more uplink power control configurations for a serving cell, the two or more uplink power control configurations being used for an uplink power control for a physical uplink shared channel, and
receiving a physical downlink control channel including a downlink control information for scheduling the physical uplink shared channel, the downlink control information having a first field, a first value of the first field identifying a first uplink power control configuration of the two or more uplink power control configurations; and
setting a transmit power for the physical uplink shared channel based on the first uplink power control configuration identified by the first value, wherein
each of the two or more uplink power control configurations comprises a cell-specific configuration and a terminal-specific configuration, and
each of the two or more uplink power control configurations includes:
a nominal power value,
a pathloss compensation coefficient,
a pathloss reference resource associated with a channel state information reference signal, and
a power adjustment value.

* * * * *